US012569978B1

(12) United States Patent

Lu et al.

(10) Patent No.: US 12,569,978 B1

(45) Date of Patent: Mar. 10, 2026

(54) AUTONOMOUS MOBILE MACHINE, METHOD FOR CONTROLLING AUTONOMOUS MOBILE MACHINE, AND CONTROLLER

(71) Applicant: VisionNav Robotics USA Inc., Acworth, GA (US)

(72) Inventors: Wei Lu, Acworth, GA (US); Mu Fang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/231,900

(22) Filed: Jun. 9, 2025

Related U.S. Application Data

(63) Continuation of application No. 19/226,572, filed on Jun. 3, 2025.

(51) Int. Cl.
  *B25J 5/00* (2006.01)
  *B25J 18/02* (2006.01)
(52) U.S. Cl.
  CPC ............. *B25J 5/007* (2013.01); *B25J 18/025* (2013.01)
(58) Field of Classification Search
  CPC ................................. B25J 5/007; B25J 18/025
  See application file for complete search history.

(56) References Cited

U.S. PATENT DOCUMENTS

| | | | | |
|---|---|---|---|---|
| 3,780,893 A | * | 12/1973 | Lassig | B65G 67/20 414/400 |
| 5,186,596 A | * | 2/1993 | Boucher | B65G 67/20 414/400 |

| | | | | |
|---|---|---|---|---|
| 9,688,489 B1 | * | 6/2017 | Zevenbergen | B25J 11/00 |
| 11,794,922 B1 | * | 10/2023 | Twyford | B64U 80/25 |
| 12,280,956 B1 | * | 4/2025 | Cantrell, Jr. | B65G 21/14 |
| 12,351,440 B1 | * | 7/2025 | Fang | B66F 9/063 |
| 2004/0086363 A1 | * | 5/2004 | Rohr | B65G 67/20 414/398 |
| 2016/0016311 A1 | * | 1/2016 | Konolige | B25J 9/1664 901/30 |
| 2017/0225902 A1 | * | 8/2017 | Harper | G06Q 10/087 |
| 2020/0377317 A1 | * | 12/2020 | Zoghzoghy | B65G 43/10 |
| 2024/0174454 A1 | * | 5/2024 | Allen | B65G 43/08 |
| 2024/0316779 A1 | * | 9/2024 | Kanemoto | B25J 9/1687 |
| 2024/0338038 A1 | * | 10/2024 | Okazaki | G05D 1/6484 |
| 2025/0206551 A1 | * | 6/2025 | Almers | B65G 61/00 |

FOREIGN PATENT DOCUMENTS

| | | |
|---|---|---|
| CN | 203922610 U | 11/2014 |
| CN | 207451153 U | 6/2018 |
| CN | 208561592 U | 3/2019 |
| CN | 112811208 A | 5/2021 |
| CN | 113753605 A | 12/2021 |
| KR | 101584337 B1 | 1/2016 |

OTHER PUBLICATIONS

Li, Cam, Declaration with photograph, Shenzhen Baoan International Airport, photograph taken on Apr. 14, 2025.

* cited by examiner

*Primary Examiner* — Kyle O Logan

(74) *Attorney, Agent, or Firm* — Muncy, Geissler, Olds & Lowe, P.C.

(57) ABSTRACT

The present disclosure relates to a mobile carrier, comprising: a main body; and a plurality of wheel assemblies, arranged around the main body; wherein the mobile carrier is configured to enable a plurality of mobile vehicles to move into and out of the mobile carrier, and the mobile carrier is configured to move the plurality of mobile vehicles in a vertical direction.

18 Claims, 49 Drawing Sheets

611-1

611-2

611-1

611-2

612-1

612-2

613-1

613-2

400

403

400

422

400

472

400

403

400

403

400

421

500

503

500

569

500

571

500

572

500

569

500

521

500

521

500

502

200

210

200

202

200

2032

200

2032

200

207

200

2010

100

200

400

100

202

100

500

400

200

100

100

221

100

400

100

200

100

200

AUTONOMOUS MOBILE MACHINE, METHOD FOR CONTROLLING AUTONOMOUS MOBILE MACHINE, AND CONTROLLER

FIELD OF THE INVENTION

The present disclosure generally relates to the fields of warehouse logistics and automated driving and operation, and more specifically, to an autonomous mobile machine (such as an autonomous mobile device and so on), a method for controlling an autonomous mobile machine, and a controller.

BACKGROUND

Nowadays, automated driving and operation technologies are increasingly being applied in production and life. For example, it is expected to take advantage of the automated driving and operation technologies in application scenarios related to frequent movement of objects (for example, cargoes), such as warehousing and logistics.

In addition, how to improve overall transportation efficiency of a set of cargoes (for example, a plurality of cargoes belonging to a same batch or different batches), compared with transportation of a single object, is also a focus in the art.

BRIEF DESCRIPTION OF THE DRAWINGS

The disclosure in this specification mentions and includes the following figures.

Figure 1:
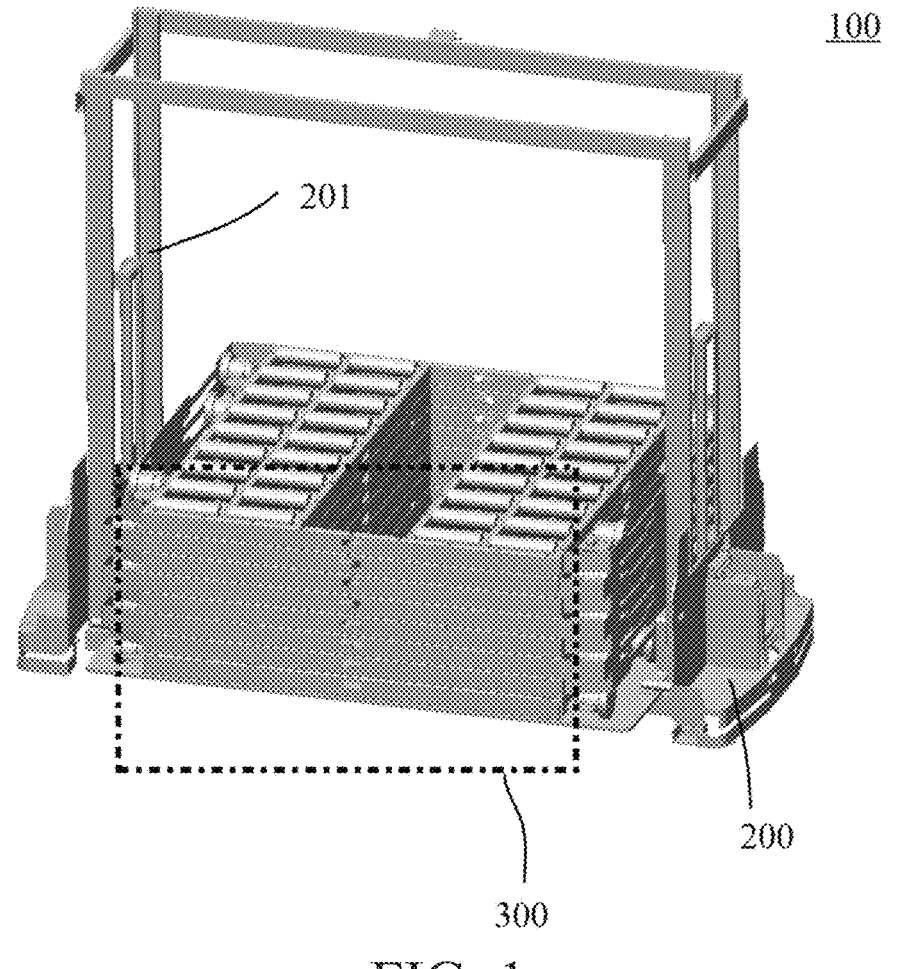
FIG. 1 is a schematic diagram of a device according to some embodiments of the present disclosure.

According to conventions, various features illustrated in the drawings may not be drawn to scale. Therefore, the sizes of the various features may be increased or reduced arbitrarily for the purpose of clearness. The shape of each component illustrated in the figures is merely exemplary, and is not to limit the actual shape of the component. In addition, for clearness, implementations described in the figures may be simplified. Therefore, all components of a given device or apparatus may be not described in the figures. Finally, similar reference numerals may be used to represent similar features throughout the specification and the figures.

DETAILED DESCRIPTION

To better understand the spirit of the present disclosure, the present disclosure will be further described below in conjunction with part of embodiments of the present disclosure.

The term "in one embodiment" or "according to one embodiment" as used in this specification does not necessarily refer to the same specific embodiment, and the term "in other (some/certain) embodiments" or "according to other (some/certain) embodiments" as used in this specification does not necessarily refer to different specific embodiments. The objective is, for example, that the claimed subject matter includes a combination of all or part of specific exemplary embodiments. The meanings of "upper" and "lower" herein are not limited to a relationship directly presented by the drawings, but may include other explicit correspondence, for example, "left" and "right", or the opposite of "upper" and "lower". The term "connected" or "coupled" herein should be understood to encompass "directly connected" as well as "connected via one or more intermediate components." The names of various components used in this specification are merely for illustrative objectives and are not limiting, and different manufacturers may use different names to refer to components having the same function.

Various implementations of the present disclosure are discussed in detail below. Although specific implementations are discussed, it should be understood that these implementations are merely for illustrative objectives. Those skilled in the relevant art will recognize that other components and configurations may be used without departing from the spirit and scope of the present disclosure. The implementation of the present disclosure does not necessarily include all components or steps in the embodiments described in the specification, and the execution sequence of the steps may be adjusted according to an actual application.

In addition, for the objective of clarity, when some features are apparent to those skilled in the art, detailed descriptions of the features are not discussed, so as not to obscure the descriptions of the embodiments of the present disclosure. Therefore, the following detailed descriptions should not be construed as limiting.

The present disclosure describes a solution and technology for moving a plurality of objects. In some embodiments or some application scenarios of the present disclosure, the plurality of objects may include a plurality of cargoes. The cargoes may be related. For example, in some embodiments, the plurality of cargoes are a same type of cargoes. In some embodiments, the plurality of cargoes have a same destination in a handling process. In some embodiments, the plurality of cargoes need to be centralized into a compact whole for warehousing, transferring, and transporting. For ease of discussion, in the context of the present disclosure, the terms "object" and "cargo" may be mutually replaced. It should be noted that "cargo" is a representational expression of an object, and is not intended to limit the present disclosure. The technology of the present disclosure is applicable to movement and transportation of various objects, targets, and objects without departing from the essence of the present disclosure.

In some cases, a continuously extending flat board needs to be used to gather and transfer an object to a destination. Specifically, the flat board is fixed to the ground. A plurality of objects (for example, cargoes) are placed on the flat board. The flat board and the plurality of objects are then moved together to a destination (for example, a carriage of a truck). Finally, the flat board is pulled away from the destination.

However, such a flat board is overlong and undetachable. In view of the size of the carriage, such a flat board may extend for more than ten or even twenty meters. Such a flat board is also not flexible. Specifically, such a flat board requires a fixed site. In other words, a device (for example, a forklift or a truck) needing to transport cargoes can be docked with such a flat board only at the fixed site. In addition, a height of the flat board is not adjustable, and therefore, a docking height between the device and the flat board is also not adjustable. The foregoing limitation of such a flat board greatly reduces object transferring and transportation efficiency.

On the other hand, when such a flat board has a fault in a transportation process of cargoes, for example, the flat board stays in a carriage of the truck or another narrow space due to the fault, it is very difficult to repair such a flat board.

The technology described in the present disclosure can achieve object transfer and transportation in a more efficient manner without a limitation of the foregoing flat board.

FIG. 1 shows a schematic diagram of an autonomous mobile machine (hereinafter autonomous mobile device 100) according to some embodiments of the present disclosure. In some embodiments, the autonomous mobile device 100 may include a mobile carrier 200. The mobile carrier 200 can implement automated movement of the autonomous mobile device 100. As shown in FIG. 38 to FIG. 47, the mobile carrier 200 can bear, support, or accommodate another apparatus. In some embodiments, the autonomous mobile device 100 may further include one or more mobile vehicles. As shown in FIG. 1, a mobile vehicle set 300 formed by a plurality of mobile vehicles (for ease of discussion, the mobile vehicle set 300 formed by a plurality of mobile vehicles is briefly referred to as "the plurality of mobile vehicles 300" below) may be placed on the mobile carrier 200. It should be understood that although the plurality of mobile vehicles 300 can move away from the autonomous mobile device 100 to fulfill corresponding tasks, the plurality of mobile vehicles 300 are part of the autonomous mobile device 100. In other words, in the present disclosure, the autonomous mobile device 100 may be considered as a system, which may include a plurality of apparatuses, for example, a mobile carrier 200 and a plurality of mobile vehicles 300. Each of the plurality of mobile vehicles 300 is an independent apparatus, and also forms part of the autonomous mobile device 100. The two aspects are not conflict with each of the plurality of mobile vehicles. Each of the plurality of mobile vehicles 300 is further described below.

The mobile carrier 200 may include a main body. Further referring to FIG. 1, FIG. 2 and FIG. 30 to FIG. 37, the main body of the mobile carrier 200 may include a frame 201 and a platform 203. It should be understood that the "main body" herein refers to a macroscopically main part of the mobile carrier 200, rather than a particular component. In some embodiments, the main body of the mobile carrier 200 may include, but is not limited to, one or more of the frame 201, the platform 203, and another component (for example, a housing 231) of the mobile carrier 200.

The frame 201 may include a plurality of transverse beams 2010 and a plurality of vertical beams 2011. Specifically, in the embodiments shown in FIG. 1 and FIG. 2, the frame 201 may include a top structure. In some embodiments, the top structure may include a pair of long transverse beams 2010 and a pair of short transverse beams 2010. The pair of long transverse beams 2010 are parallel to each other. The pair of short transverse beams 2010 are parallel to each other. The pair of long transverse beams 2010 and the pair of short transverse beams 2010 may be fixed to each other to define a top 290 of the mobile carrier 200. It should be understood that in this configuration, the top 290 is also considered as a top of the autonomous mobile device 100. In some embodiments, a sensing apparatus, for example, a sensor, is arranged on the top 290. This aspect is further described below.

The frame 201 may further include a side structure. In some embodiments, the side structure may include a pair of vertical beams 2011 and a transverse beam 2010. The pair of vertical beams 2011 are parallel to each other. The transverse beam 2010 is one of the pair of short transverse beams 2010 of the top 290. Further, the pair of vertical beams 2011 may be respectively fixed to the pair of corresponding long transverse beams 2010 of the top 290. The pair of vertical beams 2011 may be fixed to two ends of the transverse beam 2010 to define side portions 280 of the mobile carrier 200. It should be understood that in this configuration, the side portions 280 are also considered as side portions of the autonomous mobile device 100. In some embodiments, the side portions 280 are provided with other components of the mobile carrier 200. This aspect is further described below.

Figure 2:
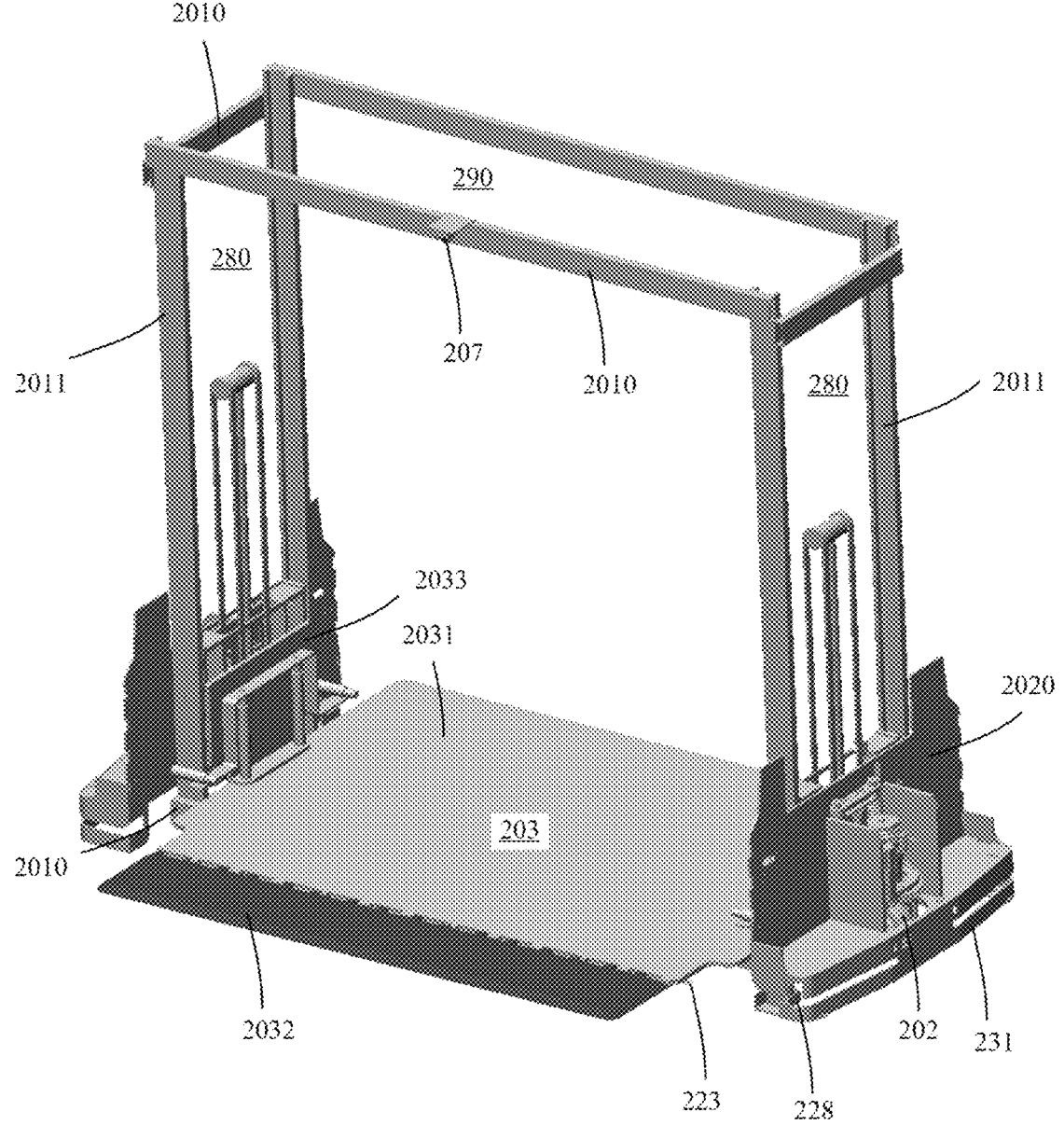
FIG. 2 and FIG. 3 are schematic diagrams of details of the device shown in FIG. 1.

As shown in FIG. 2 and shown in FIG. 30 to FIG. 37, the mobile carrier 200 may have a bilaterally symmetrical structure. In other words, in some embodiments, the left side portion 280 of the mobile carrier 200 and the right side portion 280 of the mobile carrier 200 have the same arrangement manner. For ease of discussion, the arrangement on only one side is sometimes described below. If not particularly described, the side portion 280 mentioned below refers to each of the left and right side portions 280 of the mobile carrier 200.

The frame 201 may further include a bottom structure. Although not shown in the figure, it may be understood that the bottom structure of the frame 201 is the same as the top structure. Specifically, the bottom structure of the frame 201 may include a pair of long transverse beams 2010 and a pair of short transverse beams 2010.

The mobile carrier 200 may further include a plurality of wheel assemblies 202. In some embodiments, the plurality of wheel assemblies 202 are arranged around the main body of the mobile carrier 200. In some embodiments, the plurality of wheel assemblies 202 are symmetrically located on two sides of the autonomous mobile device 100. Specifically, the wheel assemblies 202 are coupled to the frame 201 and are disposed at the side portion 280. The mobile carrier 200 may further include a housing 231. The housing 231 has vertical baffle in parts 2020. The baffle parts 2020 are fixed to the pair of vertical beams 2011 of the side portion 280. As shown in FIG. 2, the wheel assembly 202 and an activation apparatus thereof are adjacent to the baffle parts 2020 and accommodated in the housing 231. In the embodiment shown in FIG. 2 and FIG. 30 to FIG. 37, the mobile carrier 200 has two wheel assemblies 202.

In some other embodiments, the mobile carrier 200 may have another quantity of wheel assemblies. For example, in one embodiment, the mobile carrier 200 may have four wheel assemblies. Two of the wheel assemblies are arranged on a left side of the mobile carrier 200, and the other two wheel assemblies are arranged on a right side of the mobile carrier 200. In some embodiments, the wheel assembly 202 may include a steering wheel. By using the foregoing configuration of the wheel assemblies 202, the mobile carrier 200 can implement omni-directional running.

In some embodiments of the present disclosure, a platform 203 may be disposed on the pair of long transverse beams 2010 of the bottom structure of the frame 201. In other words, the platform 203 is disposed between the pair of wheel assemblies 202. In some embodiments, the platform 203 is mechanically coupled to the frame 201. As described above, the plurality of mobile vehicles 300 of the autonomous mobile device 100 can be placed on the platform 203 of the mobile carrier 200. The platform 203 may include a first part 2031. The platform 203 may further include a second part 2032. The first part 2031 is connected to the second part 2032 by using a hinge structure. In one embodiment, the first part 2031 may be considered as a main part of the platform 203, and the second part 2032 may be considered as an extension part of the platform 203.

Figure 3:
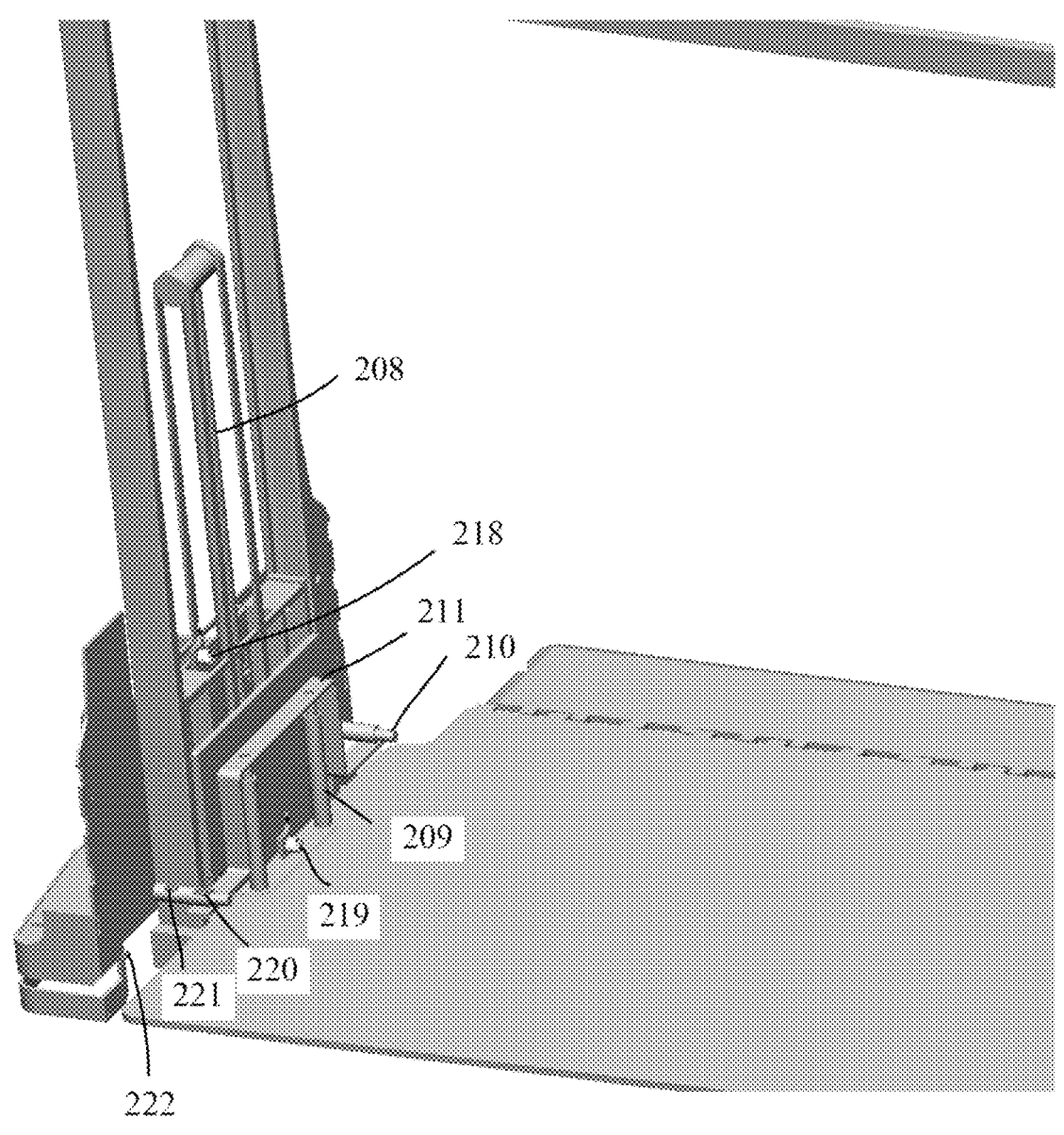

The platform 203 can move in a vertical direction. In some embodiments, the platform 203 can move in the vertical direction within a range defined by the frame 201. The mobile carrier 200 may further include a component 208. As shown in FIG. 2 and FIG. 3, the component 208 is located between the pair of vertical beams 2011 of the side portion 280 and is connected to the platform 203. The component 208 can cause the platform 203 to move in the vertical direction. In some embodiments, the component 208 may include a hydraulic apparatus. Specifically, a hydraulic assembly of the hydraulic apparatus is configured to generate power, so as to activate a transmission assembly (for example, a drive rod) of the hydraulic apparatus, finally causing the platform 203 to move in the vertical direction. It should be understood that any known activation apparatus may be used in this technology to implement movement of the platform 203 in the vertical direction.

In some embodiments, the mobile carrier 200 may further include a sensor 207. The sensor 207 is arranged at the top 290. In one embodiment, the sensor 207 is mounted on a long transverse beam 2010 of the top 290. Specifically, the sensor 207 is mounted at a midpoint of a long transverse beam 2010. In some embodiments, the sensor 207 is configured to detect a region around the autonomous mobile device 100. The mobile carrier 200 can control movement of the wheel assembly 202 at least partially based on data from the sensor 207. Further, the sensor 207 can position and navigate the mobile carrier 200 of the autonomous mobile device 100, and assist the autonomous mobile device 100 in identifying an object (for example, a carriage or a container of a truck). In some embodiments, the sensor 207 may include a radar. In one embodiment or in some other embodiments, the sensor 207 may include a camera.

In another embodiment, the sensor 207 is mounted on a short transverse beam 2010 of the top 290. Although not shown in the figure, a plurality of sensors including the sensor 207 are mounted on the transverse beam 2010 of the top 290. These sensors may be arranged at any location of the plurality of transverse beams 2010 of the top 290.

In some embodiments, the mobile carrier 200 may further include a sensor 218. The sensor 218 is disposed in the vicinity of the component 208. As shown in FIG. 2, the sensor 218 is disposed in a side region of the component 208 and is located above the platform 203. The sensor 218 is configured to detect a height of the platform 203. In some embodiments, the sensor 218 may include a draw-wire encoder. In one embodiment, the pull-line encoder may be coupled to the component 208 to measure a movement (lift or lower) distance of the drive rod of the component 208. After obtaining the movement distance, the mobile carrier 200 of the autonomous mobile device 100 may further determine a current (or real-time) height of the platform 203, and then perform a corresponding operation based on the foregoing determining.

In some embodiments, the mobile carrier 200 may further include a sensor 223. As shown in FIG. 2, the sensor 223 is arranged at a connection point between the first part 2031 and the second part 2032. The sensor 223 is configured to detect whether the second part 2032 is at a correct location (for example, at a predetermined location on a target). The mobile carrier 200 of the autonomous mobile device 100 can determine whether to perform a next operation based on data of the sensor 223.

In some embodiments, the mobile carrier 200 may further include a first telescoping component 209. In some embodiments, the first telescoping component 209 may be arranged on the platform 203. In the embodiment shown in FIG. 3, the first telescoping component 209 may be arranged at an edge of the platform 203. The first telescoping component 209 is located in the vicinity of the pair of vertical beams 2011 of the portion 280. Specifically, referring to FIG. 2 and FIG. 3, a separator 2033 is mounted between the component 208 and the first telescoping component 209. In a transverse direction, relative to the pair of vertical beams 2011 of the portion 280, the first telescoping component 209 is closer to the center of the autonomous mobile device 100 and the center of the mobile carrier 200. Although FIG. 3 shows that two first telescoping components 209 are symmetrically arranged at a side edge of the platform, in some embodiments of the present disclosure, only one first telescoping component 209 is disposed at a side edge of the platform 203. In some other embodiments, three or more first telescoping components 209 are disposed at a side edge of the platform 203. In some embodiments, the first telescoping component 209 is a hydraulic apparatus. A drive rod of the hydraulic apparatus can drive a connecting rod 211 to move in the vertical direction. In some embodiments, the first telescoping component 209 may include a housing and a rod assembly accommodated in the housing.

In some embodiments, the mobile carrier 200 may further include a second telescoping component 210. As shown in FIG. 3, the second telescoping component 210 may be formed by two sub-assemblies that are symmetrically disposed on two sides of the first telescoping component 209. In some embodiments, two sides of the connecting rod 211 are low relative to a middle part. The two sub-assemblies of the second telescoping component 210 are respectively mounted on two sides of the connecting rod 211, and the first telescoping component 209 is connected to the middle part of the connecting rod 211. The connecting rod 211 may include a main portion and connection portions disposed on two sides of the main portion. The main portion of the connecting rod 211 is of an inverted-U shape. The corresponding second telescoping components 210 are respectively coupled to the connection portions of the connecting rod 211.

In some embodiments, each of the two sub-assemblies of the second telescoping component 210 includes an insertion part. The insertion part can extend outward from an interior of the second telescoping component 210, to be coupled to a docking position of a corresponding mobile vehicle of the plurality of mobile vehicles 300. In some embodiments, the docking position may include a bottom of the mobile vehicle. The insertion part can extend outward from an interior of the second telescoping component 210, and is further inserted into the bottom of the corresponding mobile vehicle of the plurality of mobile vehicles 300. In some other embodiments, the docking position may include a docking hole of the mobile vehicle. The insertion part can extend outward from the second telescoping component 210, and is further inserted into the corresponding docking hole of the corresponding mobile vehicle of the plurality of mobile vehicles 300, thereby implementing more stable and accurate mechanical coupling to the corresponding mobile vehicle. The insertion part can be withdrawn into the second telescoping component 210. In one embodiment, when the insertion part is withdrawn to a predetermined location, the insertion part is partially accommodated in a housing of the second telescoping component 210. In another embodiment, when the insertion part is withdrawn to a predetermined location, the insertion part is entirely accommodated in the housing of the second telescoping component 210. It should be understood that after the insertion parts are respectively inserted into the corresponding docking positions of the corresponding mobile vehicle from two sides of the mobile carrier 200, the first telescoping component 209 can be mechanically coupled to the corresponding mobile vehicle, and drives the corresponding mobile vehicle to move in the vertical direction relative to the platform 203. In some embodiments, each of the two sub-assemblies of the second telescoping component 210 is a hydraulic apparatus, and the insertion part is a rod assembly (for example, a drive rod) of the hydraulic apparatus. In the following, for ease of discussion, an extension (insertion) motion and a retraction (withdrawal) motion generated by movement of the insertion part are briefly described as an insertion motion and a withdrawal motion of the second telescoping component 210.

In some embodiments, the mobile carrier 200 may further include a sensor 219. As shown in FIG. 3, on the platform 203, the sensor 219 is arranged in the vicinity of the first telescoping component 209. Specifically, the sensor 219 may be coupled to a middle part of the connecting rod 211 to measure a movement (lift or lower) distance of the connecting rod 211. After obtaining the movement distance, the mobile carrier 200 may further calculate a height of the corresponding mobile vehicle (inserted by the second telescoping component 210) relative to the platform 203. In another embodiment, the sensor 219 may be coupled to one of two sides of the connecting rod 211 to measure the movement distance of the connecting rod 211. The mobile carrier 200 can determine a current (or real-time) height of a corresponding mobile vehicle based on data of the sensor 219, and then perform a corresponding operation based on the foregoing determinations.

In some embodiments, the mobile carrier 200 may further include a pair of sensors. The pair of sensors include a sensor 220 and a sensor 221. As shown in FIG. 3, the sensor 220 is arranged on one of two sub-assemblies of the second telescoping component 210. The sensor 221 is arranged on one of the two sub-assemblies of the second telescoping component 210. In one embodiment, the sensor 220 and the sensor 221 are arranged on a same sub-assembly of the second telescoping component 210. In another embodiment, the sensor 220 and the sensor 221 are arranged on different sub-assemblies of the second telescoping component 210. In some embodiments, the sensor 220 is arranged on each of the two sub-assemblies of the second telescoping component 210. In some other embodiments, the sensor 221 is arranged on each of the two sub-assemblies of the second telescoping component 210. In some other embodiments, the sensor 220 and the sensor 221 may be two parts of a sensor of the mobile carrier 200.

In some embodiments, the sensor 220 and the sensor 221 can detect a state of the second telescoping component 210. Specifically, the sensor 220 is triggered to determine that the second telescoping component 210 is in an extended state. The sensor 221 is triggered to determine that the second telescoping component 210 is in a withdrawn state. After the two sub-assemblies of the second telescoping component 210 extend out by a sufficient length, so as to be completely inserted into the docking position of the corresponding mobile vehicle, the sensor 220 is triggered, so that the mobile carrier 200 determines that the second telescoping component 210 is inserted into the correct position. When the two sub-assemblies of the second telescoping component 210 are withdrawn to a predetermined location, the sensor 221 is triggered, so that the mobile carrier 200 determines that the second telescoping component 210 is withdrawn to the correct position. In this case, the second telescoping component 210 completely moves away from the docking position of the mobile vehicle.

In some embodiments, the mobile carrier 200 may further include a sensor 222. As shown in FIG. 2 and FIG. 3, the sensor 222, adjacent to the platform 203, is disposed at the bottom of the mobile carrier 200. Specifically, the sensor 222 is disposed at a location, in the vicinity of the platform 203, of the housing 231. The sensor 222 can detect whether a mobile vehicle of the plurality of mobile vehicles 300 is present on the platform 203 (for example, the mobile vehicle is withdrawn to a predetermined location on the platform 203, or moves away from the predetermined location on the platform 203). The mobile carrier 200 of the autonomous mobile device 100 can perform a corresponding operation based on data of the sensor 222.

In some embodiments, the mobile carrier 200 may further include a sensor 228. As shown in FIG. 2, the sensor 228 is mounted in the housing 231. Specifically, the sensor 228 is accommodated at a corner of the housing 231, and is attached to an outer contour of the housing 231. It should be understood that four corners of the housing 231 may be considered as four corners of the autonomous mobile device 100. In some embodiments, a sensor 228 is arranged at each of four corners of the autonomous mobile device 100. Data of the sensor 228 can be obtained from the autonomous mobile device 100 to perform an operation related to safety protection. For example, the autonomous mobile device 100 can dodge contact or collision from another object based on the data of the sensor 228, or prevent the autonomous mobile device 100 from actively colliding with another object.

A corresponding mobile vehicle of the plurality of mobile vehicles 300 is described with reference to FIG. 4a to FIG. 4c and FIG. 5a to FIG. 5c. The mobile vehicle can move away from the platform 203 of the mobile carrier 200, or can drive into the platform 203.

Figure 4A:
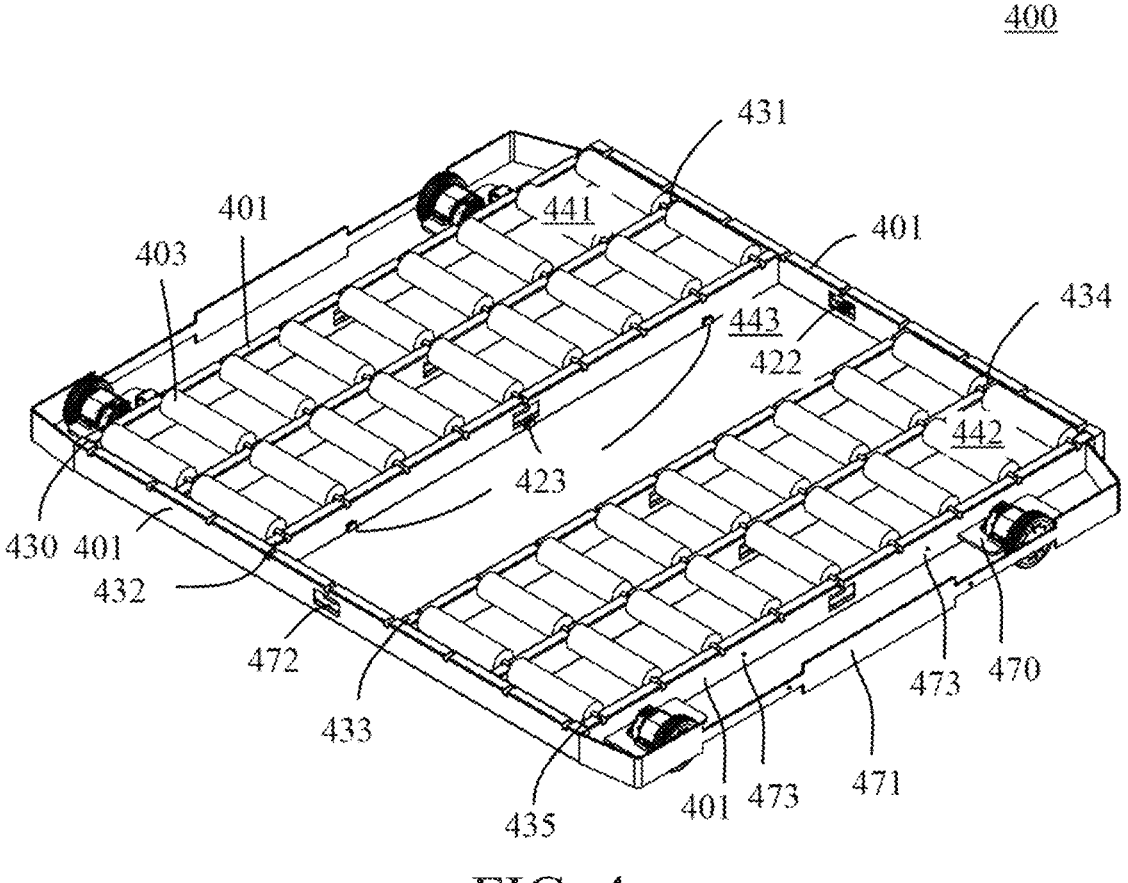
FIG. 4*a* to FIG. 4*c* are schematic diagrams of an apparatus according to some embodiments of the present disclosure.
Figures 4B, 4C:
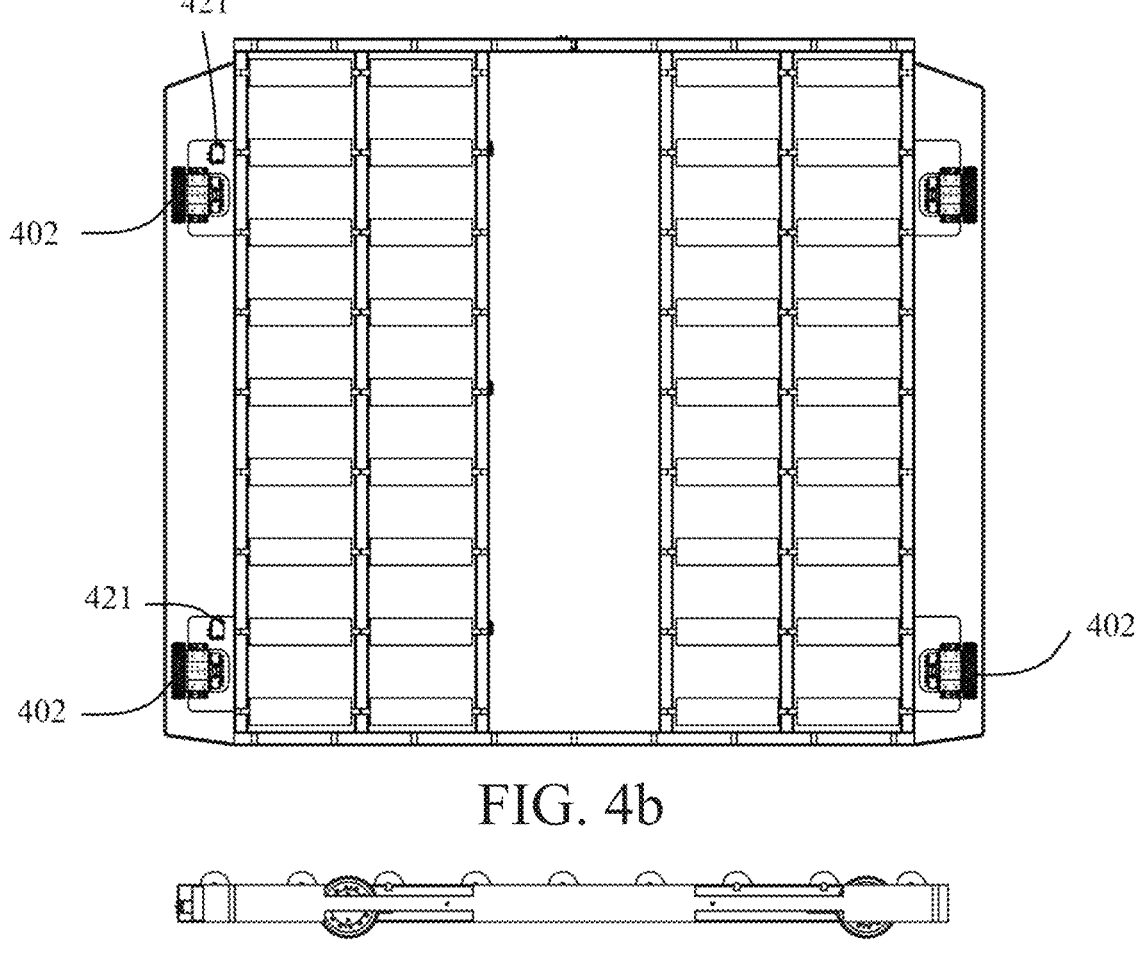

FIG. 4a to FIG. 4c show several details of a mobile vehicle 400. In some embodiments, the mobile vehicle 400 is a type of mobile vehicle of the plurality of mobile vehicles 300. As shown in FIG. 4a, the mobile vehicle 400 may include a main body. The main body of the mobile vehicle 400 may include a frame 401. It should be understood that the "main body" herein refers to a macroscopically main part of the mobile vehicle 400, rather than a particular component.

As shown in FIG. 14 to FIG. 21, the mobile vehicle 400 may further include a plurality of wheel assemblies 402. In some embodiments, the plurality of wheel assemblies 402 are arranged around the main body of the mobile vehicle 400. In some embodiments, the plurality of wheel assemblies 402 are symmetrically arranged on two sides of the frame 401. In the embodiments shown in FIG. 4a to FIG. 4c, the mobile vehicle 400 has four wheel assemblies 402. A group of (two) wheel assemblies 402 are provided on a left side of the frame 401, and a group of (two) wheel assemblies 402 are provided on a right side of the frame 401. The four wheel assemblies are substantially arranged at four corners of the mobile vehicle 400. Each wheel assembly 402 is mounted to an outer edge of the frame 401 by using a board 470. In other words, each wheel assembly 402 is located outside the frame 401.

In some embodiments, the mobile vehicle 400 may include a protection assembly 471. The protection assembly 471 is disposed outside the wheel assembly 402 and is adjacent to the wheel assembly 402. In some embodiments, the protection assembly 471 is connected to the frame 401 across the group of wheel assemblies 402, so that the group of wheel assemblies 402 are disposed between the frame 401 and the protection assembly 471. The protection assembly 471 can prevent an external object from damaging the wheel assembly 402, thereby ensuring a movement function of the mobile vehicle 400.

In some other embodiments, the mobile vehicle 400 may have another quantity of wheel assemblies. For example, in one embodiment, the mobile vehicle 400 may have six wheel assemblies. Three of the wheel assemblies are arranged on the left side of the frame 401, and the other three wheel assemblies are arranged on the right side of the frame 401. In another embodiment, the mobile vehicle 400 may have two wheel assemblies. One of the wheel assemblies is arranged on the left side of the frame 401, and the other wheel assembly is arranged on the right side of the frame 401.

In some embodiments, the frame 401 may include a plurality of beam structures. FIG. 4a shows a beam structure 430 to a beam structure 435. The beam structure 430 to the beam structure 435 divide the frame 401 into a plurality of regions. In other words, the beam structure 430 to the beam structure 435 divide the main body of the mobile vehicle 400 into a plurality of regions.

In some embodiments, the mobile vehicle 400 may include a transportation component. The transportation component may be arranged in a corresponding region of the foregoing plurality of regions of the frame 401. The transportation component can support an object on the mobile vehicle 400. Further, the transportation component can transfer the object supported on the mobile vehicle 400 out of the mobile vehicle 400.

In some embodiments, the transportation component includes a plurality of sub-assemblies 403. Specifically, a group of sub-assemblies of the plurality of sub-assemblies 403 of the transportation component are arranged in a region 441 of the frame 401. Another group of sub-assemblies of the plurality of sub-assemblies 403 of the transportation component are arranged in a region 442 of the frame 401.

Further, in the region 441, a group of sub-assemblies of the plurality of sub-assemblies 403 may include two rows of sub-assemblies. As shown in FIG. 4a and FIG. 4b, a row of sub-assemblies are arranged between the beam structure 430 and the beam structure 431. The other row of sub-assemblies are arranged between the beam structure 431 and the beam structure 432. In the region 442, another group of sub-assemblies of the plurality of sub-assemblies 403 may include two rows of sub-assemblies. A row of sub-assemblies are arranged between the beam structure 433 and the beam structure 434. The other row of sub-assemblies are arranged between the beam structure 434 and the beam structure 435. In some embodiments, all of sub-assemblies in each row of sub-assemblies are uniformly arranged across the length of the mobile vehicle 400. In other words, in a row of sub-assemblies, a spacing between any two adjacent sub-assemblies 403 is the same.

Although not shown in the figure, in another embodiment, in a row of sub-assemblies, spacings between adjacent sub-assemblies 403 may be different or changed. In one embodiment, two rows of sub-assemblies in the region 441 may have a same arrangement manner. In one embodiment, two rows of sub-assemblies in the region 442 may have a same arrangement manner.

Although not shown in the figure, in some other embodiments, two rows of sub-assemblies in the region 441 may have different arrangement manners. Specifically, a spacing between adjacent sub-assemblies 403 in a row of sub-assemblies is different from a spacing between adjacent sub-assemblies 403 in the other row of sub-assemblies. In one embodiment, like the arrangement in the region 441, two rows of sub-assemblies in the region 442 may have different arrangement manners.

Although not shown in the figure, in some other embodiments, the arrangement manner of a row of sub-assemblies in the region 441 is the same as the arrangement manner of a row of sub-assemblies in the region 442. For example, a configuration manner of a row of sub-assemblies arranged between the beam structure 431 and the beam structure 432 may be the same as a configuration manner of a row of sub-assemblies arranged between the beam structure 433 and the beam structure 434.

Although not shown in the figure, in some other embodiments, the region 441 may include three or more rows of sub-assemblies. In some other embodiments, the region 442 may include three or more rows of sub-assemblies. Referring to the foregoing descriptions, in one embodiment, three or more rows of sub-assemblies in the region 441 may have a same arrangement manner. In one embodiment, three or more rows of sub-assemblies in the region 442 may have a same arrangement manner. In one embodiment, three or more rows of sub-assemblies in the region 441 may have different arrangement manners. In one embodiment, three or more rows of sub-assemblies in the region 442 may have different arrangement manners. Details are not described herein again.

In some embodiments, the sub-assembly 403 of the transportation component may include a drum motor, as shown in FIG. 4a and FIG. 4b. In some embodiments, the drum motor may have a drum body and a shaft extending through the drum body. Each of the beam structure 430 to the beam structure 435 may have a groove matched with the shaft of the drum motor. Specifically, the shaft of the drum motor can span two beam structures to be accommodated in the corresponding grooves on upper surfaces of the two beam structures. In this way, in some embodiments, the highest point of the sub-assembly is actually slightly higher than the highest point of the beam structure. In other words, a plane where the highest point of the plurality of sub-assemblies 403 is located is slightly higher than a plane where the highest point from the beam structure 430 to the beam structure 435 is located, thereby allowing the plurality of sub-assemblies 403 to be in direct contact with a transported object. Although not shown in the figure, in some other embodiments of the present disclosure, the shaft of the drum motor can span two beam structures to be accommodated in a hole in a middle region of side surfaces of the two beam structures. It should be understood that in such a configuration manner, a plane where the highest point of the plurality of sub-assemblies 403 is located can also be slightly higher than a plane where the highest point from the beam structure 430 to the beam structure 435 is located.

In some other embodiments, the transportation component may include a conveyor belt. Specifically, one or more conveyor belts may be arranged in the region 441. One or more conveyor belts may be arranged in the region 442. The sub-assembly 403 may include a conveyor belt assembly.

In some other embodiments, the transportation component may include a chain. Specifically, one or more chains may be arranged in the region 441. One or more chains may be arranged in the region 442. The sub-assembly 403 may include a chain assembly.

In the foregoing embodiments of the transportation component, each of the sub-assemblies 403 of the transportation component can be independently controlled to implement a finer control manner, so as to transport an object (for example, a cargo) in direct contact with the foregoing sub-assembly 403 in various complex scenarios.

As shown in FIG. 4a, the frame 401 may further include a region 443. The region 443 is located between the region 441 and the region 442. In some embodiments, there is no sub-assembly 403 of the transportation component arranged in the region 443. In some other embodiments, corresponding sub-assemblies 403 may be arranged in the region 443. It should be understood that for a manner of arranging the sub-assemblies in the region 443, reference is made to the foregoing manner of arranging the sub-assemblies in the region 441 and the region 442. Details are not described herein again.

The foregoing various arrangement manners of the transportation component and the sub-assemblies 403 help implement various controls of the transportation component, and can adapt the transportation component to various types of cargoes.

In some embodiments, the mobile vehicle 400 may include docking holes 473. Specifically, two docking holes 473 may be symmetrically distributed on side surfaces of outermost beam structures (for example, the beam structure 430 and the beam structure 435) of the frame 401. As described above, the mobile carrier 200 may include a second telescoping component 210. The docking holes 473 may be provided for insertion of the second telescoping component 210, so that the mobile carrier 200 can move the mobile vehicle 400 in the vertical direction. With reference to FIG. 3 and FIG. 4a, the second telescoping component 210 is driven to first pass through two holes in the protection assembly 471, and then pass through the two docking holes 473. In this way, docking between the mobile carrier 200 and the mobile vehicle 400 is implemented. In some embodiments, the mobile vehicle 400 may not include the protection assembly 471. In these embodiments, the second telescoping components 210 on two sides of the mobile carrier 200 may directly pass through the docking holes 473 on two sides of the mobile vehicle 400. It should be understood that regardless of a docking manner, the sub-assembly 403 or another structure of the mobile vehicle 400 does not block insertion of the second telescoping component 210 of the mobile carrier 200.

Although not shown in the figure, in some embodiments, the mobile vehicle 400 may include an insertion hole for insertion of a forklift. In some embodiments, the insertion hole of the mobile vehicle 400 may be arranged on an outermost beam structure of the frame 401. In some other embodiments, the insertion hole of the mobile vehicle 400 may be arranged on a transverse beam on a front side of the frame 401. In some other embodiments, the insertion hole of the mobile vehicle 400 may be arranged on a transverse beam on a rear side of the frame 401. Any assembly and structure of the mobile vehicle 400 do not block an insertion operation of the forklift on the mobile vehicle 400. The foregoing insertion hole of the mobile vehicle 400 may be very advantageous, especially when the mobile vehicle 400 has a fault and stays at a place far away from maintenance personnel.

In some embodiments, the mobile vehicle 400 may include a sensor 421. As shown in FIG. 4b, the sensor 421 is arranged in the vicinity of the wheel assembly 402. Specifically, the sensor 421 is mounted on the board 470, and the corresponding wheel assembly 402 is further connected to the board 470. In some embodiments, one wheel assembly 402 corresponds to one sensor 421.

The sensor 421 can determine a distance between the corresponding wheel assembly 402 and a corresponding side wall of a target (including but not limited to a carriage of a truck) accommodating the mobile vehicle 400. Further, the mobile vehicle 400 can adjust movement of the wheel assembly (for example, adjust a rotational speed thereof) in response to a detection result of the sensor. By adjusting the rotational speed, the mobile vehicle 400 may always move forward along a predetermined route (for example, a center line of the target) inside the target. In some other embodiments, as shown in FIG. 4b, there are two sensors 421 in the vicinity of two wheel assemblies 402 on only one side (for example, the left side) of the mobile vehicle 400, and there is no sensor 421 on the other side (for example, the right side) of the mobile vehicle 400. In these embodiments, the sensor 421 located on a front left side of the mobile vehicle 400 is used for adjusting the rotational speed of the wheel assembly 402 also located on the front left side, and the sensor 421 located on a rear left side of the mobile vehicle 400 is configured to adjust the rotational speed of the wheel assembly 402 also located on the rear left side.

In some other embodiments, the mobile vehicle 400 has two sensors 421. One of the sensors 421 is arranged on the left side of the mobile vehicle 400, and the other sensor 421 is arranged on the right side of the mobile vehicle 400. In these embodiments, detection data from the sensor 421 located on the left side of the mobile vehicle 400 and detection data from the sensor 421 located on the right side of the mobile vehicle 400 are comprehensively considered by the mobile vehicle 400, to integrally control the rotational speeds of all the wheel assemblies (for example, four wheel assemblies 402) of the mobile vehicle 400. In other words, in these embodiments, one sensor 421 is not specifically used for adjusting the rotational speed of the wheel assembly 402. In one embodiment, one sensor 421 may be located on the front left side of the mobile vehicle 400, and the other sensor 421 may be located on the rear right side of the mobile vehicle 400. In another embodiment, one sensor 421 may be located on the front right side of the mobile vehicle 400, and the other sensor 421 may be located on the rear left side of the mobile vehicle 400. In another embodiment, one sensor 421 may be located on the front left side of the mobile vehicle 400, and the other sensor 421 may be located on the front right side of the mobile vehicle 400. In another embodiment, one sensor 421 may be located on the left rear side of the mobile vehicle 400, and the other sensor 421 may be located on the right rear side of the mobile vehicle 400.

In some embodiments, the mobile vehicle 400 may include a sensor 422. As shown in FIG. 4*a*, the sensor 422 is arranged on the front side of the frame 401. Specifically, the front side of the frame 401 faces a forward direction of the mobile vehicle 400. In some embodiments, the sensor 422 may be arranged at a central part close to the region 443 on the front side of the frame 401. In some other embodiments, the sensor 422 may be arranged on a part close to the region 441 on the front side of the frame 401. In some other embodiments, the sensor 422 may be arranged on a part close to the region 442 on the front side of the frame 401.

In addition, a sensor 422 may be provided on the rear side of the frame 401. Specifically, the sensor 422 may be arranged at a location 472. In some other embodiments, the sensor 422 may be arranged on a part close to the region 441 on the rear side of the frame 401. In some other embodiments, the sensor 422 may be arranged on a part close to the region 442 on the rear side of the frame 401. It should be understood that the sensor 422 arranged on the rear side of the frame 401 may correspond to a backward direction of the mobile vehicle 400.

The sensor 422 arranged on the front side of the frame 401 can detect an object in the forward direction of the mobile vehicle 400, so that the mobile vehicle 400 keeps a predetermined distance from the object. The sensor 422 arranged on the rear side of the frame 401 can detect an object in the backward direction of the mobile vehicle 400, so that the mobile vehicle 400 keeps a predetermined distance from the object. In one embodiment, the predetermined distance is approximately 10 cm. In another embodiment, the predetermined distance is approximately 8 cm. In another embodiment, the predetermined distance is approximately 12 cm.

In some embodiments, the mobile vehicle 400 may include a sensor 423. As shown in FIG. 4*a*, the sensor 423 is arranged in the vicinity of the region 443. Specifically, the sensor 423 is arranged on the beam structure 432. In some embodiments, the sensor 423 may be arranged on a side wall of the beam structure 432 that faces the beam structure 433. In some other embodiments, the sensor 423 may be arranged on a side wall of the beam structure 433 that faces the beam structure 432. The sensor 423 can detect whether an object (including but not limited to a cargo) is present on the mobile vehicle 400. The mobile vehicle 400 can determine whether to drive the transportation component in response to a detection result of the sensor 423.

In the embodiment shown in FIG. 4*a*, three sensors 423 are substantially uniformly arranged on the beam structure 432. In some other embodiments, the mobile vehicle 400 may have more sensors 423, for example, four sensors, substantially uniformly arranged on the beam structure 432. In some other embodiments, the mobile vehicle 400 may have fewer sensors 423 that are substantially uniformly arranged on the beam structure 432. In some other embodiments, the mobile vehicle 400 may have only one sensor 423 arranged at a middle location of the beam structure 432. An arrangement manner of the sensor 423 on the beam structure 433 may be the same as an arrangement manner of the sensor 423 on the beam structure 432. Details are not described herein again.

The location of the sensor 423 is not limited to be on the beam structure 432 and the beam structure 433. In some other embodiments, one or more sensors 423 may be arranged on one or more of the beam structure 430 to beam structure 435.

Figure 5A:
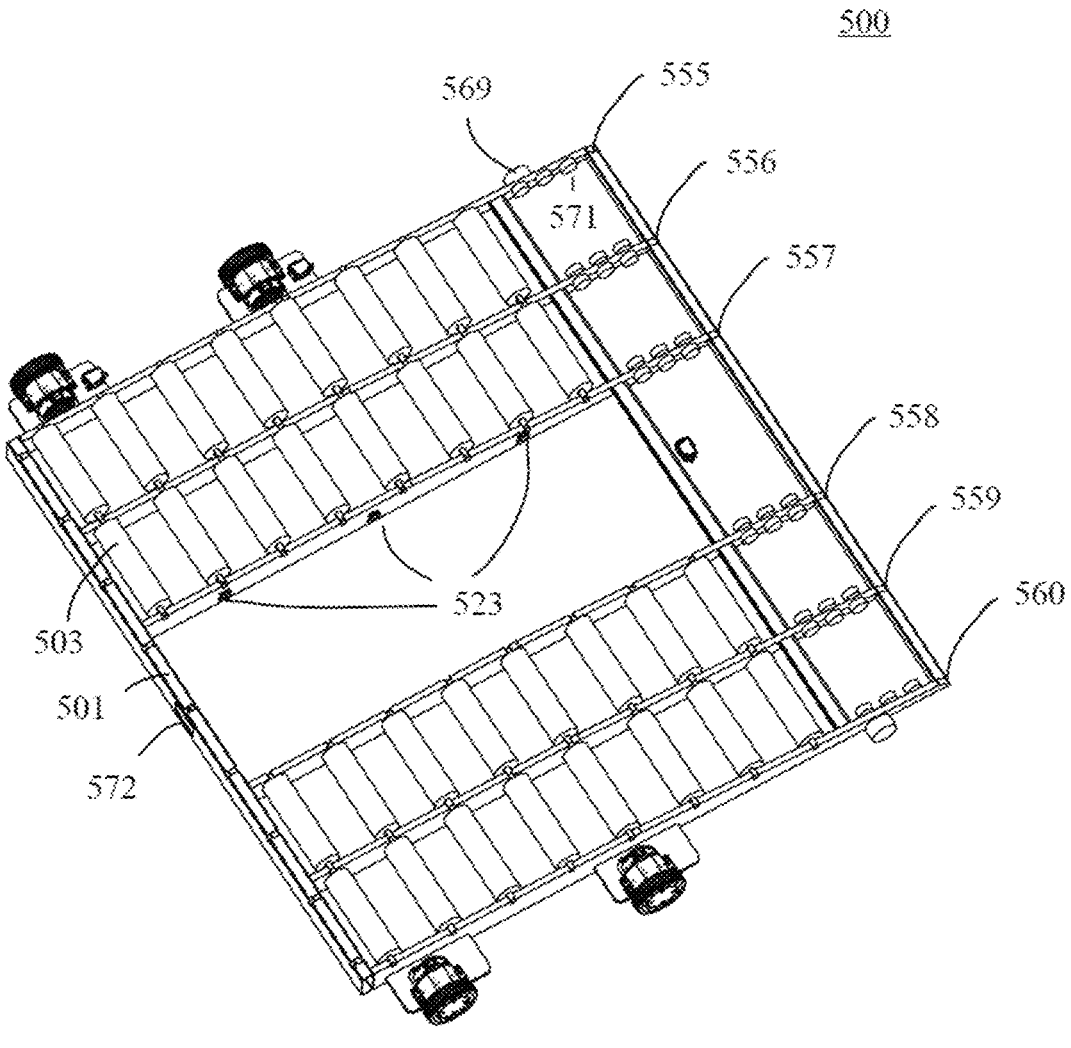
FIG. 5*a* to FIG. 5*c* are schematic diagrams of another apparatus according to some embodiments of the present disclosure.
Figures 5B, 5C:
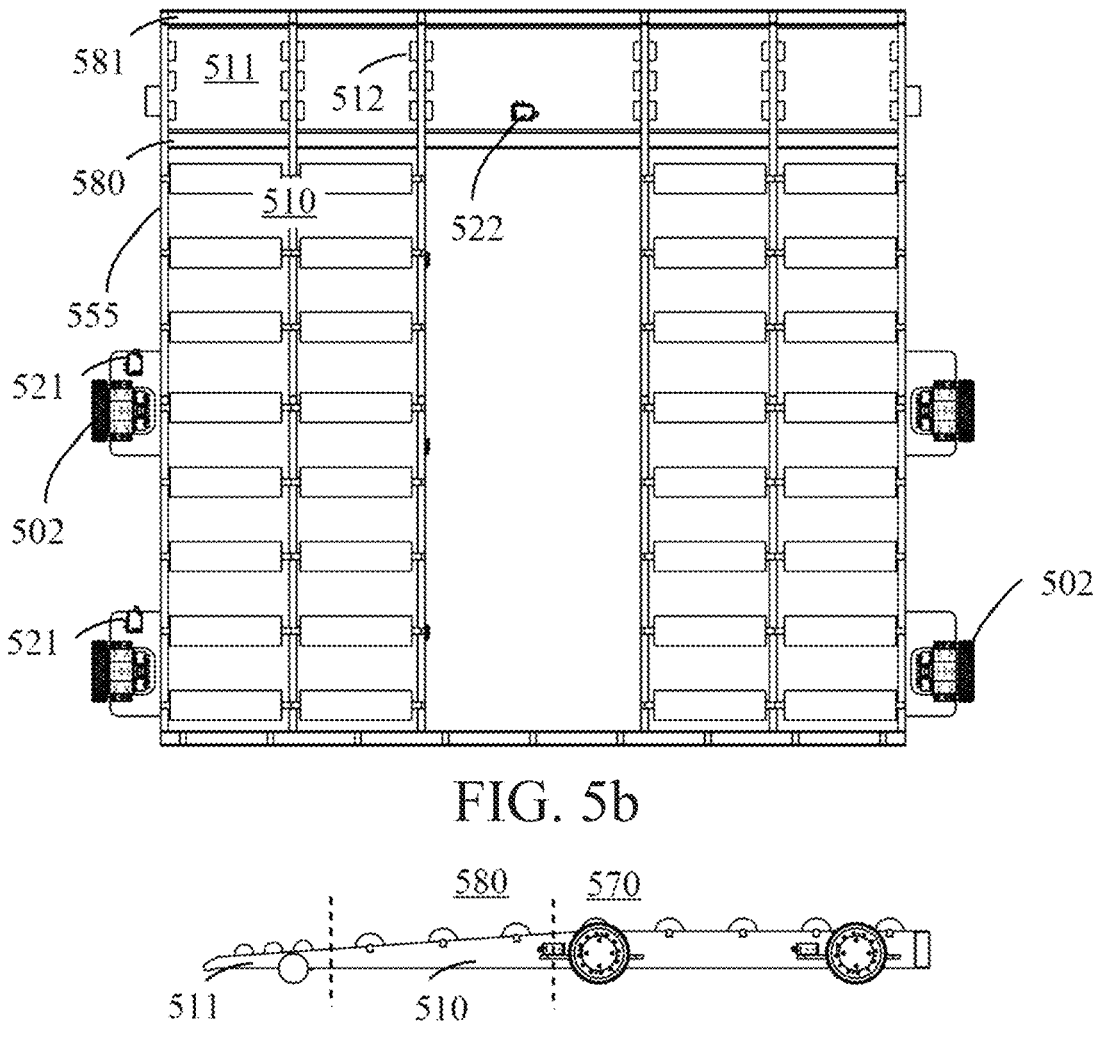

FIG. 5*a* to FIG. 5*c* show several details of a mobile vehicle 500. In some embodiments, the mobile vehicle 500 is another type of mobile vehicle of the plurality of mobile vehicles 300. As shown in FIG. 5*a* and shown in FIG. 22 to FIG. 29, the mobile vehicle 500 may include a main body. The main body of the mobile vehicle 500 may include a frame 501. It should be understood that the "main body" herein refers to a macroscopically main part of the mobile vehicle 500, rather than a particular component. The mobile vehicle 400 and the mobile vehicle 500 may have a similar structure, but are not completely the same. In some embodiments, reference may be made to the mobile vehicle 400 for a partial structure of the mobile vehicle 500, and an arrangement manner and a function of a corresponding member. For example, a plurality of wheel assemblies 502 may refer to the plurality of wheel assemblies 402, sub-assemblies 503 may refer to the sub-assemblies 403, sensors 521 to 523 may refer to the sensors 421 to 423 respectively, and disposing manners of regions accommodating sub-assemblies 503 in the mobile vehicle 500 may refer to the disposing manners of the region 441 and the region 442. Similar parts of the mobile vehicle 400 and the mobile vehicle 500 are not described herein again.

Referring to FIG. 4*c* and FIG. 5*c*, a difference between the mobile vehicle 500 and the mobile vehicle 400 lies in that in a side view, a top surface (i.e. a surface at which the highest point of the corresponding sub-assembly 503 is located) of the mobile vehicle 500 is not horizontal, but has a gradient. This is because a corresponding beam structure of the mobile vehicle 500 has a tapered thickness. As shown in FIG. 5*c*, the frame 503 may include a main part 510 and an extension part 511. The main part 510 may include a sub-region 570 and a sub-region 580.

An outermost beam structure 555 of the frame 503, for example, extends across the length of the mobile vehicle 500. In the sub-region 570, the thickness of the beam structure 555 is unchanged. In the sub-region 580 of the main part 510, the thickness of the beam structure is tapered. In the extension part 511, the thickness of the beam structure 555 is further tapered. In this way, an inclined plane, in contact with an object, of the mobile vehicle 500 is formed at the sub-region 580 and the extension part 511. The inclined plane helps to withdraw the mobile vehicle 500 from a location below the object supported thereon.

As shown in FIG. 5*a* and FIG. 5*b*, each of the plurality of beam structures of the frame 503 extends to the extension part 511, so that the main part 510 and the extension part 511 actually form an integral structure. For the extension part 511, a wheel 569 is disposed on an outer side of the beam structure 555. The wheel disposed on the outer side of the beam structure 555 can move in cooperation with movement of the wheel assembly 502. For the extension part 511, a wheel component 571 is disposed on an inner side of the beam structure 555. The wheel component disposed on the inner side of the beam structure 555 can rotate in cooperation with rotation of the sub-assembly 503. In some embodiments, for the extension part 511, the beam structure 556 has a same arrangement manner as that of the beam structure 560. Details are not described herein again.

In some embodiments, for the extension part 511, a plurality of wheel components 571 are disposed on two sides of the beam structure 556. In some embodiments, for the extension part 511, one or more wheel components 571 are disposed on only one side of the beam structure 556.

In some embodiments, for the extension part 511, each of the beam structures 554 to 559 has a same arrangement manner as that of the beam structure 556. In some other embodiments, for the extension part 511, one or more of the beam structures 554 to 559 have a different arrangement manner from that of the beam structure 556. For example, not two sides of each of the beam structures 554 to 559 have one or more wheel components.

In some embodiments, as shown in FIG. 5*b*, the sensor 522 may be disposed on a transverse beam 580 of the main part 510 that faces the extension part 511. Although not shown in the figure, in some other embodiments, the sensor 522 may be disposed on a transverse beam 581 of the extension part 511 that faces an external space.

Figure 6:
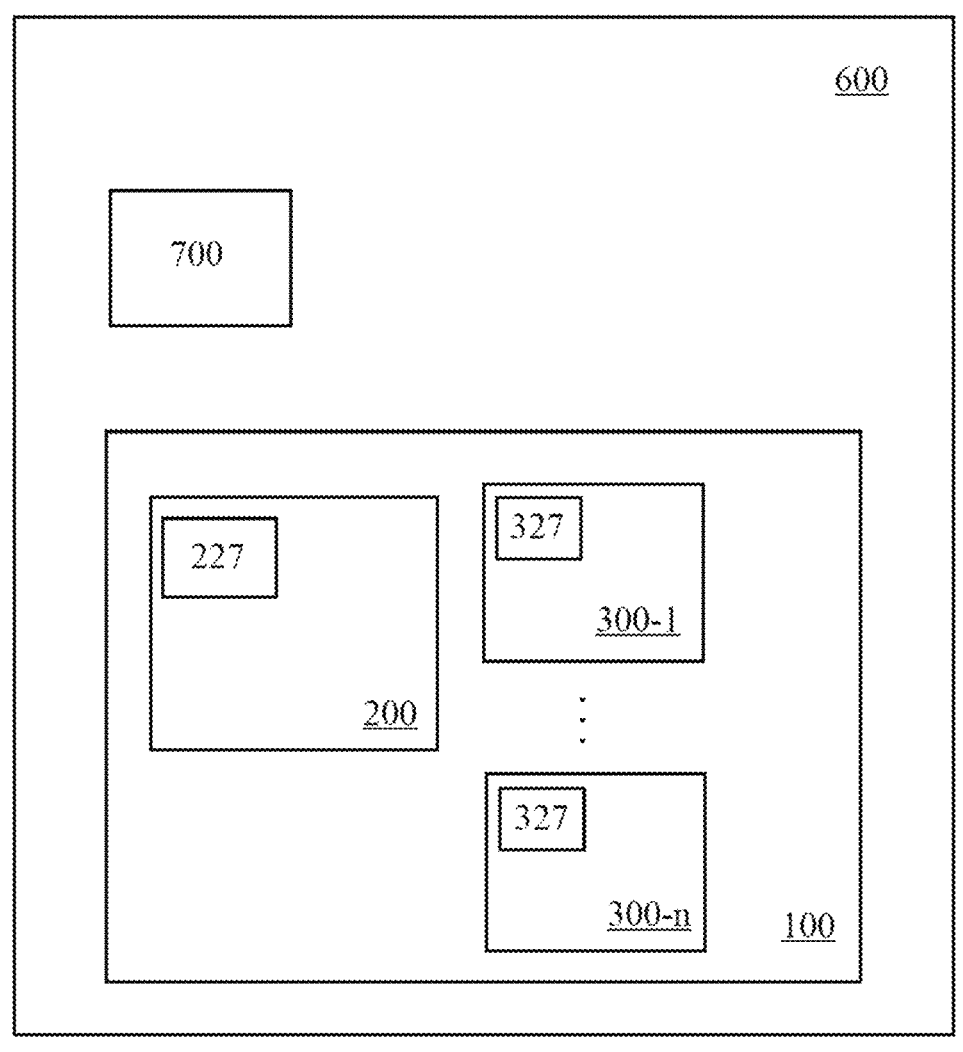
FIG. 6 is a schematic diagram of a cargo handling system according to some embodiments of the present disclosure.

A system 600 for scheduling cargoes including an autonomous mobile device 100 is described with reference to FIG. 6. As shown in FIG. 6, a mobile carrier 200 of the autonomous mobile device 100 may include a controller 227. The autonomous mobile device 100 may include mobile vehicles 300-1 to 300-*n*, where n indicates a quantity or number of vehicles. The mobile vehicles 300-1 to 300-*n* correspond to the plurality of mobile vehicles 300 mentioned above. Without departing from the essence of the present disclosure, n may be an integer greater than or equal to 1. It should be understood that in the context, when the autonomous mobile device 100 is macroscopically described, "the autonomous mobile device 100" and "the mobile carrier 200" may be mutually replaced. For example, movement of the mobile carrier 200 toward a target is movement of the autonomous mobile device 100 toward the target, control performed by the controller 227 on the mobile carrier 200 is control performed by the controller 227 on the autonomous mobile device 100, and release and withdrawal operations performed by the mobile carrier 200 on the mobile vehicle are release and withdrawal operations performed by the autonomous mobile device 100 on the mobile vehicle.

Each of the mobile vehicles 300-1 to 300-*n* may have a controller 327. The controller 227 of the autonomous mobile device 100 can communicate with the controller 327 of each mobile vehicle. In some embodiments, the controller 327 of each mobile vehicle is controlled by the controller 327 of the autonomous mobile device 100. In some other embodiments, the controller 327 is not controlled by any controller outside the mobile vehicle. With reference to the foregoing descriptions, the autonomous mobile device 100 can autonomously fulfill various tasks. In some embodiments, when not controlled by an external controller or a remote control apparatus, the autonomous mobile device 100 can autonomously recognize an object (for example, a carriage or a container of a truck). Further, the autonomous mobile device 100 can autonomously release and withdraw the mobile vehicle. In this aspect, descriptions are provided below.

The system 600 may further include a remote control apparatus 700 ("control apparatus 700" for short hereinafter). In some embodiments, the control apparatus 700 may include a central control unit. In some embodiments, the control apparatus 700 may include a server. In some embodiments, the control apparatus 700 may include a data center. In other words, the control apparatus 700 is not a part of the autonomous mobile device 100. As mentioned above, the autonomous mobile device 100 can autonomously fulfill various tasks. However, in some other embodiments, the control apparatus 700 controls various operations of the autonomous mobile device 100. Specifically, the control apparatus 700 can communicate with the controller 227 to control the mobile carrier 200. The control apparatus 700 can communicate with the controller 327, to control each of the plurality of mobile vehicles 300. It should be understood that various communications between the control apparatus

700, the controller 227, and the controller 327 may be performed by using a communication protocol and standard commonly used in the art.

In addition, although not shown in the figure, each of the control apparatus 700, the controller 227, and the controller 327 may include any possible conventional component/ module used for implementing control objectives thereof. For example, each of the control apparatus 700, the controller 227, and the controller 327 may include a storage apparatus. Each of the control apparatus 700, the controller 227, and the controller 327 may include a communication module.

Each of the control apparatus 700, the controller 227, and the controller 327 may further include one or more computer-readable storage media. In some embodiments, the one or more computer-readable storage media are non-transitory. In some embodiments, the non-transitory computer-readable medium stores instructions. When the instructions are executed by a controller (i.e. each of the control apparatus 700, the controller 227, and the controller 327), any method/ process/step described in the context of the present disclosure is implemented. For example, execution of the foregoing instructions can cause each sensor described above to obtain corresponding data and send the obtained data to a controller that expects to receive the data. In addition, execution of the foregoing instructions can cause each activation component described above to perform expected movement, for example, move the platform 203 in the vertical direction. Further, execution of the foregoing instructions can cause the mobile carrier 200 and the plurality of mobile vehicles 300 described above to move to a predetermined location. The method/process/step performed based on the instructions stored in the non-transitory computer-readable medium may include but is not limited to the method/process/step listed above. It should be understood that methods/processes/steps related to various aspects of an autonomous mobile device may be abstracted as instructions stored in a non-transitory computer-readable medium. These instructions are issued to corresponding objects in a specified instruction cycle, to finally implement various methods/ processes/steps.

In one embodiment, the non-transitory computer-readable medium is a single medium. In another embodiment, the non-transitory computer-readable medium is a set of a plurality of sub-media. The foregoing instructions include but are not limited to a computer program instruction. In some embodiments, the non-transitory computer-readable medium includes (but is not limited to) a solid-state memory, an optical medium, and a magnetic medium. In some other embodiments, the non-transitory computer-readable medium includes a read-only memory (ROM), a random access memory (RAM), an EPROM, an EEPROM, a flash component, or the like.

Figure 9A:
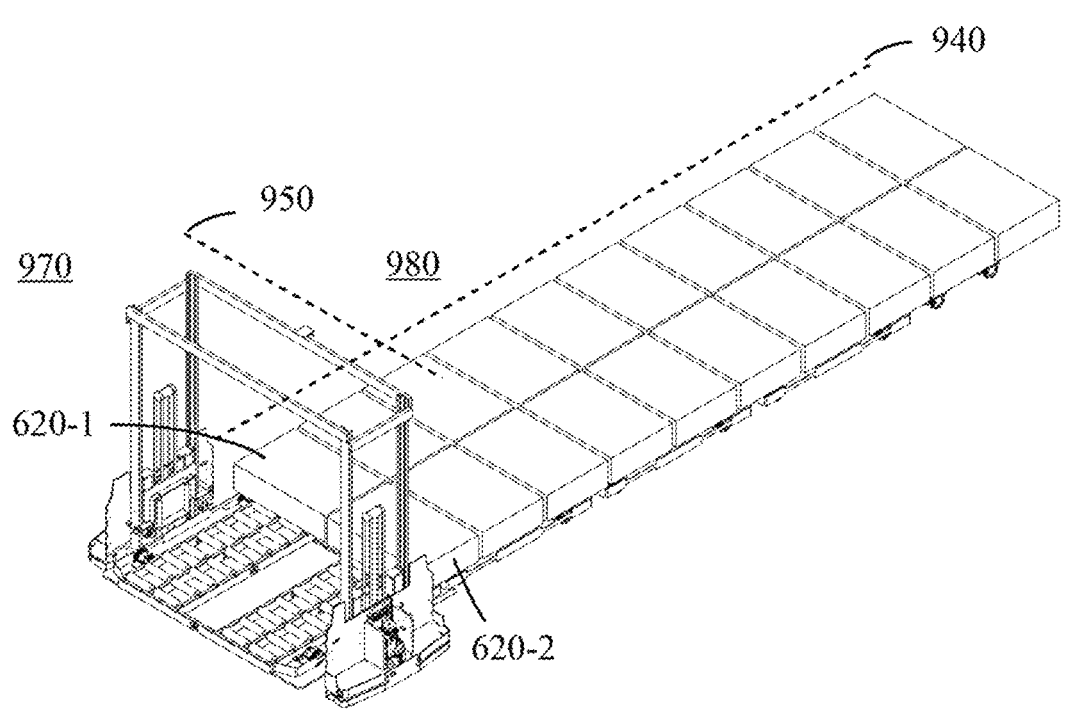
FIG. 9*a* and FIG. 9*b* are schematic diagrams of related operations after the cargo transportation shown in FIG. 8*a* and FIG. 8*b* is completed.
Figure 9B:
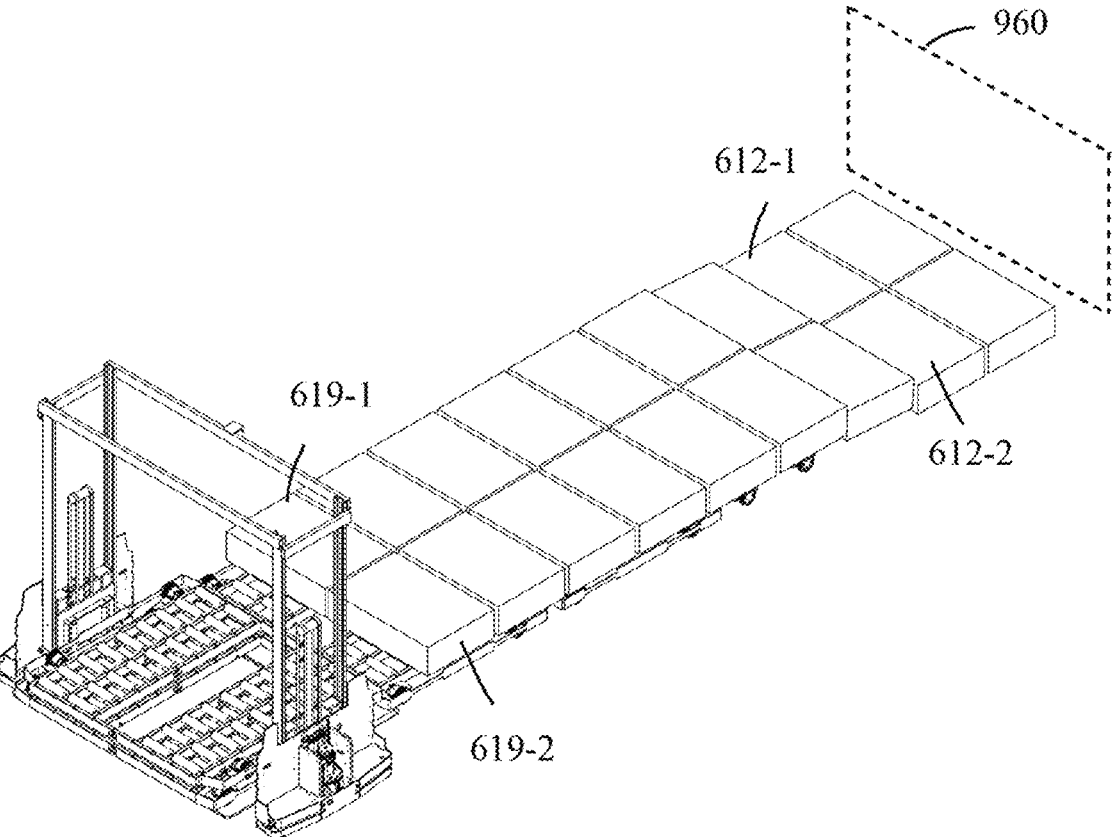

Configuration manners of the autonomous mobile device 100 in a cargo handling process are described now. It should be understood that these configuration manners are implemented based on control of the controller 227 and/or the controller 327. As discussed above, the target includes, but is not limited to, a carriage of a truck. For ease of discussion only, "carriage" is used to refer to "target" below. As the context repeatedly emphasizes, an application scenario related to the carriage is merely for ease of understanding the essence of the present disclosure, and is not intended to limit the present disclosure. Referring to FIG. 9*a* and FIG. 9*b*, the carriage is exemplarily shown by using a boundary 940 (which represents a bottom and a side wall of the carriage), a boundary 950 (which represents a top of the carriage), and a back board 960 (which represents an end of the carriage). Also referring to FIG. 9a and FIG. 9b, the carriage defines an exterior 970 and an interior 980. It should be understood that the cargo is expected to be transported from the exterior 970 to the interior 980.

Figure 7:
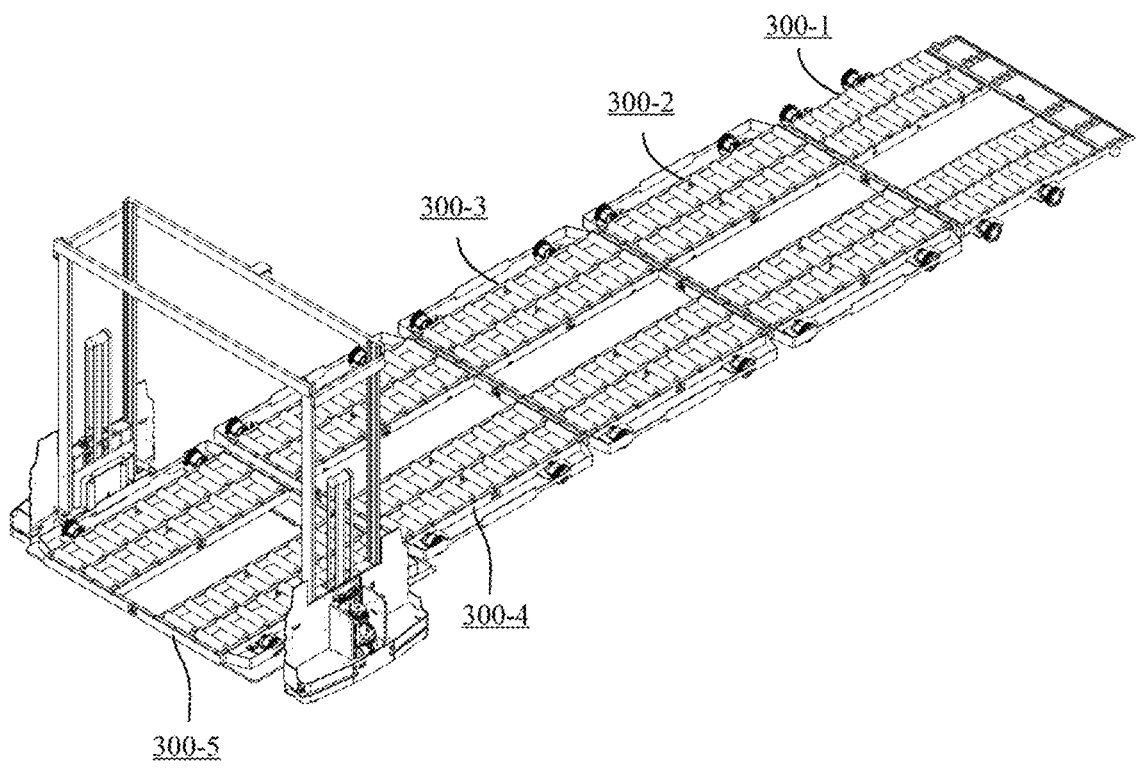
FIG. 7 is a schematic diagram of deployment of a corresponding device and apparatus shown in FIG. 1 to FIG. 5*c*.

In addition, referring to FIG. 6, the embodiment shown in FIG. 7 includes five mobile vehicles, namely a mobile vehicle 300-1 to a mobile vehicle 300-5. Referring to FIG. 4a, the mobile vehicle 300-2 to the mobile vehicle 300-5 shown in FIG. 7 may correspond to the mobile vehicle 400. Referring to FIG. 5a, the mobile vehicle 300-1 shown in FIG. 7 may correspond to the mobile vehicle 500. Referring to FIG. 1, the mobile vehicle 300-1 to the mobile vehicle 300-5 shown in FIG. 7 are stacked on the mobile carrier 200 in ascending order of numbers 1 to 5. Specifically, the mobile vehicle 300-1 is placed on the platform 203. The mobile vehicle 300-2 is placed on the mobile vehicle 300-1. The mobile vehicle 300-3 is placed on the mobile vehicle 300-2. The mobile vehicle 300-4 is placed on the mobile vehicle 300-3. The mobile vehicle 300-5 is placed on the mobile vehicle 300-4. It should be understood that the quantity of mobile vehicles shown in FIG. 7 is exemplary. In some other embodiments, the quantity of mobile vehicles may be greater than 5, or may be less than 5.

The autonomous mobile device 100 may be configured to perform an initialization operation based on a preset task. In some embodiments, the initialization operation may include determining or obtaining a map of a site in which the autonomous mobile device 100 is located. In some embodiments, the initialization operation may include determining or obtaining location coordinates of the carriage. After the initialization operation is completed, the mobile carrier 200 of the autonomous mobile device 100 may be configured to control the plurality of wheel assemblies 202 at least partially based on data of the sensor 207 to move toward the carriage. In some other embodiments, the autonomous mobile device 100 may skip the initialization process, and directly move. Specifically, during movement, the carriage is searched for while the map of the site is established at least partially based on the data of the sensor 207.

Then, after the carriage is positioned or presence of the carriage is discovered in a field of view of the autonomous mobile device 100, the mobile carrier 200 is configured to move to location A in the vicinity of the carriage at least partially based on the data of the sensor 207. At location A, the autonomous mobile device 100 (the mobile carrier 200) is aligned with the carriage.

The mobile carrier 200 is configured to determine a height difference between the platform 203 and the bottom of the carriage based on data of the sensor 218 and the data of the sensor 207. The mobile carrier 200 is configured to move to location B at least partially based on the height difference satisfying a threshold range. Location B is closer to the carriage than location A. The location of the mobile carrier 200 shown in FIG. 8a to FIG. 9b generally corresponds to location B. In one embodiment, the threshold range may be greater than or equal to approximately 10 cm. In one embodiment, the threshold range may be greater than or equal to approximately 8 cm. In one embodiment, the threshold range may be greater than or equal to approximately 12 cm.

After arriving at location B, the mobile carrier 200 is configured to drive the component 208 to place the platform 203 onto the bottom of the carriage. As described above, whether the platform 203 is correctly placed is determined based on data of the sensor 223. Specifically, the sensor 223 is configured to detect whether the second part 2032 is correctly placed to a predetermined location at the bottom of the carriage. The predetermined location enables the platform 203 and the bottom of the carriage to be generally in a same plane. It should be understood that, in this case, the mobile carrier 200 is in contact with and docked with the carriage, thereby allowing the mobile vehicle to move away from or into the mobile carrier 200 in a stable and efficient manner.

It should be understood that "location A" and "location B" mentioned above are merely for ease of describing the movement process of the autonomous mobile device 100. In some embodiments, when starting to move and arriving at location B, the autonomous mobile device 100 always keeps moving toward the carriage, and actually does not completely stop at a location (for example, location A).

After it is determined that the platform 203 is correctly placed, the mobile carrier 200 is configured to drive the first telescoping component 209 and the second telescoping component 210 at least partially based on data of the sensors 219 to 221, so that the mobile vehicle 300-1 to the mobile vehicle 300-5 are arranged into a mobile vehicle queue shown in FIG. 7. Referring to FIG. 2 and FIG. 3, the first telescoping component 209 may perform an extension motion and a retraction motion along a vertical direction. The second telescoping component 210 may perform an extension motion and a retraction motion along a horizontal direction. A telescoping direction of the first telescoping component 209 is perpendicular to a telescoping direction of the second telescoping component 210.

The first telescoping component 209 and the second telescoping component 210 may be driven to lift a combination of the mobile vehicle 300-2 to the mobile vehicle 300-5 in the vertical direction, so as to move away from the mobile vehicle 300-1. Specifically, first, the second telescoping component 210 is driven to perform the extension motion, so as to be inserted into a docking position of the mobile vehicle 300-2. Then, the first telescoping component 209 is driven to perform the extension motion, so that the combination of the mobile vehicles moves up. After it is determined that the mobile vehicle 300-1 has moved away from the main body of the mobile carrier 200 (specifically, the platform 203), the mobile carrier 200 is configured to drive the first telescoping component 209 to perform the retraction motion, so as to place the mobile vehicle 300-2 to the mobile vehicle 300-5 onto the main body of the mobile carrier 200 (specifically, the platform 203), and is configured to drive the second telescoping component 210 to perform the retraction motion, so as to be withdrawn from the docking position of the mobile vehicle 300-2. As described above, in the embodiments of the present disclosure, the quantity of mobile vehicles between the mobile vehicle 300-1 and the mobile vehicle 300-5 may be 0 to any value.

The mobile vehicle queue forms a transportation mechanism for transporting the cargoes from the exterior 970 of the carriage to the interior 980 of the carriage. After the mobile vehicles are released to form the mobile vehicle queue shown in FIG. 7, a cargo handling operation starts. It should be noted that the mobile vehicle 300-5 does not move away from the autonomous mobile device 100. In other words, in this embodiment, the mobile vehicle queue is supported or arranged on the bottom of the carriage and the platform 203 of the mobile carrier 200. In some other embodiments, the mobile vehicle queue formed by the mobile vehicle 300-1 to the mobile vehicle 300-5 may not rely on support of the platform 203. This aspect is further described below.

An operation after a mobile vehicle, for example, the mobile vehicle 300-1, moves to the interior 980 is described. It should be understood that the operations of the mobile vehicle 300-2, the mobile vehicle 300-3, and the mobile vehicle 300-4 are generally the same as the operation of the mobile vehicle 300-1. Details are not described herein again. In some embodiments, after the mobile vehicle 300-1 moves to the interior 980, the mobile vehicle 300-1 drives the sensor 521 disposed in the vicinity of the wheel assembly 502 to detect a distance between the wheel assembly and the side wall (which is represented by the boundary 940 in FIG. 9*a*) of the carriage, and a rotational speed of the wheel assembly 521 is adjusted in response to a detection result of the sensor 521. In an embodiment in which two wheel assemblies 502 on the left of the mobile vehicle 300-1 are respectively controlled by two sensors 521, the mobile vehicle 300-1 can drive the two wheel assemblies 502 at different rotational speeds based on a difference between two measurement results respectively obtained by the two sensors 521. As a result, the mobile vehicle 300-1 always runs forward in the interior 980 along a predetermined route. For example, a movement route of the mobile vehicle 300-1 is always kept in a middle region of the carriage.

While continuously obtaining a measurement result of the sensor 521, the mobile vehicle 300-1 is further configured to drive the sensor 522 to detect an object in a forward direction of the mobile vehicle 300-1, so that the mobile vehicle 300-1 keeps a predetermined distance from the object. In this embodiment, the object may be the back board 960 of the carriage. It may be understood that for the mobile vehicle 300-2, the object may be the mobile vehicle 300-1. When the mobile vehicle 300-1 detects that a distance to an object in front is less than or equal to a predetermined distance, the mobile vehicle 300-1 stops moving forward, and brakes. In one embodiment, the predetermined distance is 2 cm. In one embodiment, the predetermined distance is 1 cm. In one embodiment, the predetermined distance is 0.5 cm.

After the plurality of mobile vehicles are released, an alignment operation between the mobile vehicles may be performed at least partially based on data of the sensors of the mobile vehicles. In some embodiments, data of the sensor 421/521 and the sensor 422/522 of each mobile vehicle may be sent to at least one of the control apparatus 700 and the controller 227. In some embodiments, based on the data of the foregoing sensor, the control apparatus 700 may send a command to each mobile vehicle (for example, the command may control a rotational speed of each wheel assembly of the mobile vehicle), so that the mobile vehicles always keep a same position relationship during movement, thereby implementing alignment between the mobile vehicles. In some embodiments, based on the data of the foregoing sensor, the controller 227 may send a command to each mobile vehicle (for example, the command may control a rotational speed of each wheel assembly of the mobile vehicle), so that the mobile vehicles always keep a same location relationship during movement, thereby implementing alignment between the mobile vehicles.

In the embodiments of FIG. 7 to FIG. 9*b*, after the mobile vehicle 300-1 to the mobile vehicle 300-4 successively move to the interior 980 of the carriage in the foregoing manner, a cargo transportation process is started. In some embodiments, a cargo 611-1 and a cargo 611-2 are first placed on the mobile vehicle 300-5. Referring to FIG. 4*a* and FIG. 8*a*, a group of sub-assemblies 403 in the region 441 of the mobile vehicle 300-5 are configured to support the cargo 611-1. A group of sub-assemblies 403 in the region 442 of the mobile vehicle 300-5 are configured to support the cargo 611-2. Starting from the mobile vehicle 300-5, the cargo 611-1 and the cargo 611-2 are sequentially transported through the mobile vehicle 300-4, the mobile vehicle 300-3, and the mobile vehicle 300-2, and finally arrive at the mobile vehicle 300-1. In some embodiments, the cargo 611-1 and the cargo 611-2 may have a same size.

As described above, for the sub-assemblies of the transportation component, the mobile vehicle 300-1 to the mobile vehicle 300-5 (i.e. the mobile vehicle 400 and the mobile vehicle 500) may have a same configuration manner. Therefore, for brevity, only the reference numerals of the mobile vehicle 400 are used for description. In some embodiments, for each mobile vehicle, a rotational speed of a row of sub-assemblies 403 arranged between the beam structure 430 and the beam structure 431 may be greater than a rotational speed of a row of sub-assemblies 403 arranged between the beam structure 431 and the beam structure 432. A rotational speed of a row of sub-assemblies 403 arranged between the beam structure 434 and the beam structure 435 may be greater than a rotational speed of a row of sub-assemblies 403 arranged between the beam structure 433 and the beam structure 434. The rotational speed of the row of sub-assemblies 403 arranged between the beam structure 430 and the beam structure 431 may be substantially equal to the rotational speed of the row of sub-assemblies 403 arranged between the beam structure 434 and the beam structure 435. The rotational speed of the row of sub-assemblies 403 arranged between the beam structure 431 and the beam structure 432 may be substantially equal to the rotational speed of the row of sub-assemblies 403 arranged between the beam structure 433 and the beam structure 434. Based on the foregoing rotational speed configurations of the sub-assemblies of the transportation component, during transportation, the cargo 611-1 and the cargo 611-2 can be pressed against each other or abut against each other (to be specific, an interaction force is generated between each other), so as to prevent the cargo 611-1 and the cargo 611-2 from falling out from the mobile vehicle queue. It should be understood that the same sizes of the cargo 611-1 and the cargo 611-2 make the interaction therebetween more balanced, thereby further ensuring stability of the cargoes during the transportation.

Adapting to different operations of the mobile vehicle, the transportation component may be driven in a cargo transportation mode and a mobile vehicle withdrawal mode. Specifically, after corresponding mobile vehicles (for the embodiments of FIG. 7 to FIG. 9*b*, the mobile vehicle 300-1 to the mobile vehicle 300-4) move to the interior 980 of the carriage and form a mobile vehicle queue, all mobile vehicles (including the mobile vehicle 300-5) in the mobile vehicle queue stop moving and are braking, and then a corresponding transportation component is configured to drive in the cargo transportation mode, to sequentially transport the cargoes to the interior 980 of the carriage.

Figure 8A:
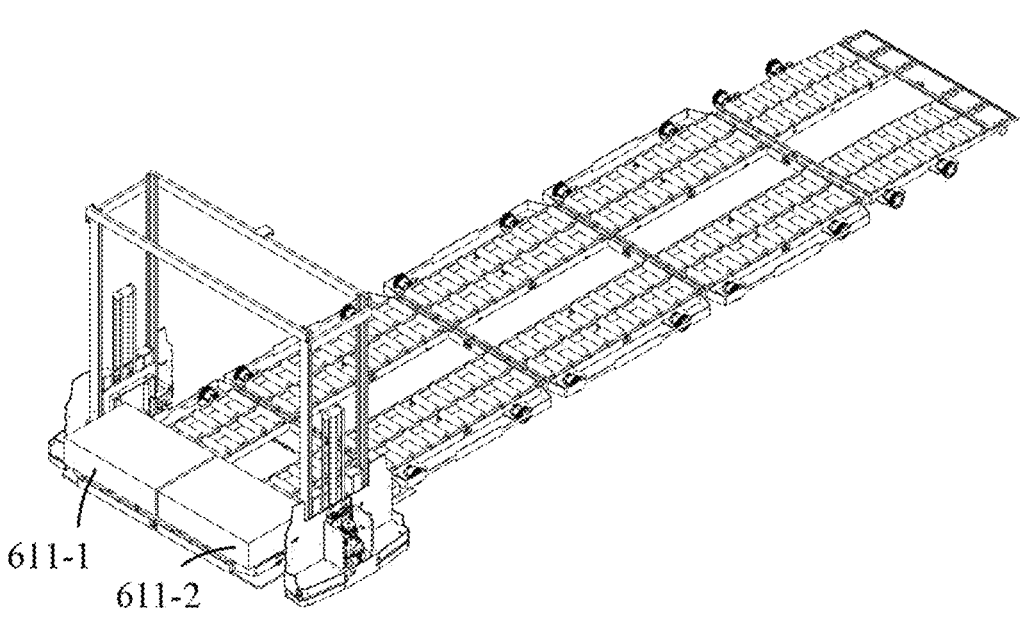
FIG. 8*a* and FIG. 8*b* are schematic diagrams of cargo transportation based on the device deployment shown in FIG. 7.
Figure 8B:
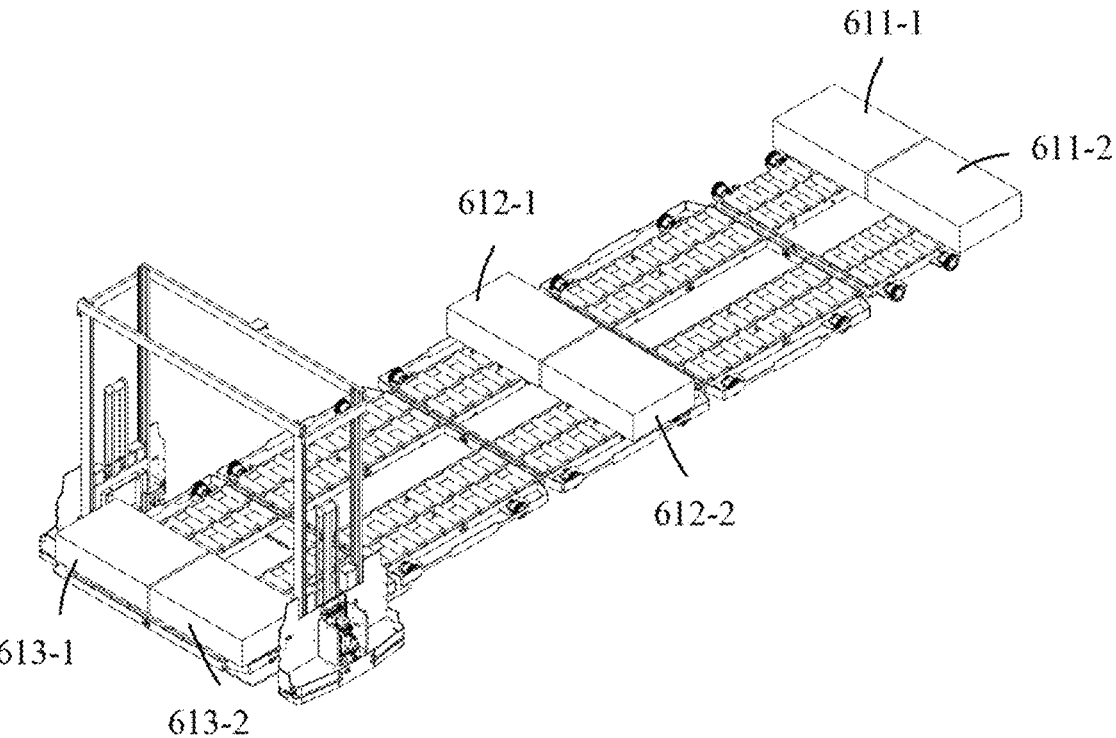

As shown in FIG. 8*b*, after the cargo 611-1 and the cargo 611-2 are transported away from the mobile vehicle 300-5, a cargo 612-1 and a cargo 612-2 are transported. After the cargo 612-1 and the cargo 612-2 are transported away from the mobile vehicle 300-5, a cargo 613-1 and a cargo 613-2 are transported. The rest can be deduced by analogy, and all cargoes are transported completely finally. After the cargo arrives at a corresponding mobile vehicle, driving of a corresponding transportation component may be stopped based on data of the sensor 423/523. In some embodiments, in response to determining that triggering of the sensor 423/523 lasts for a predetermined time, driving of the transportation component is stopped. In one embodiment, the predetermined time is 3 seconds. In another embodiment, the predetermined time is 4 seconds. In addition, in response to the sensors 423/523 of the mobile vehicle 300-1 to the mobile vehicle 300-4 being all triggered, it may be determined that the carriage is full of cargoes.

It should be understood that in a cargo queue in the interior 980 of the carriage, the cargo 611-1 and the cargo 611-2 are in front of the cargo 612-1 and the cargo 612-2, and the cargo 612-1 and the cargo 612-2 are in front of the cargo 613-1 and the cargo 613-2. In other words, the cargo 611-1 and the cargo 611-2 are closer to the back board 960 of the carriage than the cargo 612-1 and the cargo 612-2. In some embodiments, the cargo 612-1 and the cargo 612-2 have a same size. In some embodiments, the cargo 613-1 and the cargo 613-2 have a same size.

In some embodiments, one mobile vehicle may support two pairs of cargoes (four cargoes). For example, the mobile vehicle 300-1 may support the cargo 611-1, the cargo 611-2, the cargo 612-1, and the cargo 612-2. In some other embodiments, the quantity of pairs of cargoes that may be supported on one mobile vehicle is not exactly an integer. As shown in FIG. 9*a*, the mobile vehicle 300-1 to the mobile vehicle 300-4 may support ten pairs of cargoes in total (to be specific, a result of dividing ten by four is not an integer). It should be understood that a quantity of cargoes that can be supported by one mobile vehicle may be adjusted or changed according to a requirement (for example, depending on a size of the cargo) without departing from the essence of the present disclosure. In addition, the quantities of cargoes shown in FIG. 9*a* and FIG. 9*b* are merely exemplary. For ease of showing, cargoes 620-1 and 620-2 shown in FIG. 9*a* are omitted in FIG. 9*b*.

As described above, in some embodiments, the cargo 611-1 and the cargo 611-2 form a pair of cargoes. In some other embodiments, a single cargo is transported to the interior 980 of the carriage by using the mobile vehicle 300-1 to the mobile vehicle 300-5. In one embodiment, a width value of the single cargo may be less than half of a width value of the mobile vehicle. In one embodiment, the width value of the single cargo may be greater than half of the width value of the mobile vehicle and less than the width value of the mobile vehicle. In one embodiment, the width value of the single cargo may be substantially equal to the width value of the mobile vehicle. In one embodiment, a length value of the single cargo may be less than half of a length value of the mobile vehicle. In one embodiment, the length value of the single cargo may be greater than half of the length value of the mobile vehicle and less than the length value of the mobile vehicle. In one embodiment, the length value of the single cargo may be substantially equal to the length value of the mobile vehicle.

As shown in FIG. 9*b*, after it is determined that there is no cargo to be transported, the autonomous mobile device 100 is configured to withdraw the mobile vehicle 300-1 to the mobile vehicle 300-4 to the mobile carrier 200. A sequence of steps in the process of withdrawing the mobile vehicle may be considered as a reverse sequence of the sequence of steps in the process of releasing the mobile vehicle. An example in which the mobile vehicle 300-1 is withdrawn is used. The mobile carrier 200 is configured to drive the first telescoping component 209 to perform an extension motion and drive the second telescoping component 210 to perform an extension motion, so as to lift the combination of the mobile vehicle 300-2 to the mobile vehicle 300-5 away from the platform 203 in the vertical direction. After it is determined, based on the sensor 222, that the mobile vehicle

300-1 is withdrawn to the platform 203, the first telescoping component 209 is driven to perform a retraction motion, so as to place the combination of the mobile vehicle 300-2 to the mobile vehicle 300-5 on the mobile vehicle 300-1. Then, the second telescoping component 210 is driven to perform a retraction motion, thereby withdrawing the second telescoping component 210. It may be understood that in a process of releasing and withdrawing the mobile vehicle queue, the mobile vehicle 300-1 first moves away from the mobile carrier 200 and finally moves into (withdrawn into) the mobile carrier 200.

In a process of withdrawing the mobile vehicle, the mobile vehicle is configured to drive the transportation component in the mobile vehicle withdrawal mode. The rotational speed of the transportation component is matched with the rotational speed of the wheel assembly of the mobile vehicle, to allow the mobile vehicle to move away from the interior 980 of the carriage without lateral displacement between the cargo on the mobile vehicle and the bottom of the carriage. After the process of withdrawing the mobile vehicles is completed, all the mobile vehicles are stored on the autonomous mobile device 100, and all the cargoes are retained in the interior 980 of the carriage.

Various methods/processes/steps for controlling the autonomous mobile device 100 are described with reference to FIG. 7 to FIG. 9*b* and FIG. 10 to FIG. 12. As mentioned above, the control apparatus 700, the controller 227 of the mobile carrier 200 of the autonomous mobile device 100, and the controller 327 of each of the plurality of mobile vehicles 300 of the autonomous mobile device 100 can execute program instructions, to implement one or more of these methods/processes/steps. For ease of description only, an "object" transported by using the autonomous mobile device 100 below is represented as a "cargo", and a "destination" of the object is represented as a "carriage". As the foregoing repeatedly emphasizes, the objects to which the present disclosure is applicable are not limited to only the cargo and the carriage, and the application scenario to which the present disclosure is applicable is not limited to only unmanned warehousing and handling.

In addition, the assemblies in the present disclosure can exchange data, signals, messages, information, and the like. Therefore, unless otherwise specified, "data", "signal", "message", and "information" mentioned below may be mutually replaced. In an embodiment in which a communication module is integrated in a controller, communication between a central control device, an autonomous mobile device, and a mobile vehicle is communication between controllers (for example, communication between the control apparatus 700, the controller 227, and the controller 327). In an embodiment in which the communication module is not integrated in the controller, communication between the central control device, the autonomous mobile device, and the mobile vehicle is communication between transceivers. For ease of description, the communication between controllers or the communication between transceivers is generalized as the communication between central control device, the autonomous mobile device, and the mobile vehicle.

In addition, although various methods/processes/steps of the present disclosure are described below in a corresponding sequence, the sequence is merely for ease of understanding by a reader, and the various methods/processes/steps of the present disclosure are not limited thereto. The methods/processes/steps of the present disclosure can be arranged and combined in an expected sequence in any manner without departing from the essence of the present disclosure.

In an application scenario of cargo handling, the cargo needs to be transferred from an initial location to finally arrive at the carriage of the truck. In some embodiments, an entire handling process of the cargo may be implemented based on scheduling of a central control unit (for example, the control apparatus 700 mentioned above).

Figure 10:
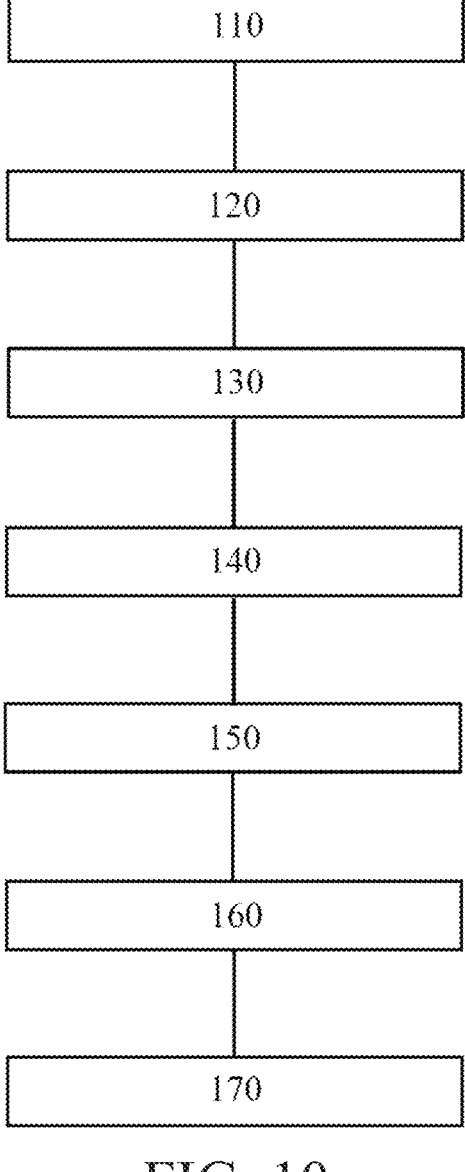
FIG. 10 is a flowchart of a method/process/step according to some embodiments of the present disclosure.

Referring to a flowchart shown in FIG. 10, at block 110, the control apparatus 700 may receive data from a truck position sensor in a site. Specifically, when a truck has stopped at a parking space designated for the truck (in other words, the truck is ready), the truck position sensor is triggered to send data to the control apparatus 700. In some other embodiments, the control apparatus 700 may periodically send a message to the truck position sensor to inquire whether a truck stops at a parking space. In response to receiving the message, the truck position sensor reports to the control apparatus 700 whether a truck is detected, and sends a detection result to the control apparatus 700.

In response to determining that the truck is ready, the control apparatus 700 may determine whether the autonomous mobile device 100 is idle (in other words, is ready for operation). Specifically, the control apparatus 700 may send a message to the autonomous mobile device 100, to inquire whether the autonomous mobile device 100 is in an idle state. The autonomous mobile device 100 sends a message to the control apparatus 700 to indicate whether the autonomous mobile device is idle.

In response to the message received from the autonomous mobile device 100 indicating that the autonomous mobile device 100 is occupied, the control apparatus 700 may suspend execution of a scheduling command for the autonomous mobile device 100, until the control apparatus 700 determines that the autonomous mobile device 100 is in an idle state. In some embodiments, if the autonomous mobile device 100 is occupied (i.e., not idle), the autonomous mobile device 100 can add data to the message, to further indicate an expected time in which the autonomous mobile device 100 is changed to an idle state. After the expected time expires, the scheduling command for the autonomous mobile device 100 can be initiated without further inquiring the autonomous mobile device 100. After receiving the scheduling command, the autonomous mobile device 100 determines, based on a current state, whether to immediately execute the scheduling command, or to delay executing the scheduling command. This manner can further save communication costs and improve scheduling efficiency. In some other embodiments, before determining that the truck is ready, the control apparatus 700 may first determine whether the autonomous mobile device 100 is ready. In other words, two sub-steps at block 110 may be exchanged with each other, and there is no fixed sequence.

In response to the message received from the autonomous mobile device 100 indicating that the autonomous mobile device 100 is idle, at block 120, the control apparatus 700 sends a scheduling command to the autonomous mobile device 100, so that the autonomous mobile device 100 moves to location A toward the carriage. In some embodiments, the autonomous mobile device 100 can be configured with the sensor 207 to obtain corresponding data. In one embodiment, the corresponding data includes point cloud data. In another embodiment, the corresponding data includes image data. The sensor 207 can send the obtained corresponding data to the controller 227 of the mobile carrier 200 of the autonomous mobile device 100 in real time. At least partially based on the corresponding data, the autonomous mobile device 100 can plan a path to the carriage. Based on the foregoing path, the autonomous mobile device 100 further drives the wheel assembly 202 to move toward the carriage.

In some other embodiments, the autonomous mobile device 100 may be controlled without participation of the control apparatus 700. Specifically, in an embodiment in which the control apparatus 700 is not present, in response to determining that the autonomous mobile device is in an idle state, the autonomous mobile device 100 may actively communicate with the truck position sensor to request data thereof. Based on the requested data indicating that there is a truck needing to handle cargoes, the autonomous mobile device 100 navigates to the vicinity of the truck (for example, moves to location A) at least partially based on data of the sensor 207.

At least partially based on the data from the sensor 207, the autonomous mobile device 100 completes an alignment operation with the carriage at location A. After the foregoing alignment operation is completed, the autonomous mobile device 100 may send, to the control apparatus 700, a message indicating that the alignment operation has been completed. In some embodiments, after receiving the foregoing message, the control apparatus 700 sends a further command to notify the autonomous mobile device 100 whether a subsequent operation may be performed. In an embodiment in which the control apparatus 700 is not present, the autonomous mobile device 100 may autonomously perform a subsequent operation (for example, an operation at block 130).

At block 130, based on control of the controller 227 and the data from the sensor 207, the autonomous mobile device 100 can further move from location A to location B. At location B, the autonomous mobile device 100 may start to perform an operation of docking the platform 203 of the mobile carrier 200 with the carriage. After the foregoing docking operation is completed, the autonomous mobile device 100 may send, to the control apparatus 700, a message indicating that the docking operation has been completed. In some embodiments, after receiving the foregoing message, the control apparatus 700 sends a further command to notify the autonomous mobile device 100 whether a subsequent operation may be performed. In an embodiment in which the control apparatus 700 is not present, the autonomous mobile device 100 may autonomously perform a subsequent operation (for example, an operation at block 140).

At block 140, after the docking operation is completed, the mobile carrier 200 of the autonomous mobile device 100 may start to perform a release operation of the mobile vehicle.

Operations performed in a process in which the autonomous mobile device 100 starts to move and arrives at location B are described in detail (referring to block 120 and block 130). The autonomous mobile device 100 may start to move toward the carriage. Meanwhile, the autonomous mobile device 100 can determine whether a space in the vicinity of the carriage, originally used for accommodating the autonomous mobile device 100, is occupied (for example, occupied by an obstacle or another autonomous mobile device). In some embodiments, the autonomous mobile device 100 determines, at least partially based on the data from the sensor 207, whether the space is occupied. In some other embodiments, the autonomous mobile device 100 can communicate with a sensor in the vicinity of the space to obtain data indicating whether the space is occupied. In response to determining that the space is not occupied, the controller 227 does not adopt control logic, so as not to interfere with movement of the autonomous mobile device 100.

In some embodiments, in response to determining that the space is occupied, the autonomous mobile device 100 sends, to the control apparatus 700, a message indicating that the space is occupied (in an embodiment in which the control apparatus 700 is not present, this step may be omitted). The controller 227 may adopt control logic to cause the autonomous mobile device 100 to return to a predetermined location. The predetermined location includes, but is not limited to, an initial location of the autonomous mobile device 100 or a vacancy around a site.

In some other embodiments, in response to determining that the space is occupied, the controller 227 adopts control logic to pause movement of the autonomous mobile device 100. In an embodiment in which the control apparatus 700 is present, the autonomous mobile device 100 sends, to the control apparatus 700, a message indicating that the space is occupied. In response to receiving the message, the control apparatus 700 retrieves a control list of the control apparatus to attempt to determine an identity of an object occupying the space. In response to that the identity of the object cannot be determined, the control apparatus 700 sends a command to the autonomous mobile device 100, so that the autonomous mobile device 100 returns to a predetermined location. In response to that the identity of the object may be determined, the control apparatus 700 sends a command to the object to indicate that the object moves away from the space occupied by the object. In response to receiving, from the object, a confirmation message indicating that the object has been away from the space, the control apparatus 700 sends a command to the autonomous mobile device 100, so as to cause the autonomous mobile device 100 to resume moving.

In an embodiment in which the control apparatus 700 is not present, the autonomous mobile device 100 can autonomously attempt to determine an identity of an object occupying the space, and attempt to communicate with the object. If communication cannot be established, the autonomous mobile device 100 autonomously returns to the predetermined location. If communication may be established, the autonomous mobile device 100 sends a message of moving away from the space to the object. In response to receiving, from the object, a confirmation message indicating that the object has been away from the space, the autonomous mobile device 100 resumes moving.

In some embodiments, in a process in which the autonomous mobile device 100 moves toward the carriage, the autonomous mobile device 100 can determine a location of the carriage and control the wheel assembly 202 at least partially based on the data from the sensor 207, to continuously adjust an offset between the autonomous mobile device 100 and the carriage. As a result, when at location A, the autonomous mobile device 100 may be aligned with the carriage (i.e. the location of the carriage), thereby completing an alignment operation. Specifically, a centerline of the autonomous mobile device 100 may be aligned with a centerline of the carriage. This lays a foundation for subsequent release and movement of the mobile vehicle.

After the autonomous mobile device 100 arrives at location A, the autonomous mobile device 100 can determine a height of the platform 203 at least partially based on the data from the sensor 218. In addition, the autonomous mobile device 100 can determine a height of the carriage at least partially based on the data from the sensor 207. After determining the height of the platform 203 and the height of the carriage, the autonomous mobile device 100 can determine, by using the controller 227, whether a height difference between the two heights satisfies a threshold range (i.e. whether the height difference is within the threshold range). In response to determining that the height difference satisfies the threshold range, the autonomous mobile device 100 further moves to location B at least partially based on the data from the sensor 207. In response to determining that the height difference does not satisfy the threshold range, the controller 227 sends a command to the component 208. In response to receiving the command, the component 208 drives the platform 203 to move up until the height difference satisfies the threshold range. Location B is closer to the carriage than location A. The location of the mobile carrier 200 shown in FIG. 8a to FIG. 9b generally corresponds to location B. In one embodiment, the threshold range may be greater than or equal to approximately 10 cm. In one embodiment, the threshold range may be greater than or equal to approximately 8 cm. In one embodiment, the threshold range may be greater than or equal to approximately 12 cm.

At block 130, before arriving at location B, the autonomous mobile device 100 determines a distance between the autonomous mobile device 100 and the carriage at least partially based on the data from the sensor 207. In some other embodiments, the autonomous mobile device 100 determines the distance between the autonomous mobile device 100 and the carriage at least partially based on data from a sensor at a site. In some other embodiments, the autonomous mobile device 100 determines the distance between the autonomous mobile device 100 and the carriage at least partially based on data from a sensor at the carriage. Once the autonomous mobile device 100 determines that the distance is less than or equal to a predetermined distance, the autonomous mobile device stops at location B. In one embodiment, the predetermined distance is 5 cm. In another embodiment, the predetermined distance is 3 cm.

In response to determining that the autonomous mobile device 100 stops at location B, the controller 227 sends a command to the component 208. In response to receiving the command, the component 208 drives the platform 203 to move down until the platform 203 is docked with (in direct contact with) the bottom of the carriage. In some embodiments, in a process of moving down, when the platform 203 is in contact with the bottom of the carriage at a specified location, the sensor 223 is triggered, so as to send data indicating triggering to the controller 227. In response to receiving the data, the mobile carrier 200 of the autonomous mobile device 100 stops driving the component 208, so as to complete a docking operation between the autonomous mobile device 100 and the carriage.

It should be understood that "location A" and "location B" mentioned above are merely for ease of describing the movement process of the autonomous mobile device 100. In some embodiments, when starting to move and arriving at location B, the autonomous mobile device 100 always keeps moving toward the carriage, and actually does not completely stop at a location (for example, location A).

At block 140, after the docking operation is completed, the autonomous mobile device 100 may start to perform a release operation of the mobile vehicle, so that one or more of the mobile vehicle 300-1 to the mobile vehicle 300-5 are released from the autonomous mobile device 100. As mentioned above, the number/quantity of mobile vehicles is merely exemplary. The solution of the present disclosure may be applicable to any expected quantity of mobile vehicles. In the embodiment of FIG. 7, five mobile vehicles may be stacked on the autonomous mobile device 100. In some other embodiments, two mobile vehicles may be stacked on the autonomous mobile device 100. In some other embodiments, three mobile vehicles may be stacked on the autonomous mobile device 100. Referring to FIG. 7 and FIG. 9*a*, after the mobile vehicle 300-1 to the mobile vehicle 300-4 move to the interior 980 of the carriage, the mobile vehicle 300-5 stays on the platform 203. In this case, the mobile vehicle 300-1 to the mobile vehicle 300-5 form a transportation mechanism for transporting the cargo from the exterior 970 of the carriage to the interior 980 of the carriage. In an embodiment in which there are only two mobile vehicles, one mobile vehicle moves to the interior 980, and the other mobile vehicle stays on the platform 203 (or stays on the exterior 970). In this case, the two mobile vehicles form the foregoing transportation mechanism. It should be understood that, regardless of the quantity of mobile vehicles, when the mobile vehicles are unfolded to span the exterior 970 and the interior 980, the mobile vehicles form the foregoing transportation mechanism.

At block 150, in response to determining that all the mobile vehicles (for example, the mobile vehicle 300-1 to the mobile vehicle 300-4) requiring to be released are released, a cargo transportation operation is started. In some embodiments, after each mobile vehicle moves to the interior of the carriage and has stopped moving, the mobile vehicle may send, to the control apparatus 700, a message indicating that the mobile vehicle has stopped moving. After the release operation of the mobile vehicle is completed, based on data of the sensor 423 of the mobile vehicle 300-5, the autonomous mobile device 100 can determine whether the autonomous mobile device is in a vacant state (to be specific, the autonomous mobile device 100 is ready to receive a cargo), and generate a message indicating whether the autonomous mobile device is in the vacant state. Then, the autonomous mobile device 100 may send the message to the control apparatus 700. In response to determining, based on the message, that the autonomous mobile device 100 is in the vacant state, the control apparatus 700 sends an instruction including a task package to a material handling apparatus (for example, a forklift, not shown). After receiving the task package, the material handling apparatus may determine cargo handling information. In one embodiment, the cargo handling information indicates a quantity of cargoes to be handled by the material handling apparatus. In another embodiment, the cargo handling information indicates a quantity of handling operations to be performed by the material handling apparatus.

In an embodiment in which the control apparatus 700 is not present, the autonomous mobile device 100 can receive, from the mobile vehicle, a message indicating that the mobile vehicle has stopped moving. In response to receiving the message from all the released mobile vehicles, the autonomous mobile device 100 can send an instruction to the material handling apparatus, so as to cause the material handling apparatus to handle a cargo.

After the material handling apparatus confirms the cargo handling information, the material handling apparatus handles the cargo from an initial location of the cargo to a region in the vicinity of the autonomous mobile device 100. In some embodiments, the control apparatus 700 (or the autonomous mobile device 100) can send the task package to one or more material handling apparatuses, and cargo handling information for each material handling apparatus may be different. In other words, in an embodiment in which a plurality of material handling apparatuses are present, each material handling apparatus handles different parts of a batch of cargoes. In an embodiment in which the control apparatus 700 is present, when a plurality of material handling apparatuses handle respective cargoes in the vicinity of the autonomous mobile device 100, the plurality of material handling apparatuses may stop operations and send a request for cargo placement to the control apparatus 700. In response to receiving the request, the control apparatus 700 determines whether to send a command to a corresponding material handling apparatus. The command may include a permission for the cargo placement. After the permission is obtained, the plurality of material handling apparatuses may place the cargoes on the mobile vehicle 300-5 on the platform 203. The mobile vehicle 300-1 to the mobile vehicle 300-5 form a transportation mechanism that transports the cargoes from the exterior of the carriage to the interior of the carriage.

In some embodiments, the control apparatus 700 sorts, based on a request from each material handling apparatus, a cargo placement sequence. The permission sent to each material handling apparatus may include the foregoing placement sequence. Next, each material handling apparatus performs a cargo placement operation based on the foregoing placement sequence. Such a manner may enable a scheduler to update a state of each material handling apparatus at a node closest to the cargo placement operation, thereby avoiding congestion of the cargo placement operation caused by an emergency.

In some other embodiments, the cargo placement sequence is included in the task package. After parsing the task package, each material handling apparatus may learn a specific sequence. Therefore, in these embodiments, before performing the cargo placement operation, the material handling apparatus does not communicate with the scheduler, but directly places the cargo on the mobile vehicle 300-5.

In an embodiment in which the control apparatus 700 is not present, a plurality of material handling apparatuses may send a request for cargo placement to the autonomous mobile device 100. In response to receiving the request, the autonomous mobile device 100 may send a command to a corresponding material handling apparatus. The command may include a permission for the cargo placement. The autonomous mobile device 100 may determine a cargo placement sequence of each material handling apparatus.

When determining that no cargo needs to be handled, the material handling apparatus may return to an initial location (for example, a rest area or a workstation) of the material handling apparatus. In some embodiments, the material handling apparatus may return to the initial location of the material handling apparatus based on that a counter of the material handling apparatus reaches a quantity of cargoes to be handled by the material handling apparatus, which is indicated by the cargo handling information. In some other embodiments, the material handling apparatus may return to the initial location of the material handling apparatus based on that the counter of the material handling apparatus reaches a quantity of handling operations to be performed by the material handling apparatus, which is indicated by the cargo handling information. After the material handling apparatus has returned to the initial location of the material handling apparatus, the material handling apparatus may send, to the control apparatus 700, a message indicating that the task has been fulfilled. In an embodiment in which the control apparatus 700 is not present, the material handling apparatus may send, to the autonomous mobile device 100, a message indicating that the task has been fulfilled.

In some other embodiments, after the counter reaches the foregoing quantity, the material handling apparatus may send a request for returning to the initial location to the control apparatus 700. Based on the foregoing request, the control apparatus 700 may determine whether the material handling apparatus has fulfilled a predetermined task, or determine whether there is no additional task that needs to be fulfilled by the material handling apparatus. When the foregoing determining is "true", the control apparatus 700 may send a command to the material handling apparatus. The command may include a permission for returning to the initial location. In an embodiment in which the control apparatus 700 is not present, the autonomous mobile device 100 may send the foregoing command to the material handling apparatus.

At block 160, in response to determining that all the cargoes have been transported to the interior of the carriage, the mobile vehicle 300-1 to the mobile vehicle 300-4 may move away from the carriage, and then be withdrawn to the autonomous mobile device 100. In some embodiments, based on the data of the sensor 423 on each of the mobile vehicle 300-1 to the mobile vehicle 300-4 indicating that a cargo is present, and based on the data of the sensor 423 on the mobile vehicle 300-5 indicating that a cargo is not present, the autonomous mobile device 100 may send, to the control apparatus 700, a message indicating that the cargo is completely transported. Based on the foregoing message, and based on determining that tasks of all the material handling apparatuses have been fulfilled, the control apparatus 700 may send a command to the autonomous mobile device 100 and the mobile vehicle 300-1 to the mobile vehicle 300-4 to start a withdrawal operation of the mobile vehicles. In an embodiment in which the control apparatus 700 is not present, after it is determined that a cargo is present in each of the mobile vehicle 300-1 to the mobile vehicle 300-4 and a cargo is not present in the mobile vehicle 300-5, the autonomous mobile device 100 may autonomously start a withdrawal operation of the mobile vehicle.

At block 170, after it is determined that all the mobile vehicles are withdrawn to the autonomous mobile device 100 (i.e. after being stacked on the platform 203), the autonomous mobile device 100 may send a request for returning to a predetermined location to the control apparatus 700. In response to determining that there is no additional task for the autonomous mobile device 100, the control apparatus 700 may send a permission for returning to a predetermined location to the autonomous mobile device 100. The predetermined location may include, but is not limited to, an initial location of the autonomous mobile device 100 or another location in a site. In an embodiment in which the control apparatus 700 is not present, the autonomous mobile device 100 may autonomously return to the predetermined location. In some embodiments, in response to determining that all the material handling apparatuses have moved away from a region in which the autonomous mobile device 100 is located, the autonomous mobile device 100 may autonomously move away from the carriage, and then return to the predetermined location.

In the methods/processes/steps in block 110 to block 170, the autonomous mobile device 100, the mobile vehicle 300-1 to the mobile vehicle 300-5, and the material handling apparatus can send a message reporting an abnormal event to the control apparatus 700. In response to receiving the message, the control apparatus 700 sends a command to a corresponding object to deal with the abnormal event. In some embodiments, the abnormal event may include, but is not limited to, abnormal triggering of various sensors, abnormal movement of various components, failure of the autonomous mobile device, the mobile vehicle, and the material handling apparatus to complete predetermined operations thereof, and the like. In an embodiment in which the control apparatus 700 is not present, the mobile vehicle 300-1 to the mobile vehicle 300-5 and the material handling apparatus can send the message reporting the abnormal event to the autonomous mobile device 100, and the autonomous mobile device 100 can autonomously determine a solution of the event.

Figure 11:
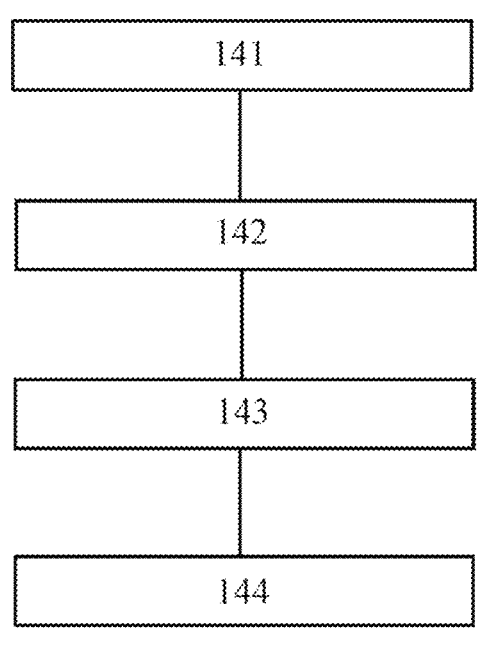
FIG. 11 is a flowchart of block 140 shown in FIG. 10.

FIG. 11 further shows a method/process/step at block 140. In some embodiments, after the autonomous mobile device 100 arrives at location B described above, the flowchart may proceed to block 141. With reference to FIG. 1, FIG. 3, and FIG. 7, the mobile carrier 200 can lift (i.e. lift in a vertical direction) one mobile vehicle to be away from another mobile vehicle. After the another mobile vehicle moves away from the mobile carrier 200, the mobile vehicle is placed down to a predetermined location. In some embodiments, the predetermined location may include the platform 203.

Referring to FIG. 7, descriptions are provided by using a non-restrictive embodiment in which only the mobile vehicle 300-5 and the mobile vehicle 300-1 are stacked on the mobile carrier 200. At block 141, the mobile carrier 200 can drive the second telescoping component 210 to perform an extension motion, so as to be inserted into a docking position of the mobile vehicle 300-5. As repeatedly described above, an operation at block 141 may be performed in response to a command from the control apparatus 700, or may be performed autonomously by the mobile carrier 200. Based on data of the sensor 220 and the sensor 221, the mobile carrier 200 can determine whether the second telescoping component 210 is correctly inserted and whether the second telescoping component is correctly withdrawn. In some embodiments, when the second telescoping component 210 performs the extension motion to be inserted into the docking position and arrives at a predetermined insertion location, the sensor 220 is triggered, to send data indicating triggering to the controller 227. At block 142, in response to receiving the data, the mobile carrier 200 drives the first telescoping component 209 to perform the extension motion, so as to lift the mobile vehicle 300-5.

During lifting the mobile vehicle 300-5, the sensor 219 may continuously detect a height of the mobile vehicle 300-5 being lifted, and continuously send data indicating the height to the controller 227. In response to the received data indicating that the mobile vehicle 300-5 is lifted to a predetermined height, the mobile carrier 200 stops driving the first telescoping component 209 (i.e. stops the extension motion thereof), and the mobile carrier 200 can send a command to the mobile vehicle 300-1 to allow the mobile vehicle 300-1 to move away from the mobile carrier 200. The mobile vehicle 300-5 may be lifted to be completely separated from the mobile vehicle 300-1. Then, the mobile vehicle 300-1 may be allowed to move away from the mobile carrier 200. It may be understood that, regardless of a quantity of mobile vehicles stacked on the mobile carrier 200, after the lowermost mobile vehicle and other mobile vehicles above the mobile vehicle are changed from a stacked state to a separated state, the lowermost mobile vehicle may be allowed to move away from the mobile carrier.

After a command indicating that the mobile vehicle may move away from the autonomous mobile device 100 is received from the control apparatus 700 (or the controller 227), the controller 327 of the mobile vehicle 300-1 may drive wheel assemblies thereof, so that the mobile vehicle 300-1 moves away from the mobile carrier 200 of the autonomous mobile device 100. The sensor 222 of the mobile carrier 200 may be configured to acquire data, and then the sensor 222 may send the data to the control apparatus 700 (or the controller 227). Based on the data, the control apparatus 700 or the controller 227 may determine that the mobile vehicle 300-1 has moved away from the predetermined location of the mobile carrier 200. At block 143, after the foregoing determining is obtained, the mobile carrier 200 can drive the first telescoping component 209 to perform a retraction motion, so as to place the mobile vehicle 300-5 at the predetermined location.

At block 144, at least partially based on data from the sensor 219, the mobile carrier 200 can determine that the mobile vehicle 300-5 has been placed at the predetermined location. Then, the mobile carrier 200 can drive the second telescoping component 210 to perform a retraction motion, so as to withdraw the second telescoping component 210 from a docking position of the mobile vehicle 300-5. In some embodiments, when the second telescoping component 210 is withdrawn to a predetermined withdrawal location, the sensor 221 is triggered, so as to send data indicating triggering to the controller 227. In response to receiving the data, the mobile carrier 200 determines that the release operation of the mobile vehicle 300-1 is completed.

As shown in FIG. 7, in some other embodiments of the present disclosure, the quantity of mobile vehicles may be greater than two. In these embodiments, the method/process/step of block 140 may include: driving the first telescoping component 209 to perform an extension motion, to lift the combination of the mobile vehicle 300-2 to the mobile vehicle 300-5, so as to move away from the mobile vehicle 300-1. After the mobile vehicle 300-1 moves away from the mobile carrier 200 of the autonomous mobile device 100, the combination is placed at the predetermined location.

Figure 12:
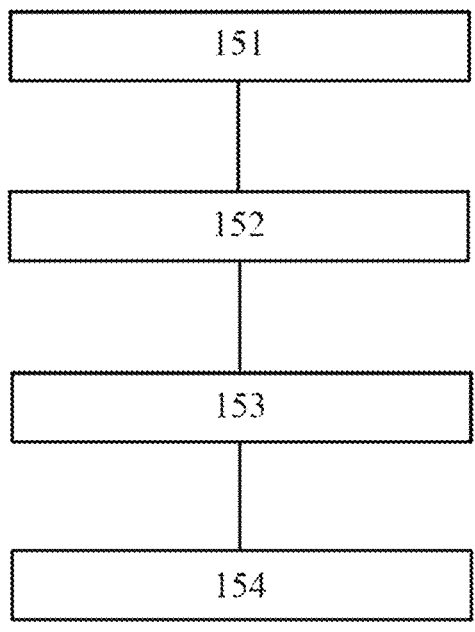
FIG. 12 is a flowchart of block 150 shown in FIG. 10.

FIG. 12 further shows a method/process/step at block 150. With reference to FIG. 7 to FIG. 9b, after the mobile vehicle is separated from another mobile vehicle (one or more mobile vehicles), the mobile vehicle may move from the exterior of the carriage to the interior of the carriage. Then, the mobile vehicle can be parked in the interior of the carriage, so as to receive a cargo from the mobile vehicle located on the autonomous mobile device 100. In this embodiment, the mobile vehicle on the autonomous mobile device 100 is located in the exterior of the carriage. After the transportation operation of the cargo is completed, the mobile vehicle in the interior of the carriage may move away from the interior of the carriage, so that the cargo on the mobile vehicle is placed in the interior of the carriage.

Referring to FIG. 7, descriptions are provided by using a non-restrictive embodiment in which only the mobile vehicle 300-5 and the mobile vehicle 300-1 are stacked on the mobile carrier 200. As described above, a mobile vehicle queue that extends from the exterior of the carriage to the interior of the carriage may form a transportation mechanism for transporting the cargo to the carriage. In this embodiment, the transportation mechanism is formed by the mobile vehicle 300-5 and the mobile vehicle 300-1.

At block 151, after the mobile vehicle 300-1 moves from the exterior 970 to the interior 980, the mobile vehicle 300-1 may send, to the control apparatus 700, a message indicating that the mobile vehicle 300-1 has moved to the interior 980. In response to receiving the message, the control apparatus 700 may send a command to the mobile vehicle 300-1 to allow the mobile vehicle 300-1 to continue to move forward. In some other embodiments, after sending the message to the control apparatus 700, the mobile vehicle 300-1 may autonomously move forward without waiting for a command from the control apparatus 700. In an embodiment in which the control apparatus 700 is not present, an object that receives the data and sends the command may be the autonomous mobile device 100.

An operation after a mobile vehicle (for example, the mobile vehicle 300-1) moves to the interior 980 is described. It should be understood that the operations of the mobile vehicle 300-2, the mobile vehicle 300-3, and the mobile vehicle 300-4 are generally the same as the operation of the mobile vehicle 300-1. Details are not described herein again. At block 152, the mobile vehicle 300-1 continuously moves into the carriage until the mobile vehicle stops at a corresponding location. The mobile vehicle 300-1 is configured with the sensor 521 disposed in the vicinity of the wheel assembly 502 to detect a distance between the wheel assembly and the side wall (which is represented by the boundary 940 in FIG. 9a) of the carriage, and a rotational speed of the wheel assembly 521 is adjusted in response to a detection result of the sensor 521. In this way, a movement direction of the mobile vehicle may be controlled during movement. Specifically, the controller 327 of the mobile vehicle 300-1 may obtain data from the sensor 521, and implement control logic based on the data. In an embodiment in which two wheel assemblies 502 on the left side of the mobile vehicle 300-1 are respectively controlled by two sensors 521, the mobile vehicle 300-1 can be configured with the sensor 521 on the front left side, to determine distance A between the wheel assembly 502 on the front left side and the side wall of the carriage, and the mobile vehicle 300-1 can be configured with the sensor 521 on the rear left side, to determine distance B between the wheel assembly 502 on the rear left side and the side wall of the carriage. In some embodiments, after the two distances are obtained, the mobile vehicle 300-1 can determine a distance difference by using the two distances, and drive the two wheel assemblies 502 at different rotational speeds based on the distance difference. In some embodiments, the mobile vehicle 300-1 can adjust a rotational speed of at least one of the two wheel assemblies 502 based on that the distance difference is greater than a threshold. As a result, the mobile vehicle 300-1 always runs forward in the interior 980 along a predetermined route. For example, a movement route of the mobile vehicle 300-1 is always kept in a middle region of the carriage. In one embodiment, the threshold is 2 cm. In another embodiment, the threshold is 3 cm. In some embodiments, the mobile vehicle 300-1 can send the distance difference to the control apparatus 700 and/or the controller 227 in a form of a message.

In some other embodiments, the mobile vehicle 300-1 can determine whether distance A and distance B are less than a threshold. The rotational speed of at least one of the two wheel assemblies 502 located on the left side of the mobile vehicle 300-1 is adjusted in response to determining that distance A and distance B are both less than the threshold. In one embodiment, the threshold with which distance A and distance B are compared is 20 cm. In another embodiment, the threshold with which distance A and distance B are compared is 30 cm.

At block 152, while continuously obtaining a measurement result of the sensor 521, the mobile vehicle 300-1 can further be configured with the sensor 522 to detect an object in a forward direction of the mobile vehicle 300-1, so that the mobile vehicle 300-1 keeps a predetermined distance from the object. In this embodiment, the object may be the back board 960 of the carriage. It may be understood that for the mobile vehicle 300-2, the object may be the mobile vehicle 300-1. At least partially based on data from the sensor 522, the mobile vehicle 300-1 can determine a distance to an object in front. In some embodiments, when the mobile vehicle 300-1 determines that the distance is less than or equal to a predetermined distance (i.e. a threshold), the mobile vehicle 300-1 stops moving forward, and brakes. In one embodiment, the predetermined distance is 2 cm. In one embodiment, the predetermined distance is 1 cm. In one embodiment, the predetermined distance is 0.5 cm.

At block 153, in the embodiments of FIG. 7 to FIG. 9*b*, after the mobile vehicle 300-1 to the mobile vehicle 300-4 successively move to the interior 980 of the carriage in the foregoing manner, a cargo transportation process is started. It may be understood that, in the interior 980 of the carriage, the mobile vehicle 300-2 stops behind the mobile vehicle 300-1, the mobile vehicle 300-3 stops behind the mobile vehicle 300-2, and the mobile vehicle 300-4 stops behind the mobile vehicle 300-3. In addition, the mobile vehicle 300-5 located at the exterior 970 of the carriage stops behind the mobile vehicle 300-4 located at the interior 980 of the carriage. In this way, the mobile vehicle 300-5 to the mobile vehicle 300-1 form a transportation mechanism for transporting the cargo from the mobile carrier 200 to the carriage.

During a cargo transportation process, the cargo 611-1 and the cargo 611-2 are placed on the mobile vehicle 300-5. Referring to FIG. 4*a* and FIG. 8*a*, a group of sub-assemblies 403 in the region 441 of the mobile vehicle 300-5 are configured to support the cargo 611-1. A group of sub-assemblies 403 in the region 442 of the mobile vehicle 300-5 are configured to support the cargo 611-2. In some embodiments, the cargo 611-1 and the cargo 611-2 may have a same size.

At least partially based on data from the sensor 423, the controller 327 of the mobile vehicle 300-5 can determine presence of a cargo. In response to determining that the cargo is present, the mobile vehicle 300-5 may drive the transportation component of the mobile vehicle 300-5 to transport the cargo to the mobile vehicle 300-4. After the cargo is transported away from the mobile vehicle 300-5, the controller 327 of the mobile vehicle 300-5 can determine that the cargo has been away from (the determining is performed at least partially based on the data of the sensor 423), so as to stop driving for the transportation component thereof. After the cargo arrives at the mobile vehicle 300-4, the controller 327 of the mobile vehicle 300-4 can drive the transportation component of the mobile vehicle 300-4 to further transport the same cargo to the mobile vehicle 300-3. After the cargo is transported away from the mobile vehicle 300-4, the controller 327 of the mobile vehicle 300-4 can determine that the cargo has been transported away, to stop driving for the transportation component thereof. After the cargo arrives at the mobile vehicle 300-3, the controller 327 of the mobile vehicle 300-3 can drive the transportation component of the mobile vehicle 300-3 to further transport the same cargo to the mobile vehicle 300-2. After the cargo is transported away from the mobile vehicle 300-3, the controller 327 of the mobile vehicle 300-3 can determine that the cargo has been transported away, to stop driving for the transportation component thereof. After the cargo arrives at the mobile vehicle 300-2, the controller 327 of the mobile vehicle 300-2 can drive the transportation component of the mobile vehicle 300-2 to further transport the same cargo to the mobile vehicle 300-1. After the cargo is transported away from the mobile vehicle 300-2, the controller 327 of the mobile vehicle 300-2 can determine that the cargo has been transported away, to stop driving for the transportation component thereof. After the cargo arrives at the mobile vehicle 300-1, the controller 327 of the mobile vehicle 300-1 can drive the transportation component of the mobile vehicle 300-1 to further transport the same cargo forward until the cargo abuts against the back board 960. At least partially based on data from the sensor 523, the mobile vehicle 300-1 can determine that the foregoing cargo has been received, so as to stop driving of the transportation component of the mobile vehicle 300-1. Stopping of driving of the transportation components of the mobile vehicle 300-4 to the mobile vehicle 300-2 may be the same as that of the mobile vehicle 300-1. In some embodiments, in response to determining that triggering of the sensor 423/523 lasts for a predetermined time (to be specific, the cargo has been present or stayed on the mobile vehicle for a predetermined time), driving of the transportation component is stopped. In one embodiment, the predetermined time is 3 seconds. In another embodiment, the predetermined time is 4 seconds.

In some other embodiments, before the cargo is transported to each of the mobile vehicle 300-2 to the mobile vehicle 300-5, the mobile vehicle 300-2 to the mobile vehicle 300-5 can always keep driving the respective transportation components (to be specific, the respective transportation components are uniformly rotated toward a clockwise direction), so as to transport the cargoes to the interior of the carriage in an uninterrupted form. In some embodiments, the control apparatus 700 (or the controller 227) may send a command to the mobile vehicle 300-2 to the mobile vehicle 300-5, so that the mobile vehicles keep driving the respective transportation components.

In some other embodiments, each mobile vehicle may calculate a quantity of received cargoes. For example, after a cargo arrives at the mobile vehicle, 1 may be added to an accumulator of the controller 327 of the mobile vehicle, regardless of whether the cargo is finally transported away from the mobile vehicle. In addition, the mobile vehicles may further obtain, from the control apparatus 700 (or the controller 227), numbers of the mobile vehicles arranged in a mobile vehicle queue. Then, each mobile vehicle may compare the accumulated quantity of cargoes with the numbers, to determine whether to keep driving the respective transportation components. In some embodiments, one mobile vehicle supports only one (or a pair of) cargo(es). Therefore, in response to determining that the accumulated quantity of cargoes is less than a number of a mobile vehicle, driving of a transportation component of the mobile vehicle having the number is kept. In response to determining that the accumulated quantity of cargoes is equal to a number of a mobile vehicle, driving of a transportation component of the mobile vehicle having the number is stopped. In addition, the operation of stopping moving the transportation component of the mobile vehicle may further indicate, based on data from the sensor 423/523, that the corresponding cargo has been stopped on the mobile vehicle for a predetermined time. This manner may further ensure accuracy of stopping driving of the transportation component.

In some other embodiments, as shown in FIG. 8*a* to FIG. 9*b*, one mobile vehicle may support a plurality of (or a plurality of pairs of) cargoes. Therefore, a result of dividing the accumulated quantity of cargoes by a quantity (a quantity of pairs) of cargoes that may be supported by the mobile vehicle may be first calculated. Then, the result is compared with the number, to determine whether to keep driving a transportation component of a mobile vehicle having the number.

Referring to FIG. 4*a* to FIG. 5*c*, in some embodiments of the present disclosure, the rotational speed of the sub-assemblies 403/523 of the transportation component can be independently adjusted. As described above, for the sub-assemblies of the transportation component, the mobile vehicle 300-1 to the mobile vehicle 300-5 (i.e. the mobile vehicle 400 and the mobile vehicle 500) may have a same configuration manner. Therefore, for brevity, only the reference numerals of the mobile vehicle 400 are used for description. In some embodiments, for each mobile vehicle, a command may be received from the control apparatus 700 (or the controller 227), so that a rotational speed of a row of sub-assemblies 403 arranged between the beam structure 430 and the beam structure 431 is greater than a rotational speed of a row of sub-assemblies 403 arranged between the beam structure 431 and the beam structure 432. A command may be received from the control apparatus 700 (or the controller 227), so that a rotational speed of a row of sub-assemblies 403 arranged between the beam structure 434 and the beam structure 435 is greater than a rotational speed of a row of sub-assemblies 403 arranged between the beam structure 433 and the beam structure 434. A command may be received from the control apparatus 700 (or the controller 227), so that the rotational speed of the row of sub-assemblies 403 arranged between the beam structure 430 and the beam structure 431 is substantially equal to the rotational speed of the row of sub-assemblies 403 arranged between the beam structure 434 and the beam structure 435. A command may be received from the control apparatus 700 (or the controller 227), so that the rotational speed of the row of sub-assemblies 403 arranged between the beam structure 431 and the beam structure 432 is substantially equal to the rotational speed of the row of sub-assemblies 403 arranged between the beam structure 433 and the beam structure 434. Based on the foregoing rotational speed configurations of the sub-assemblies of the transportation component, during transportation, the cargo 611-1 and the cargo 611-2 can be pressed against each other or abut against each other (to be specific, an interaction force is generated between each other), so as to prevent the cargo 611-1 and the cargo 611-2 from falling out from the mobile vehicle queue. It should be understood that the same sizes of the cargo 611-1 and the cargo 611-2 make the interaction therebetween more balanced, thereby further ensuring stability of the cargoes during the transportation.

During a transportation process, a plurality of material handling apparatuses may place the cargoes on the mobile vehicle 300-5 one by one. In some other embodiments, this manner is not needed, and this aspect is described below. In response to the sensors 423/523 of the mobile vehicle 300-1 to the mobile vehicle 300-4 being all triggered, the control apparatus 700 (or the controller 227) may determine that the carriage is full of cargoes. Then, the process may proceed to block 154. Referring to FIG. 7, FIG. 9a, and FIG. 9b, the mobile vehicle 300-4 to the mobile vehicle 300-1 need to move away from the interior 980 of the carriage to place corresponding cargoes onto the bottom of the carriage. In some embodiments, the control apparatus 700 (or the controller 327) sends a command to the mobile vehicle 300-4 to the mobile vehicle 300-1, to start a withdrawal operation of the mobile vehicles. In this process, the mobile vehicles are withdrawn to the autonomous mobile device 100 one by one. Specifically, all the mobile vehicles move toward the exterior of the carriage at a same speed. Meanwhile, the transportation components of all the mobile vehicles rotate toward opposite directions at the same speed, so as to ensure that the location of the cargo relative to the carriage remains unchanged until the last mobile vehicle arrives at the autonomous mobile device 100 (to be specific, the last mobile vehicle triggers the sensor 222). Specifically, an example in which the mobile vehicle 300-1 is withdrawn is used. In response to receiving the foregoing command from the control apparatus 700 (or the controller 327), the mobile vehicle 300-1 may drive the wheel assembly thereof to move toward a first direction (anticlockwise direction), at a predetermined speed, away from the interior 980 of the carriage. Meanwhile, the mobile vehicle 300-1 may drive the transportation components (for example, all the sub-assemblies 503) thereof to rotate toward a second direction (clockwise direction) at the same predetermined speed. In this way, in a process in which the mobile vehicle 300-1 is separated from a cargo supported thereon, the cargo is basically not laterally displaced relative to the bottom of the carriage. It should be noted that "basically" herein refers to an inevitable error of control or detection. Without any error, during the cargo separation, the cargo is not laterally displaced relative to the bottom of the carriage. In response to receiving a command from the control apparatus 700 (or the controller 327), the mobile vehicle 300-1 can move into a predetermined location of the platform 203 of the mobile carrier 200 of the autonomous mobile device 100. In some embodiments, the command may include information indicating that the predetermined location (i.e. a space below the lifted mobile vehicle or the lifted mobile vehicle combination) is not occupied. Further, the mobile carrier 200 can stack another mobile vehicle and the mobile vehicle 300-1. This process is further described below.

Referring to FIG. 7 to FIG. 9b, an overall process in which the mobile vehicle 300-4 to the mobile vehicle 300-1 are withdrawn to the autonomous mobile device 100 is described. In response to determining that the platform 203 is not occupied, the mobile vehicle 300-4 moves into the platform 203. During a process in which the mobile vehicle 300-4 moves into the platform 203, the mobile vehicle 300-4 to the mobile vehicle 300-1 move toward the exterior 970 of the carriage at a same predetermined speed together. Meanwhile, the transportation components of the mobile vehicle 300-4 to the mobile vehicle 300-1 rotate toward the clockwise direction at the predetermined speed together. As a result, after the mobile vehicle 300-4 is withdrawn to the autonomous mobile device 100, a cargo 619-1 and a cargo 619-2 originally supported on the mobile vehicle 300-4 are not moved to the exterior 970 of the carriage, but a mobile vehicle under the cargoes changes from the mobile vehicle 300-4 to the mobile vehicle 300-3. The cargo 612-1 and the cargo 612-2 originally supported on the mobile vehicle 300-1 are placed on the bottom of the carriage.

After the mobile vehicle 300-4 is withdrawn to the autonomous mobile device 100, because the combination of the mobile vehicle 300-4 and the mobile vehicle 300-5 needs to be lifted to prepare for withdrawal of a next mobile vehicle, the mobile vehicle 300-3 cannot immediately move into the platform 203. In this case, in some embodiments, the control apparatus 700 (or the controller 327) can send a command to the mobile vehicle 300-3 to the mobile vehicle 300-1, to indicate that a predetermined location of the platform 203 is occupied. In response to the command, the mobile vehicle 300-3 to the mobile vehicle 300-1 stop driving (i.e. stop moving) of the wheel assemblies, and stop driving of the transportation components. In some other embodiments, the mobile vehicle 300-4 may send a message to the mobile vehicle 300-3 to the mobile vehicle 300-1, to indicate that the mobile vehicle 300-4 has been withdrawn to the autonomous mobile device 100. In response to reception of the message, the mobile vehicle 300-3 to the mobile vehicle 300-1 can stop moving and stop driving of the transportation components. In response to receiving again the message that the predetermined location of the platform 203 is not occupied, a process of withdrawing the mobile vehicle 300-3 may start. The process of withdrawing the mobile vehicle 300-3 may be compared with the process of withdrawing the mobile vehicle 300-4. As a result, the mobile vehicles under the cargo 619-1 and the cargo 619-2 change from the mobile vehicle 300-3 to the mobile vehicle 300-2. The processes of withdrawing the mobile vehicle 300-2 and the mobile vehicle 300-1 are also applicable to the foregoing manner. Details are not described herein again. The transportation mechanism (i.e. the mobile vehicle queue) for transporting the cargo may be flexibly separated from the bottom of the carriage without lateral displacement of the cargo relative to the bottom of the carriage.

In some embodiments, each of the mobile vehicle 300-4 to the mobile vehicle 300-1 can be configured with the sensor 422 located at the location 472/572, to detect an object in a current movement direction of the mobile vehicle. In this way, collision between the mobile vehicle 300-4 to the mobile vehicle 300-1 and the autonomous mobile device 100 can be avoided.

Figure 13:
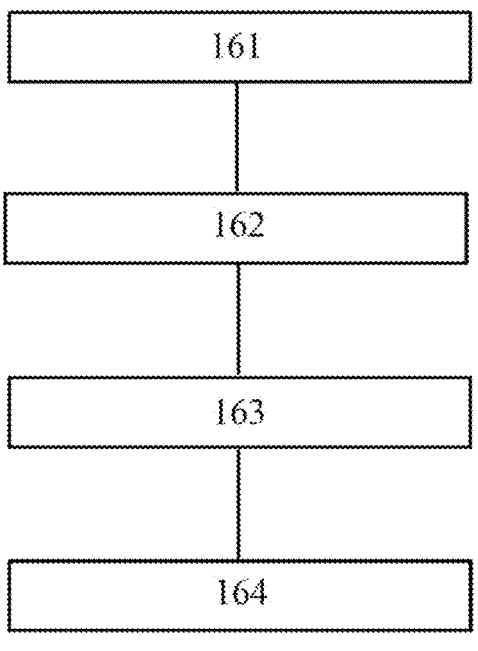
FIG. 13 is a flowchart of block 160 shown in FIG. 10.
Figure 14:
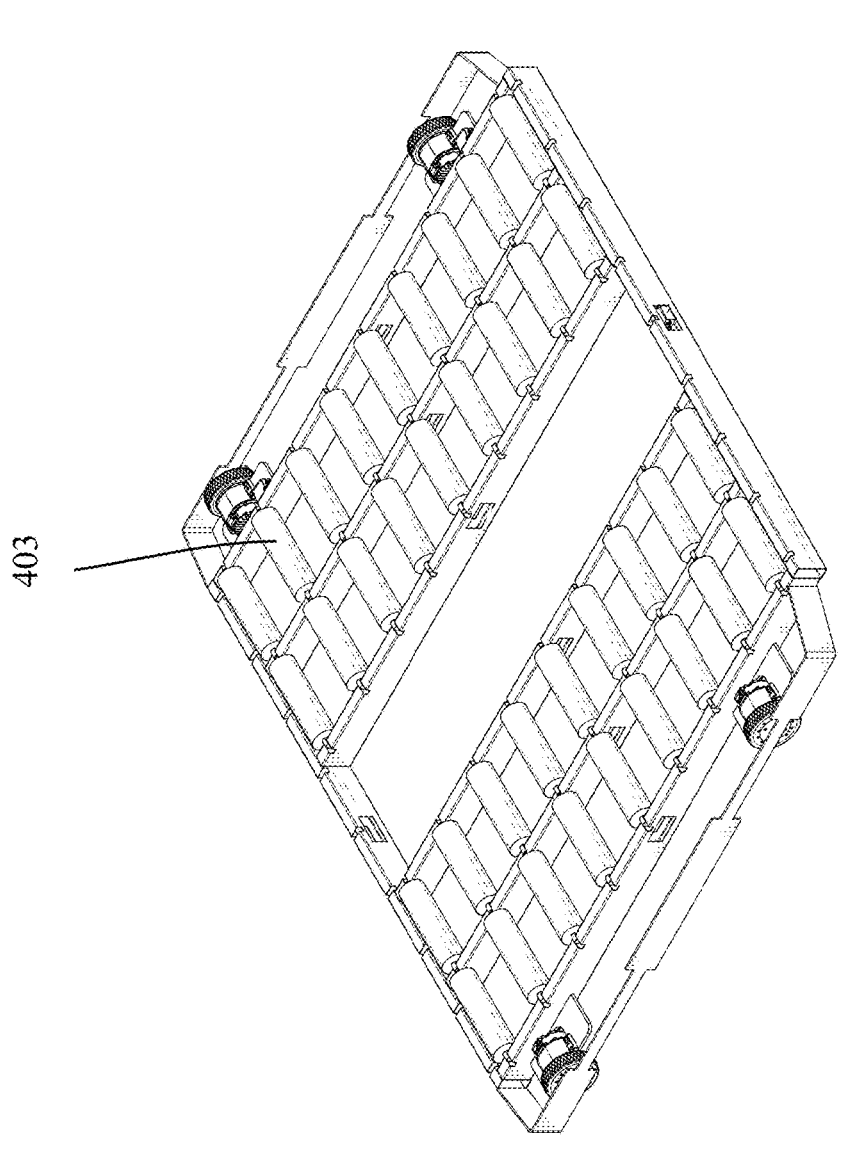
FIG. 14 to FIG. 21 illustrate details of embodiments according to FIG. 4*a*.
Figure 15:
Figure 15:
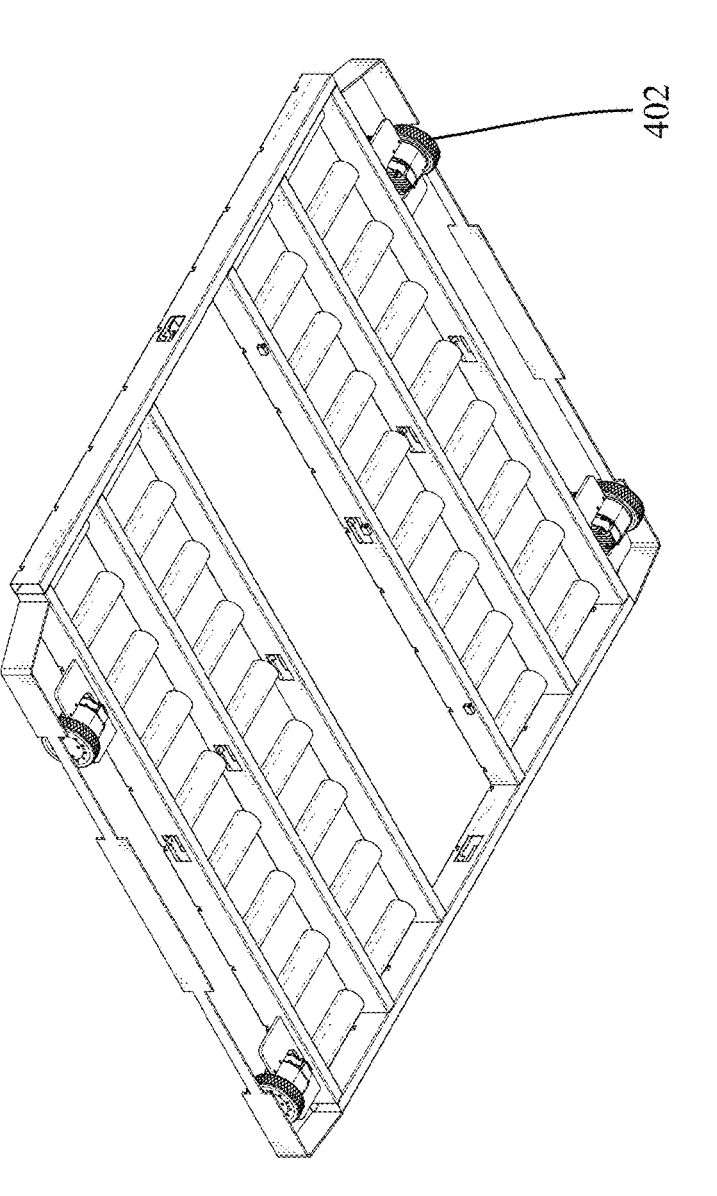
Figure 16:
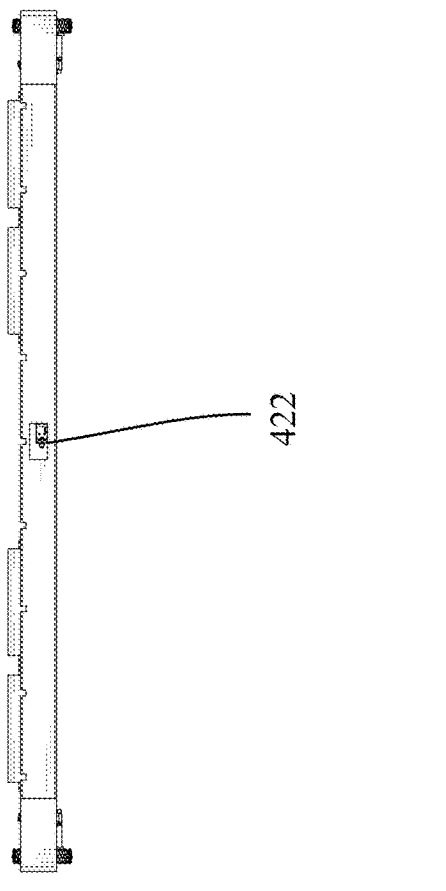
Figure 17:
Figure 17:
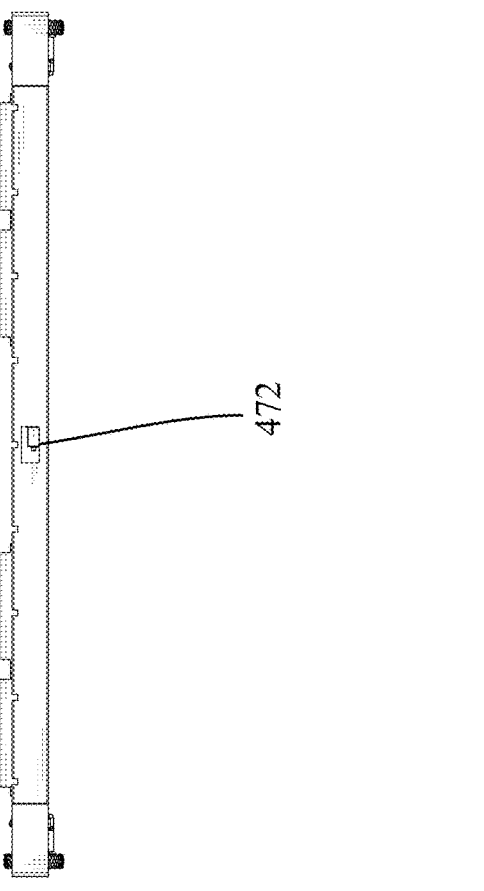
Figure 18:
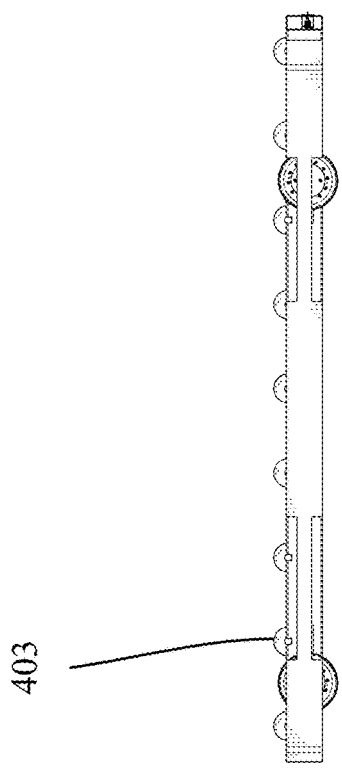
Figure 19:
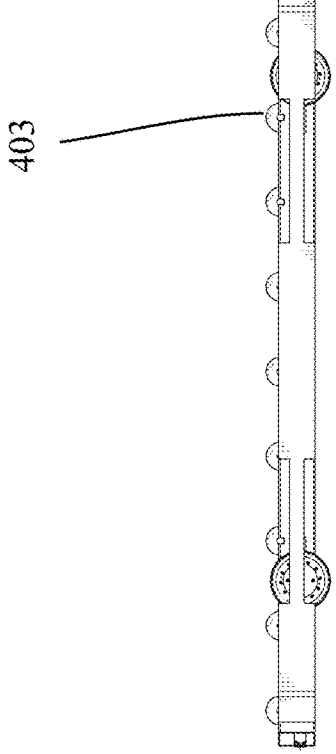
Figure 20:
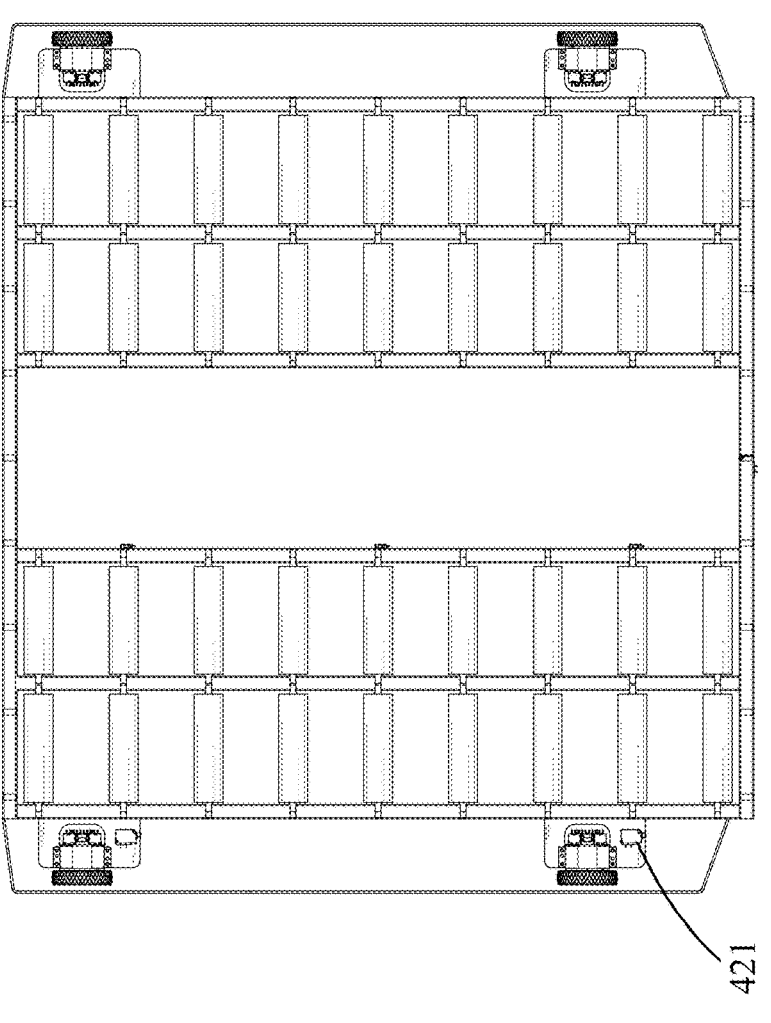
Figure 21:
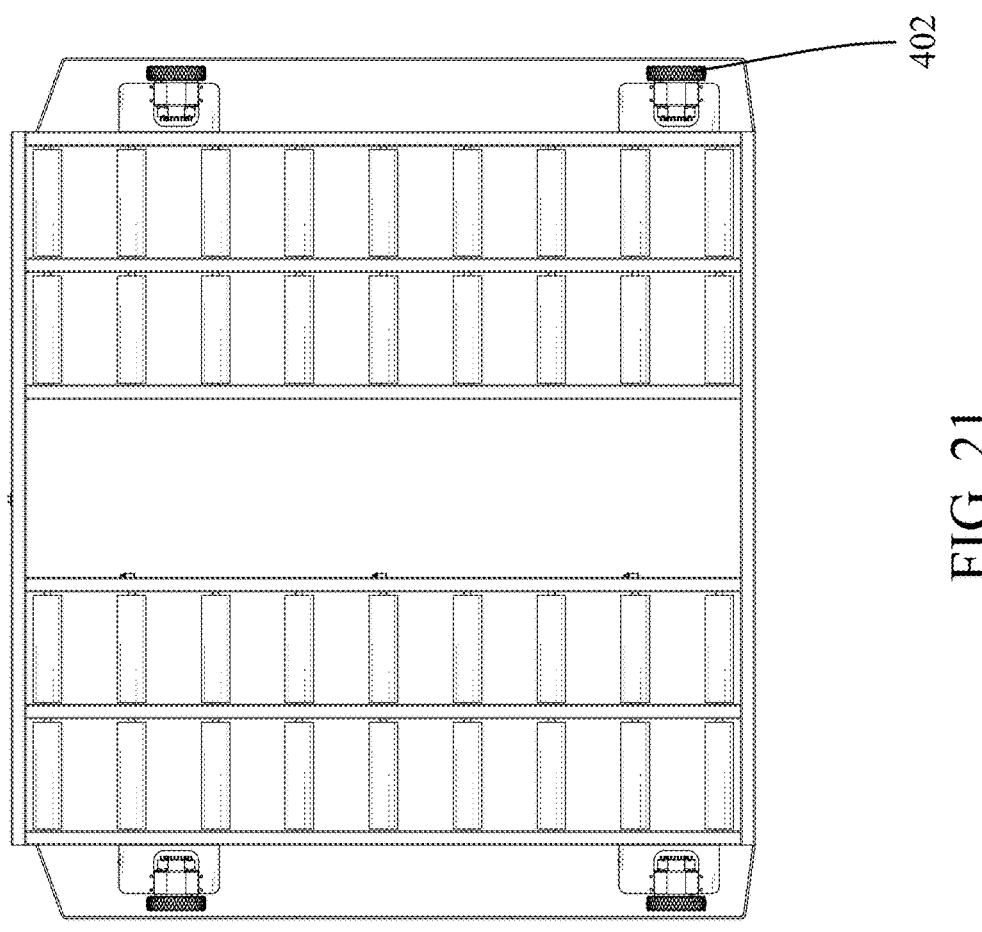
Figure 22:
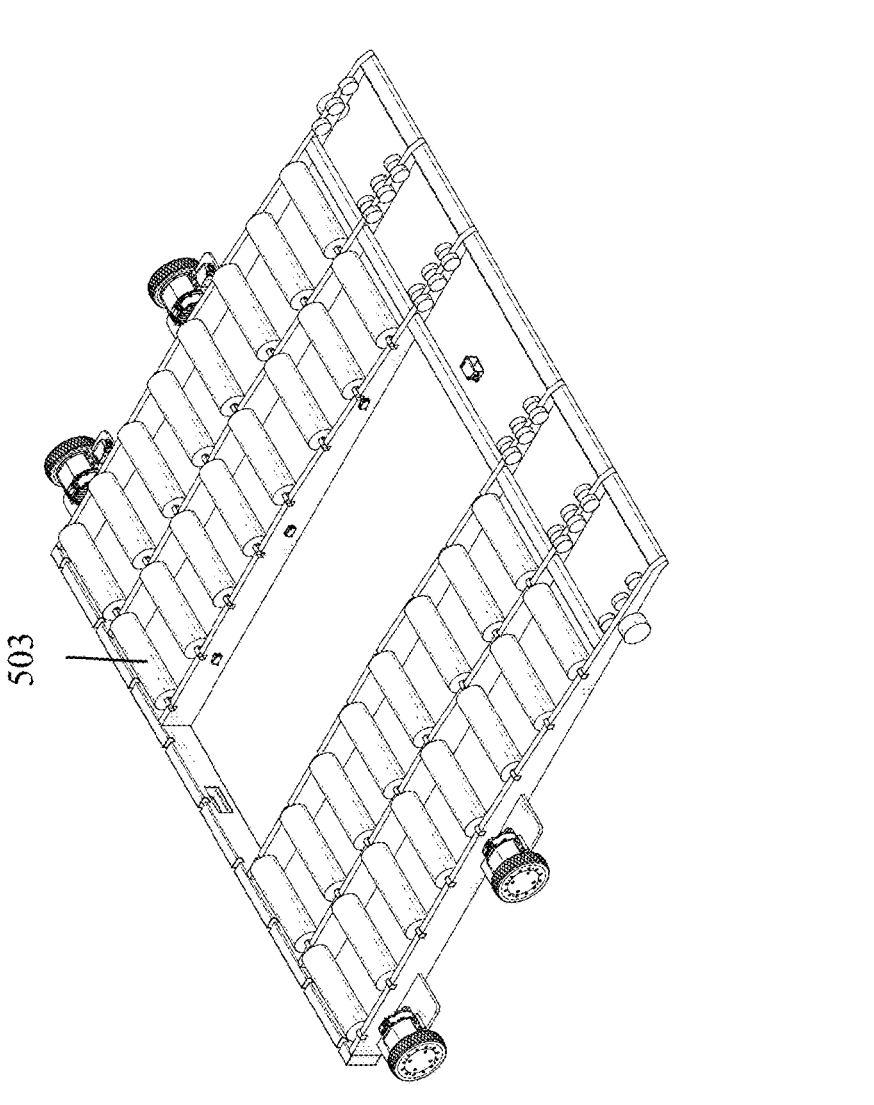
FIG. 22 to FIG. 29 illustrate details of embodiments according to FIG. 5*a*.
Figure 23:
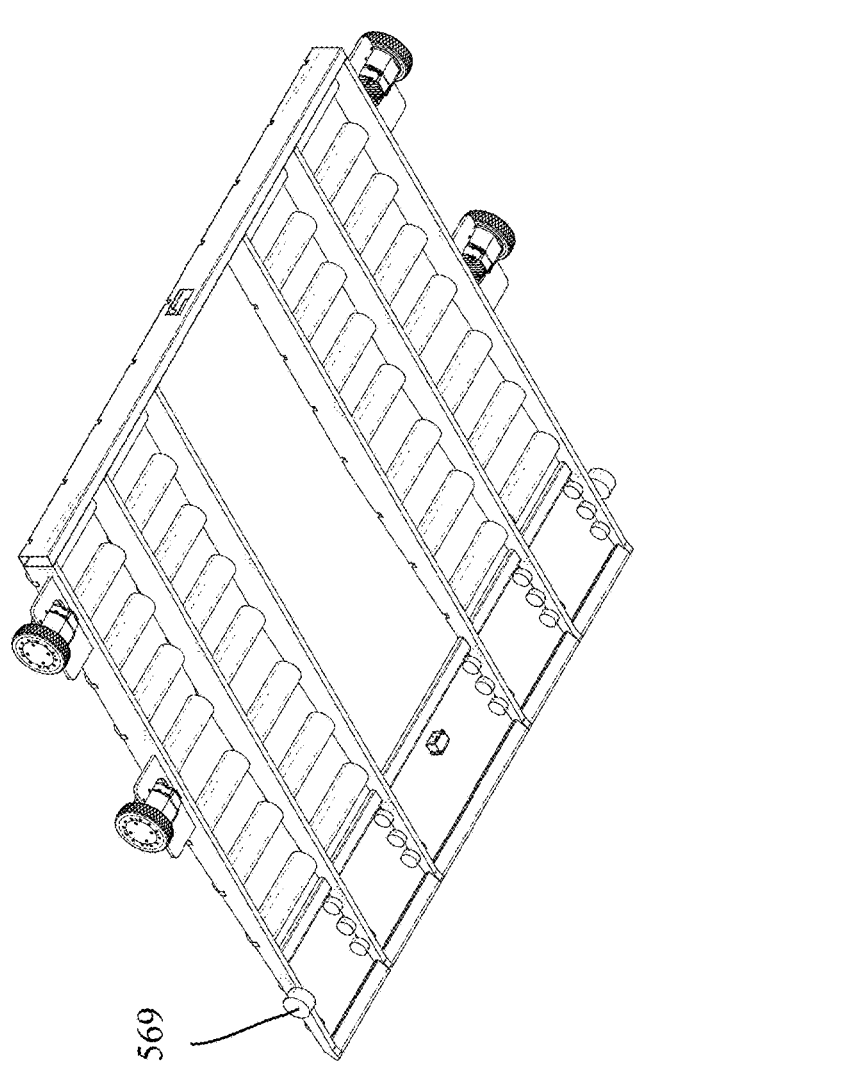
Figure 24:
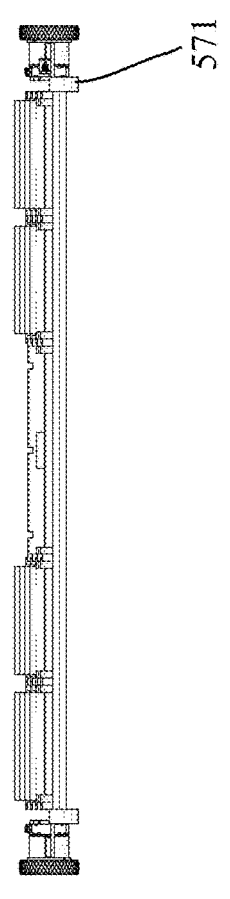
Figure 25:
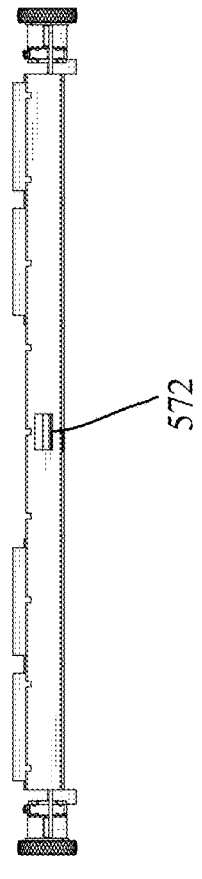
Figure 26:
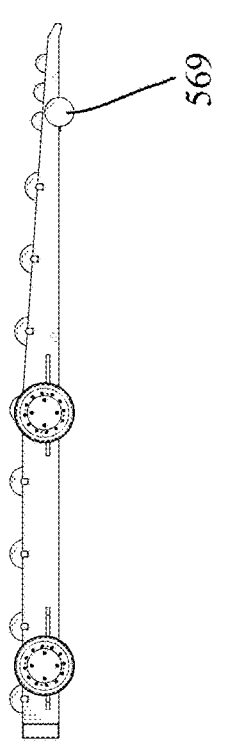
Figure 27:
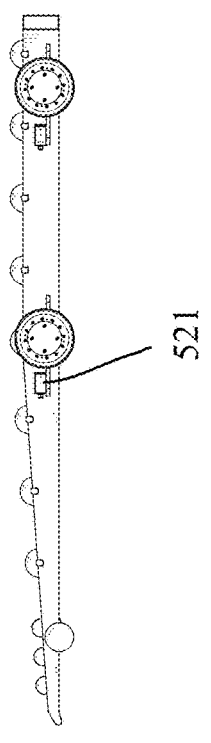
Figure 28:
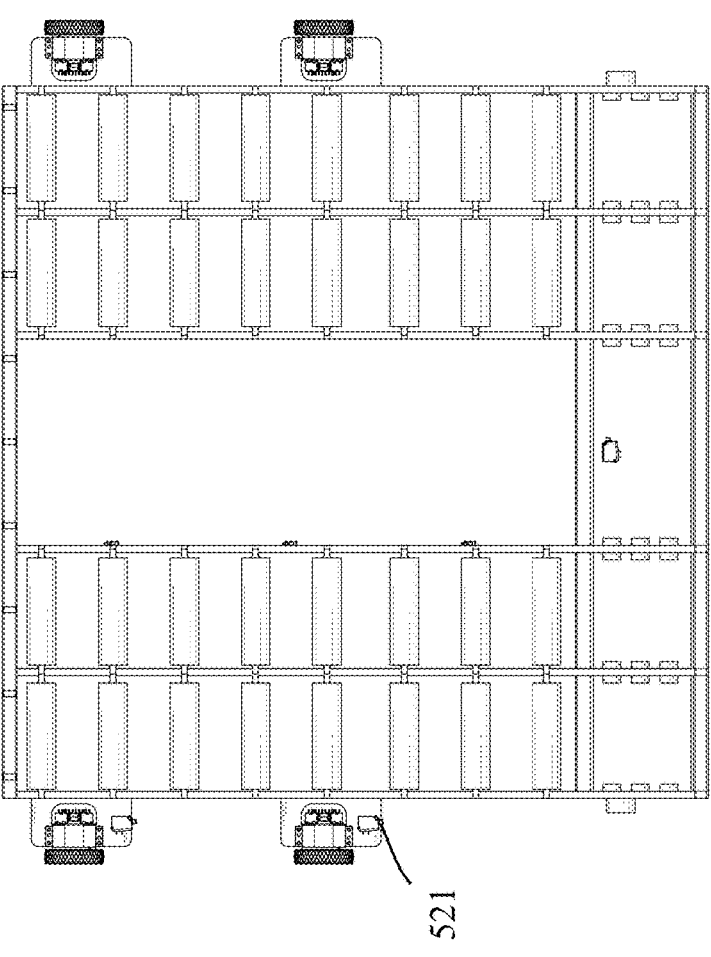
Figure 29:
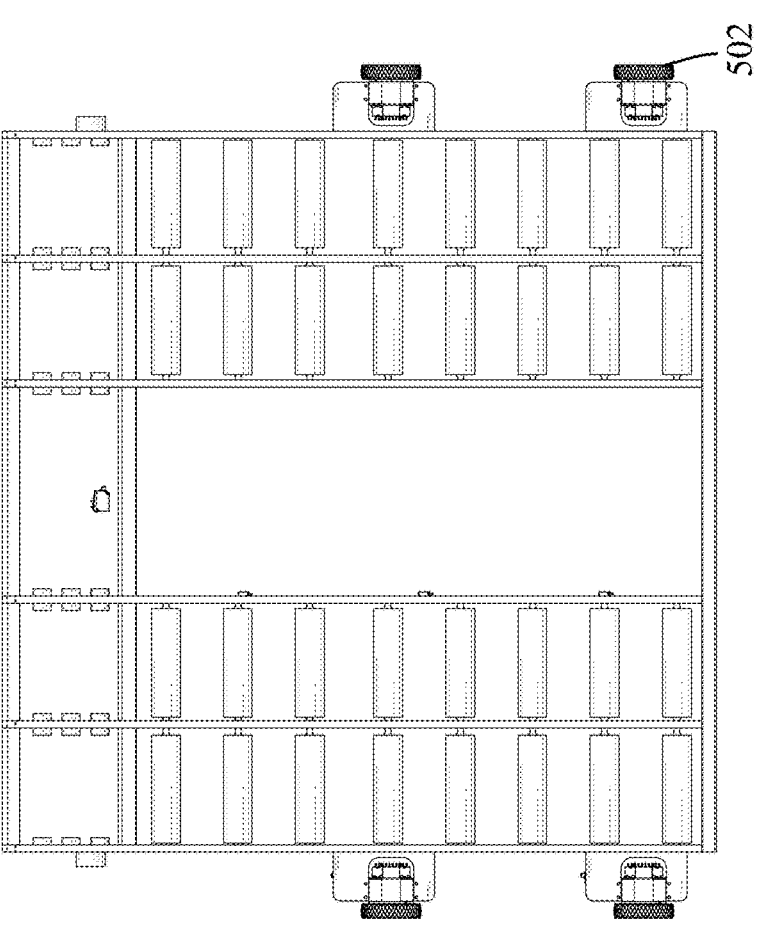
Figure 30:
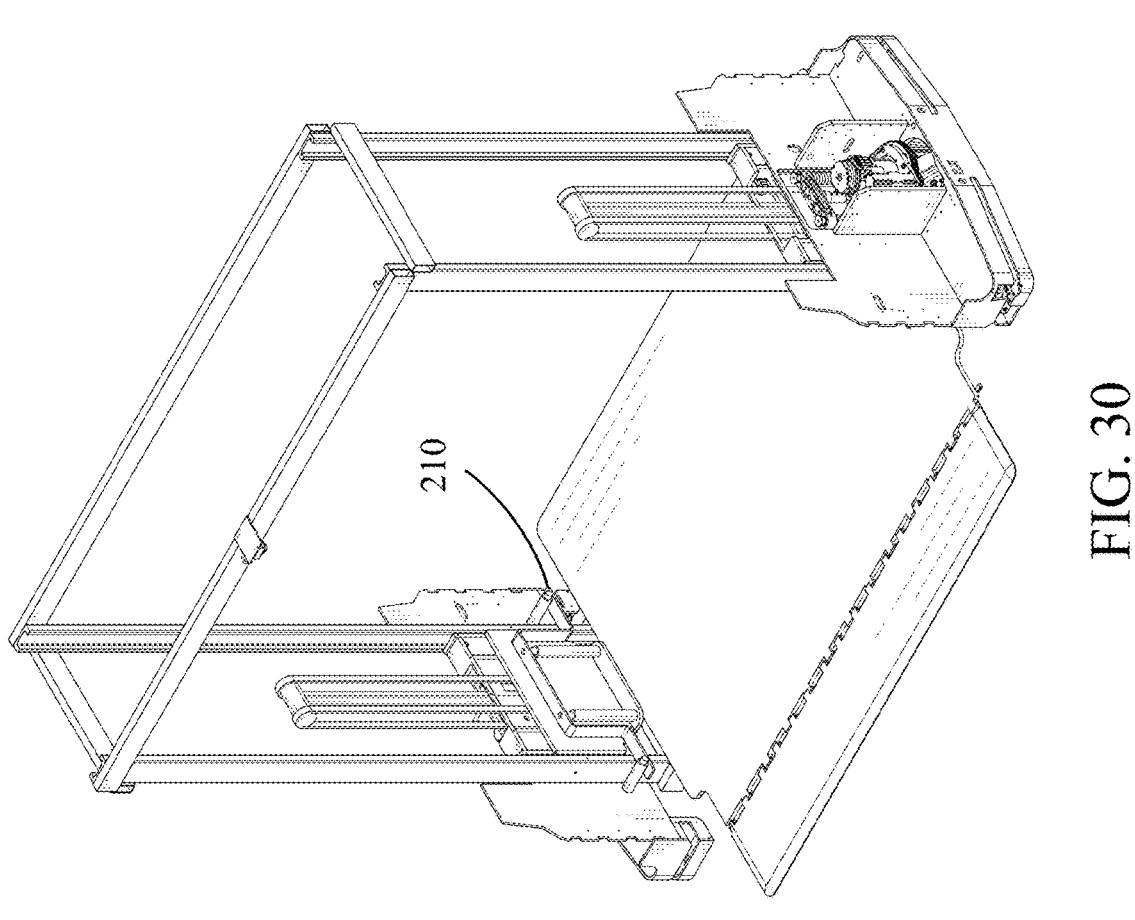
FIG. 30 to FIG. 37 illustrate details of embodiments according to FIG. 2.
Figure 31:
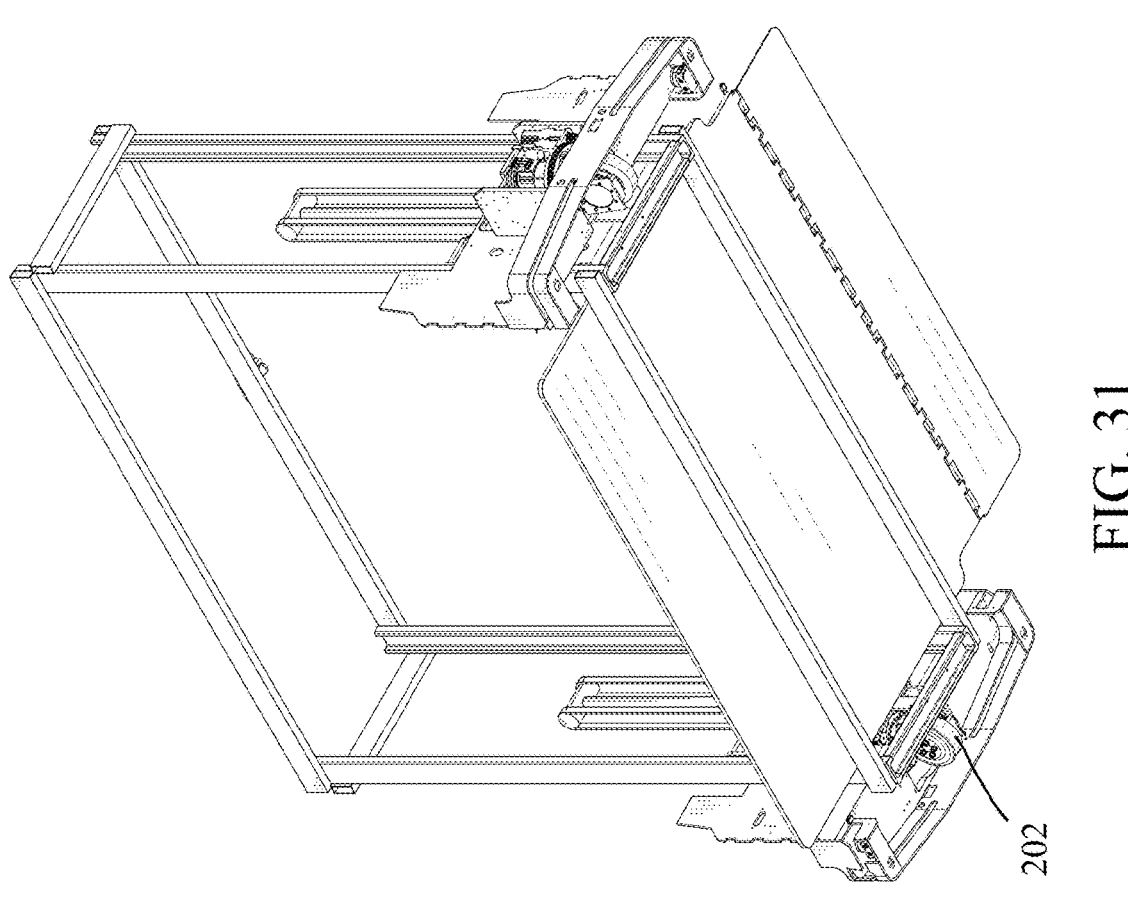
Figure 32:
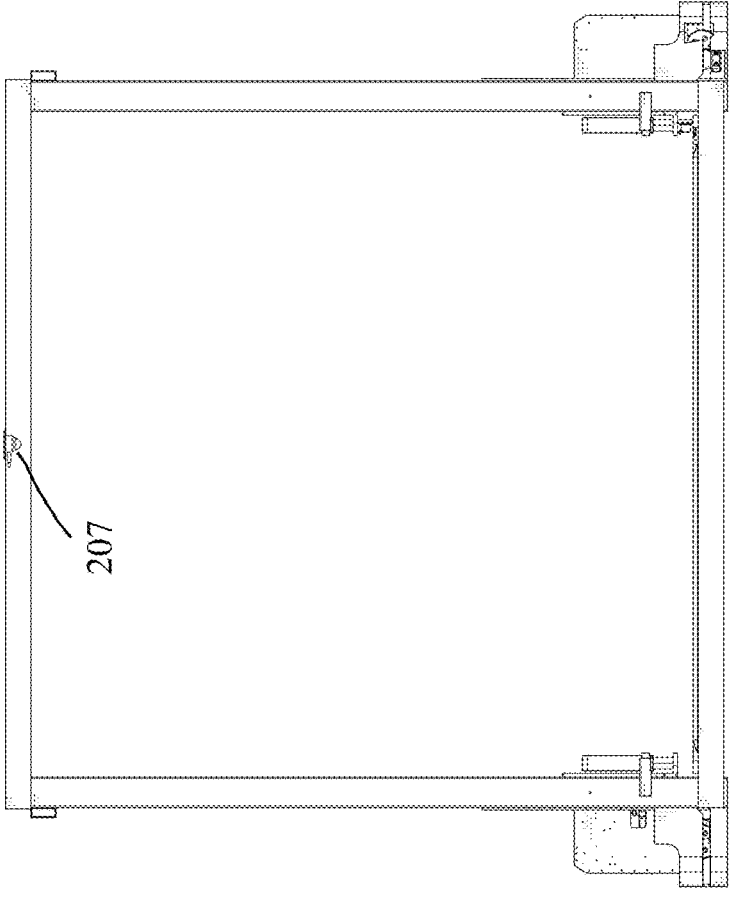
Figure 33:
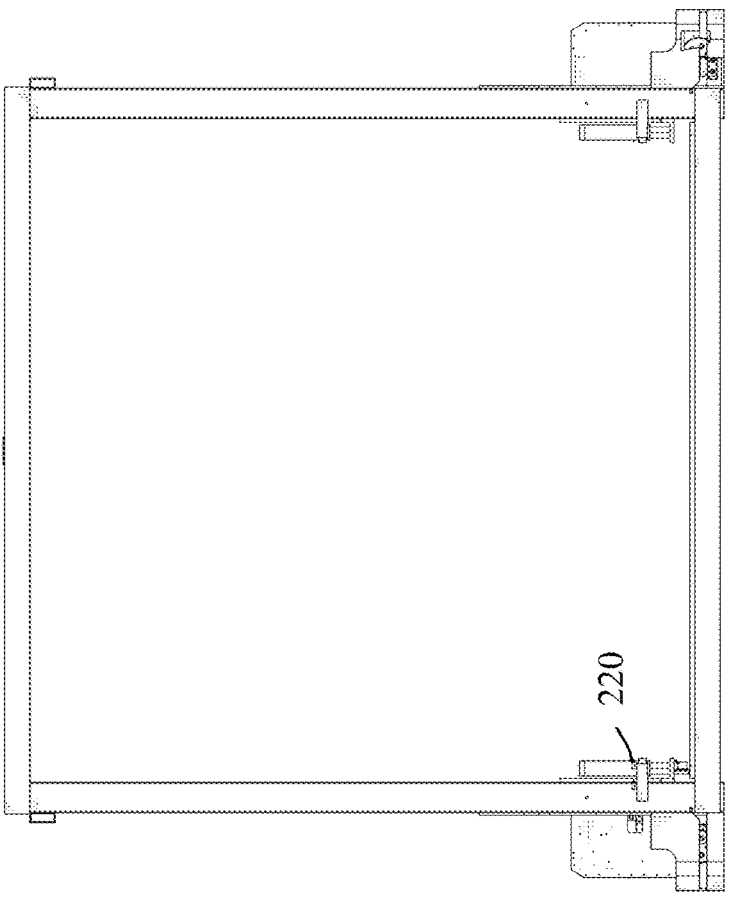
Figure 34:
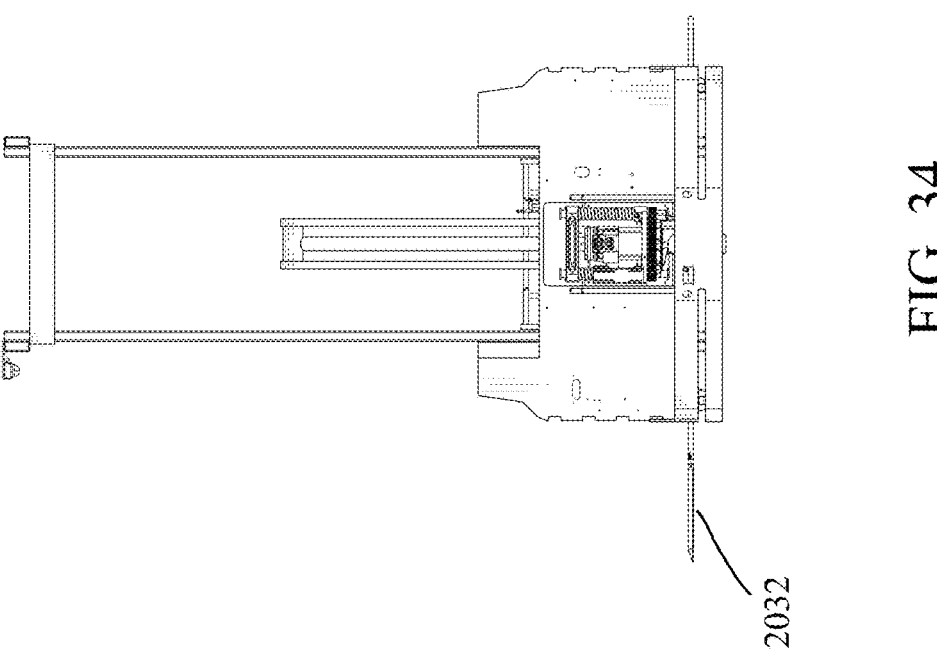
Figure 35:
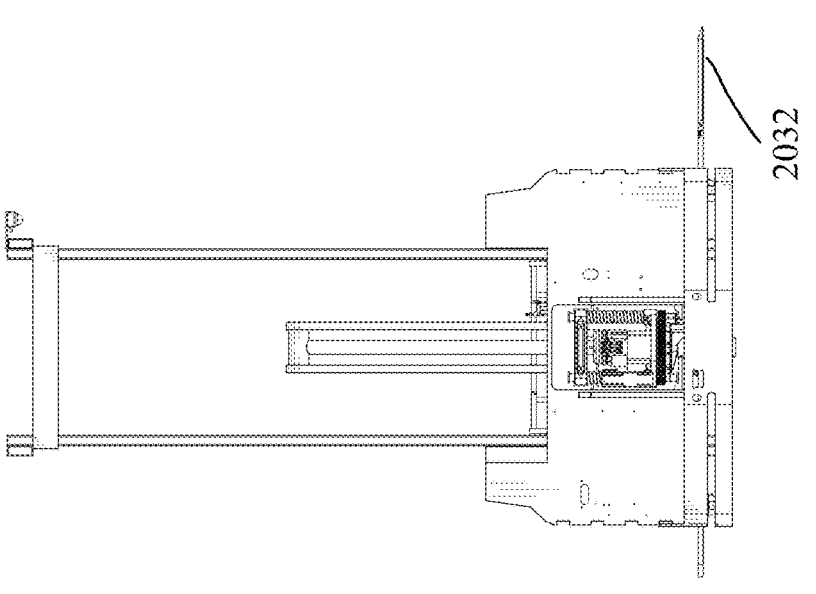
Figure 36:
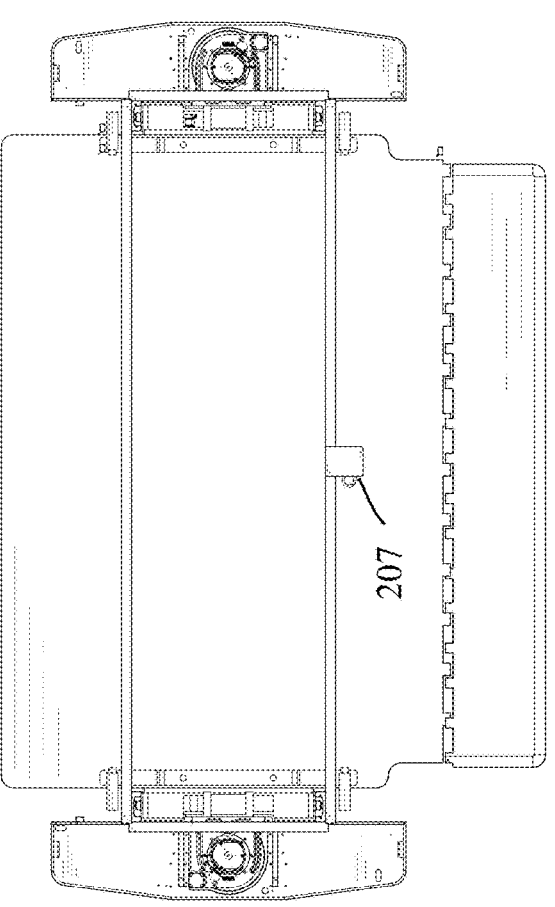
Figure 37:
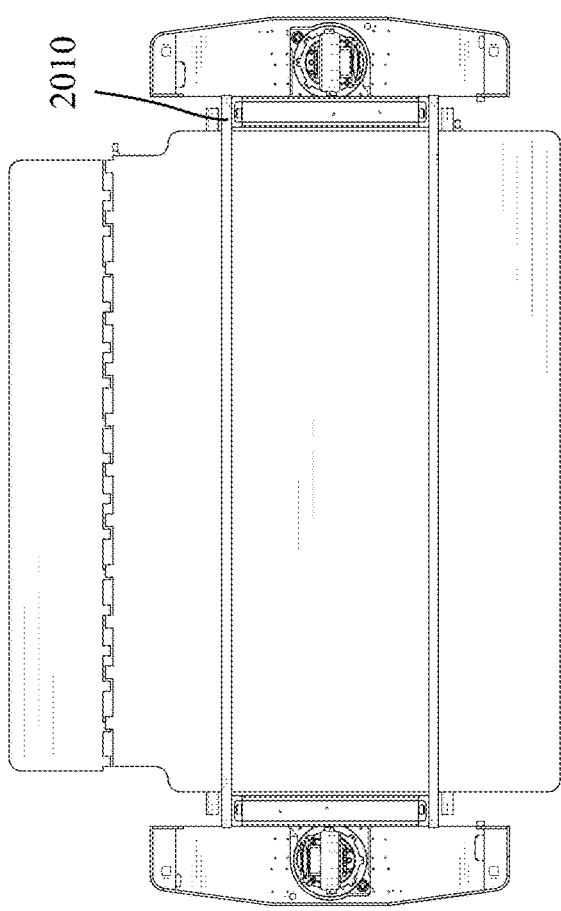
Figure 38:
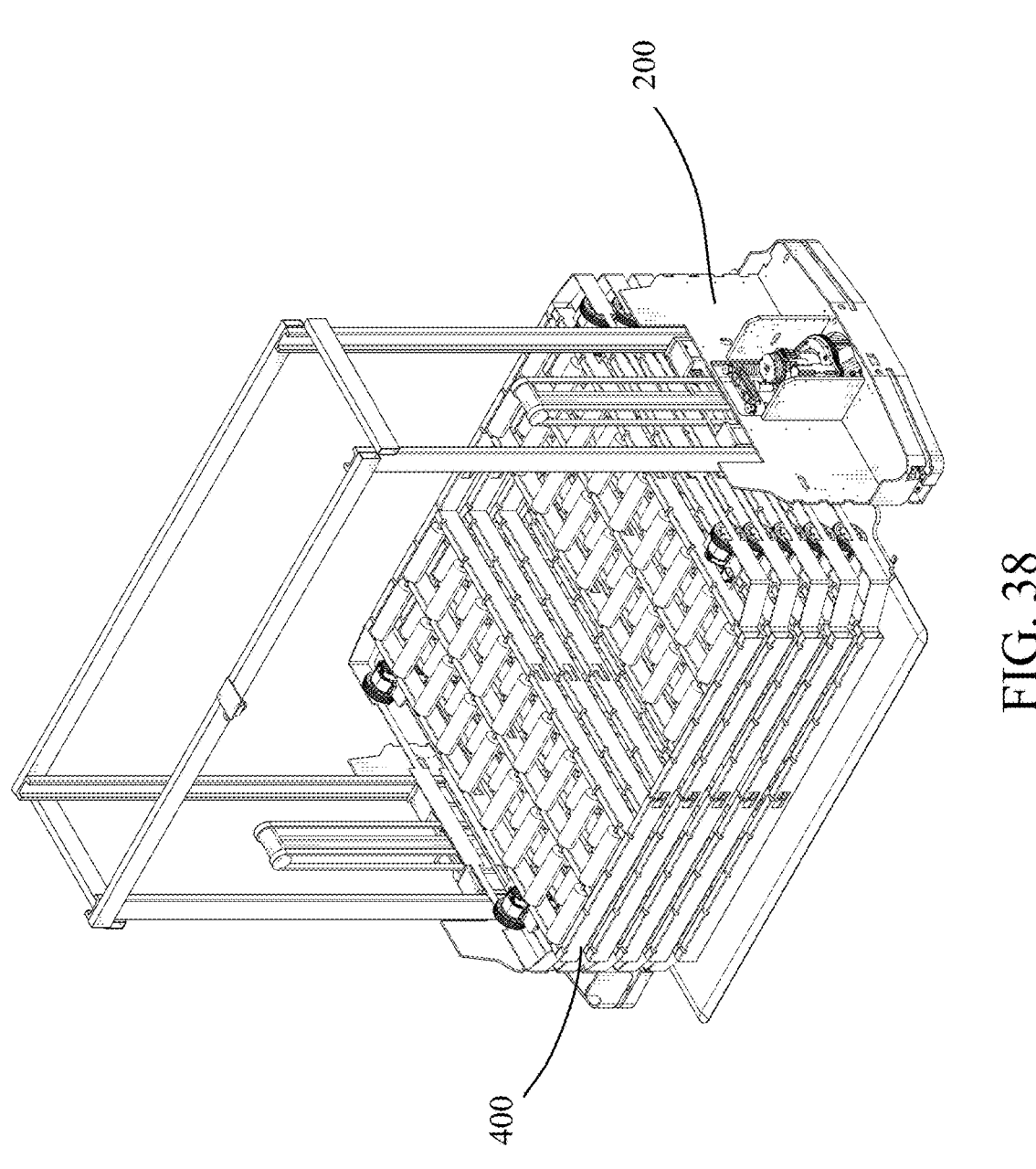
FIG. 38 to FIG. 47 illustrate details of embodiments according to FIG. 1.
Figure 39:
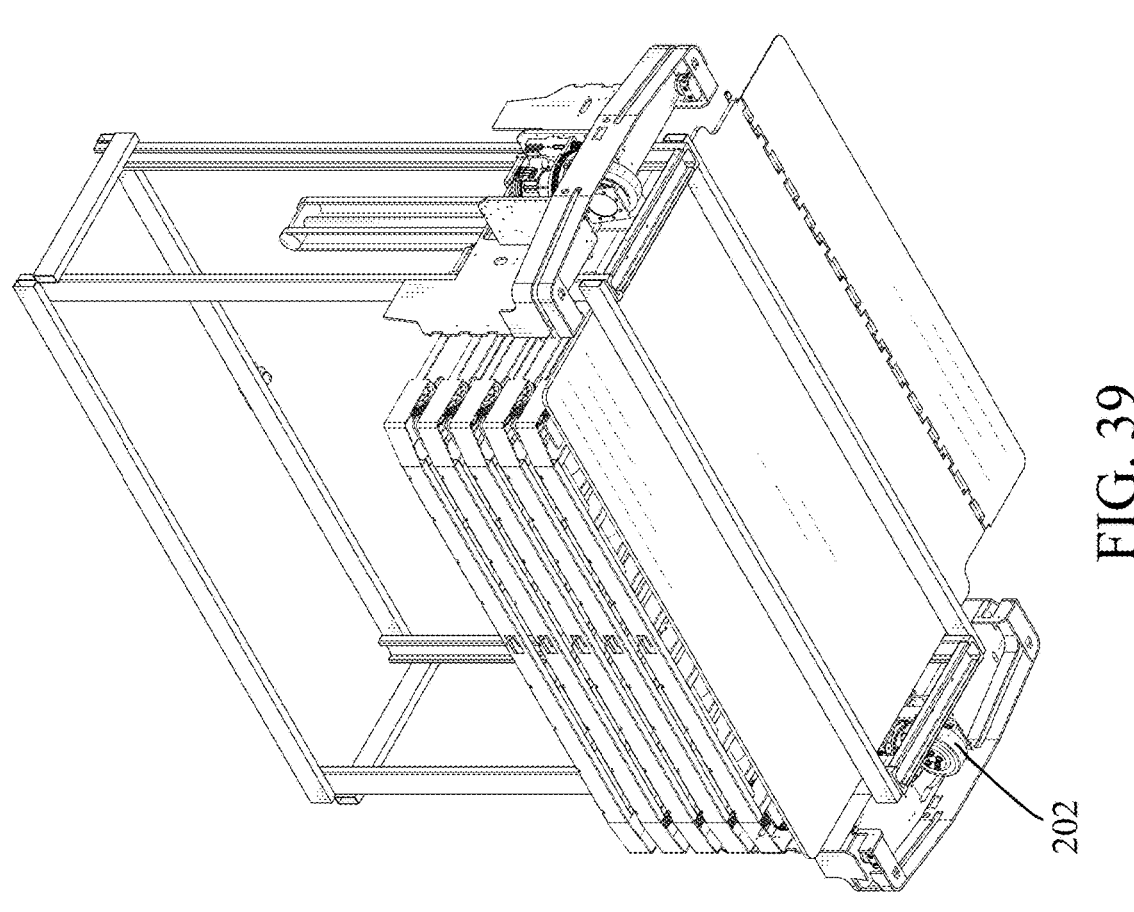
Figure 40:
Figure 41:
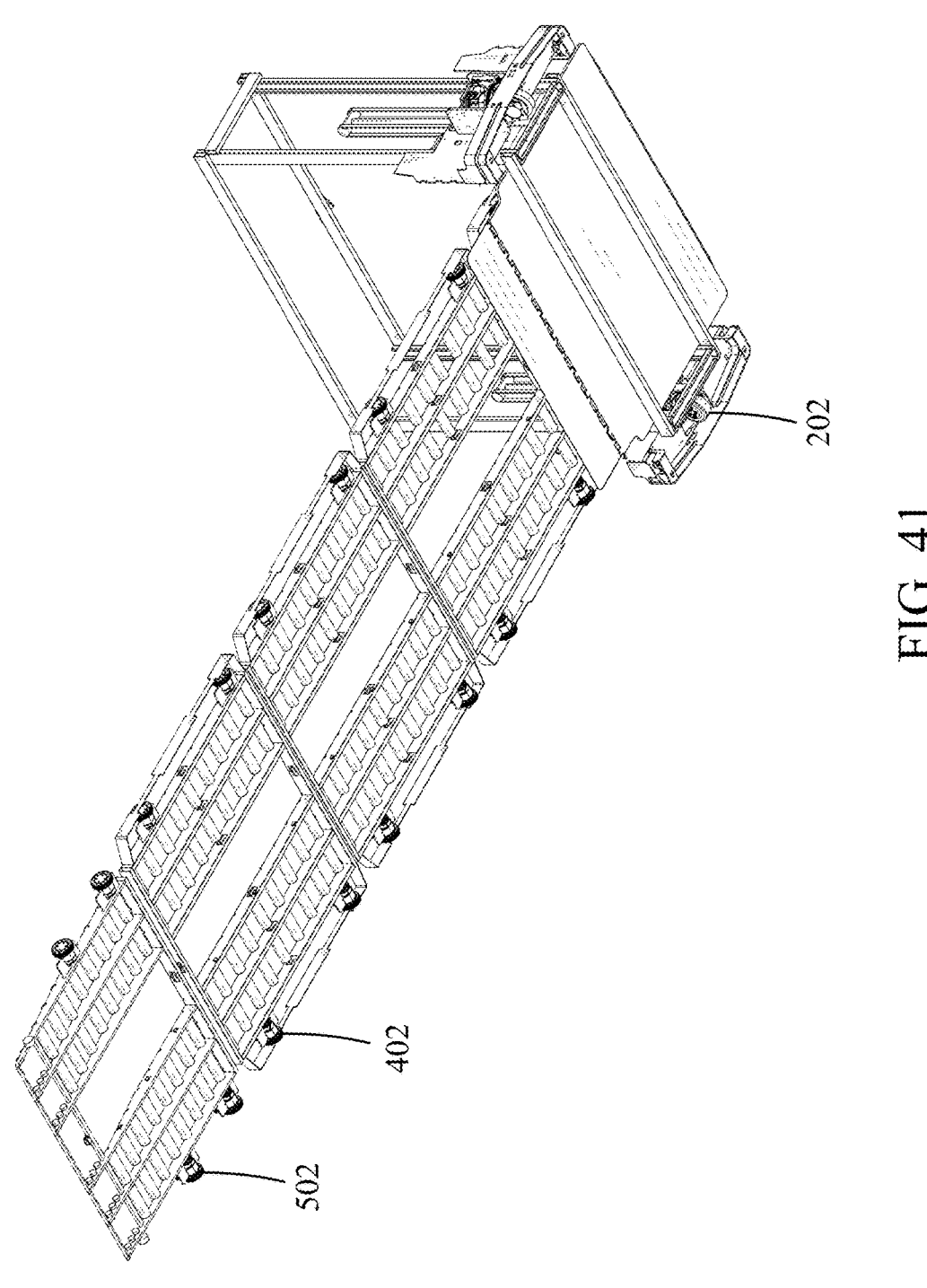
Figure 42:
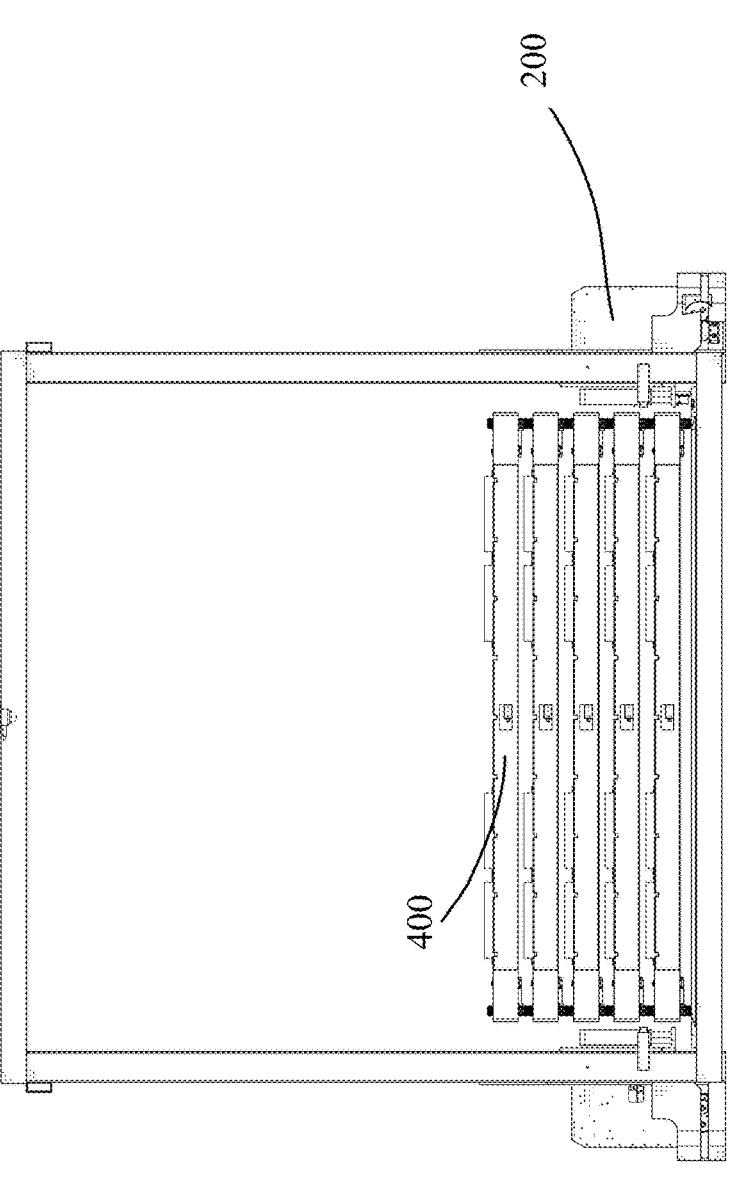
Figure 43:
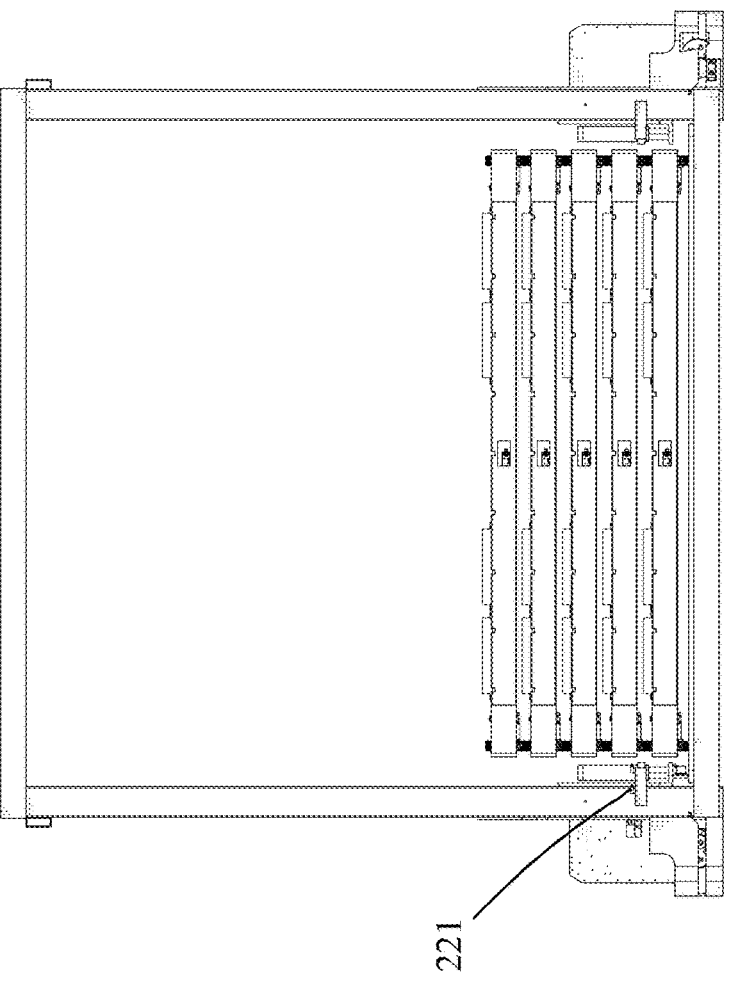
Figure 44:
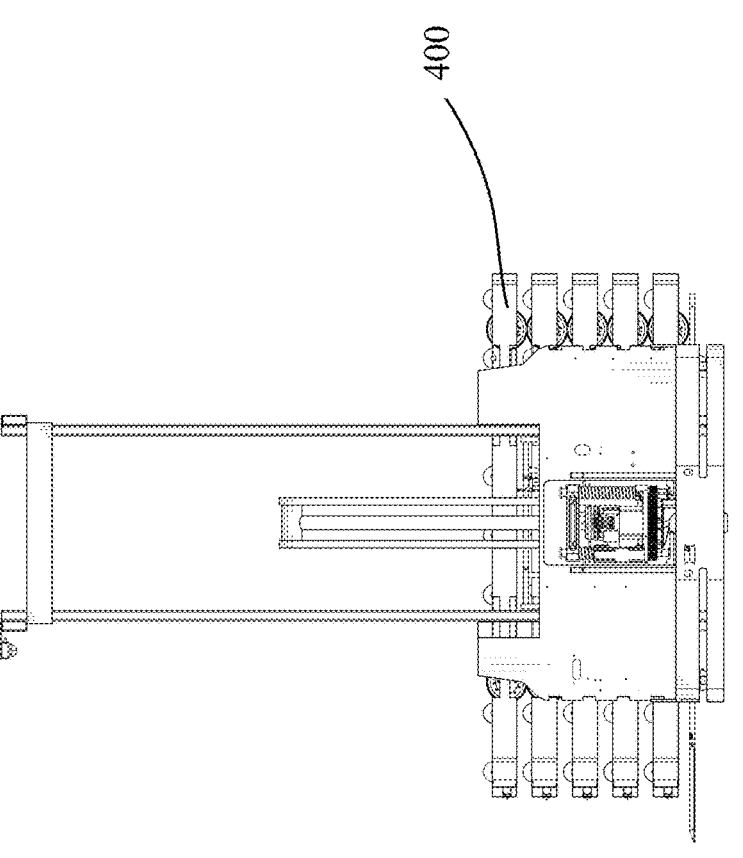
Figure 45:
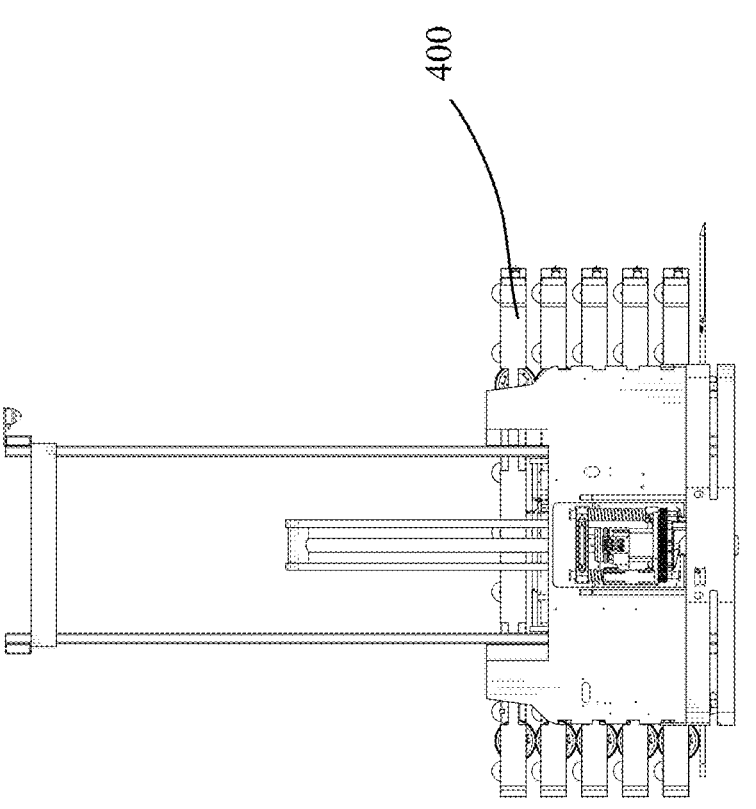
Figure 46:
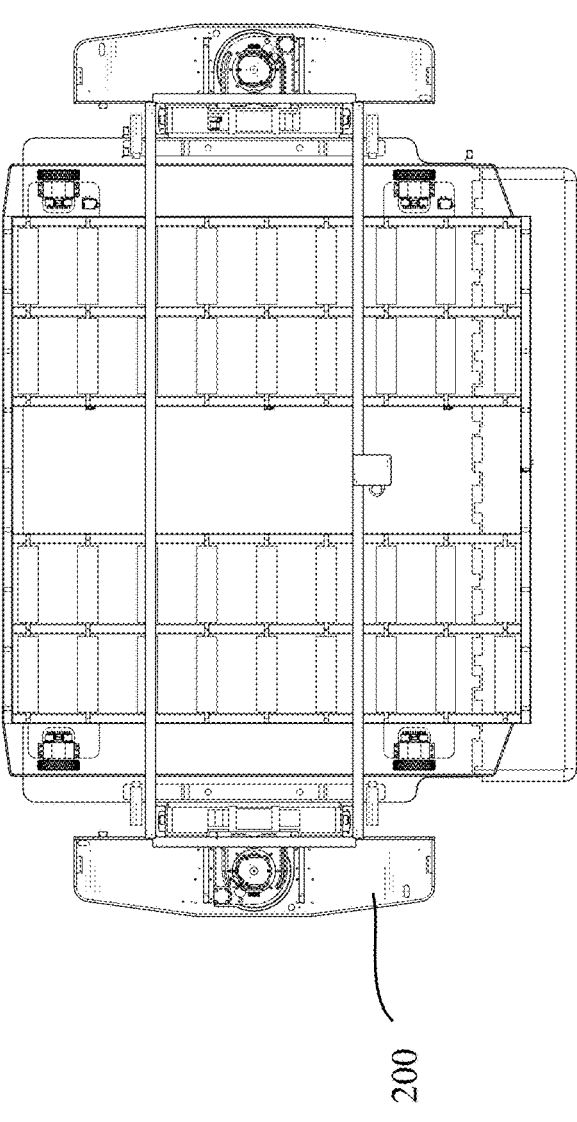
Figure 47:
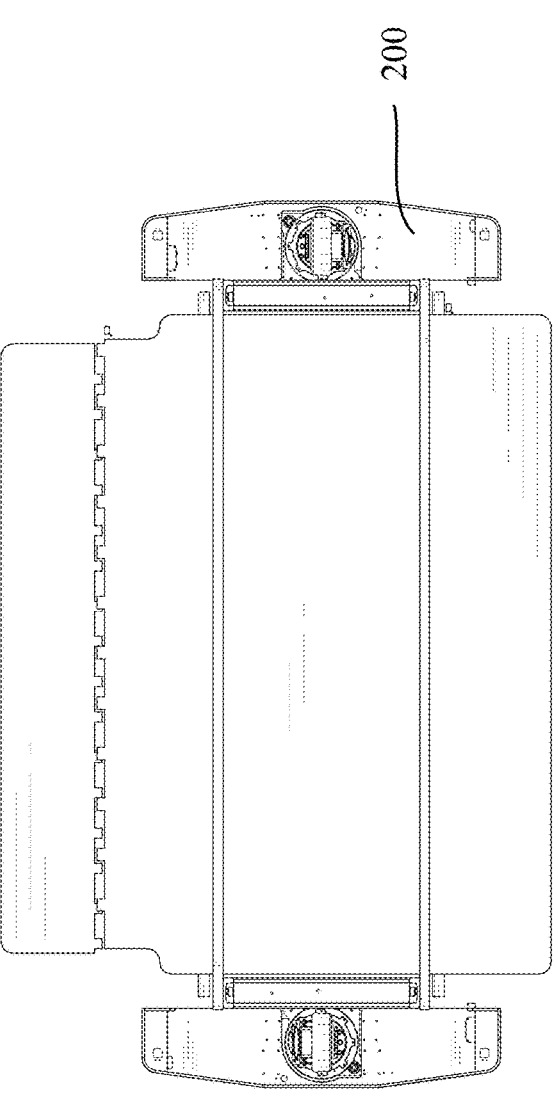

FIG. 13 further shows a method/process/step at block 160. As described above, at least partially based on data of the sensor 423 on each mobile vehicle, by means of control of the control apparatus 700 (or by means of autonomous control of the mobile carrier 200), a withdrawal operation of the mobile vehicle can be started. In some embodiments, an operation (or movement) of the mobile vehicle may be at least partially based on a command of the control apparatus 700 or the controller 227.

Descriptions are provided by using a non-restrictive embodiment in which only the mobile vehicle 300-5 and the mobile vehicle 300-1 are stacked on the mobile carrier 200 (to be specific, the mobile vehicles need to be withdrawn to the mobile carrier 200). The mobile vehicle 300-1 may send, to the control apparatus 700 (or the controller 227), a message indicating that the mobile vehicle is ready to return to the mobile carrier 200. At block 161, at least partially based on the message, the control apparatus 700 may send a command to the mobile carrier 200, so as to drive the second telescoping component 210. In response to determining that the mobile vehicle 300-1 is ready to return to the mobile carrier 200, the second telescoping component 210 is driven to perform an extension motion to be inserted into a corresponding docking position of the mobile vehicle 300-5. At block 162, in response to determining that the second telescoping component 210 is inserted to a predetermined insertion location (based on data from the sensor 220), the mobile carrier 200 may drive the first telescoping component 209 to perform an extension motion, so as to lift the mobile vehicle 300-5. As described above, the sensor 219 may continuously detect the height of the mobile vehicle 300-5 being lifted. Details are not described herein again. In response to determining that the mobile vehicle 300-5 is lifted to a predetermined height, the mobile vehicle 300-1 sends a command to allow the mobile vehicle 300-1 to move into the mobile carrier 200.

After a command that the mobile vehicle may move into the autonomous mobile device 100 is received from the control apparatus 700 (or the controller 227), the controller 327 of the mobile vehicle 300-1 may drive wheel assemblies thereof, so that the mobile vehicle 300-1 moves into the mobile carrier 200 of the autonomous mobile device 100. The sensor 222 of the mobile carrier 200 may be configured to acquire data, and then the sensor 222 may send the data to the control apparatus 700 (or the controller 227). Based on the data, the control apparatus 700 or the controller 227 may determine that the mobile vehicle 300-1 has been parked at the predetermined location of the mobile carrier 200. At block 163, after the foregoing determining is obtained, the mobile carrier 200 can drive the first telescoping component 209 to perform a retraction motion, so as to stack the mobile vehicle 300-5 onto the mobile vehicle 300-1.

At block 164, at least partially based on data from the sensor 219, the mobile carrier 200 can determine that the mobile vehicle 300-5 has been stacked onto the mobile vehicle 300-1. Then, the mobile carrier 200 can drive the second telescoping component 210 to perform a retraction motion, so as to withdraw the second telescoping component 210 from a docking position of the mobile vehicle 300-5. In some embodiments, when the second telescoping component 210 is withdrawn to a predetermined withdrawal location, the sensor 221 is triggered, so as to send data indicating triggering to the controller 227. In response to receiving the data, the mobile carrier 200 determines that the withdrawal operation of the mobile vehicle 300-1 is completed.

As shown in FIG. 7, in some other embodiments of the present disclosure, the quantity of mobile vehicles may be greater than two. In these embodiments, the method/process/step of block 160 may include: driving the first telescoping component 209 to perform an extension motion, to lift the combination of the mobile vehicle 300-2 to the mobile vehicle 300-5, so as to move away from a predetermined location (for example, a predetermined location on the platform 203) of the autonomous mobile device 100. After the mobile vehicle 300-1 moves into the mobile carrier 200 of the autonomous mobile device 100, the combination is placed at the predetermined location.

It should be noted that, although in this context, objects receiving various data are sometimes described as the control apparatus 700, and sometimes described as the controller 227, in the embodiments of the present disclosure, a same piece of data may be sent to both the control apparatus 700 and the controller 227.

As described above, in the embodiments of the present disclosure, the quantity of mobile vehicles is not limited. Specifically, the quantity of mobile vehicles between the mobile vehicle 300-1 and the mobile vehicle 300-5 may be 0 to any value. Therefore, methods/processes/steps described in block 110 to block 170 (particularly, block 140 to block 160) are not limited to the mobile vehicle numbers (i.e. 300-1, 300-2, 300-3, 300-4, and 300-5) described above. For example, any quantity of vehicles may move to the interior of the carriage one by one from the autonomous mobile device. Any quantity of vehicles may move into the autonomous mobile device one by one from the interior of the carriage, and are stacked on the autonomous mobile device.

As described above, in some embodiments, the mobile vehicle 300-5 always stays on the platform 203 of the mobile carrier 200 of the autonomous mobile device 100. In some other embodiments, the mobile vehicle 300-5 can move away from the autonomous mobile device 100. Specifically, after the autonomous mobile device 100 determines the location of the carriage (or finds the presence of the carriage), the autonomous mobile device 100 may allow each of the mobile vehicle 300-1 to the mobile vehicle 300-5 to move away from the mobile carrier 200, so that there is no mobile vehicle on the mobile carrier 200. In an embodiment in which the control apparatus 700 is present, the control apparatus 700 sends a command to the autonomous mobile device 100, so that the autonomous mobile device 100 releases each of the mobile vehicle 300-1 to the mobile vehicle 300-5 at a location far away from the carriage (for example, farther from the carriage than location A). In an embodiment in which the control apparatus 700 is not present, the autonomous mobile device 100 may autonomously perform the foregoing release operation. In some embodiments, the mobile carrier may first arrive at a facility docked with the carriage, and then release all mobile vehicles to the facility. In some embodiments, the mobile carrier may release all mobile vehicles at a place far away from the facility, and then all the mobile vehicles may autonomously arrive at the facility and run on the facility. In some embodiments, the facility may include a dock docked with the carriage. A height of the dock may be completely the same as a height of the carriage (or a height difference between the platform and the carriage is extremely small), so that the mobile vehicle can smoothly move into and away from the carriage. In another embodiment, the facility may include another object docked with the carriage.

In some embodiments, each of the mobile vehicle 300-1 to the mobile vehicle 300-5 can autonomously move toward the carriage. In some other embodiments, the mobile vehicle 300-1 to the mobile vehicle 300-5 move toward the carriage in a predetermined sequence based on a scheduling command of the control apparatus 700. In some other embodiments, the mobile vehicle 300-1 to the mobile vehicle 300-5 move toward the carriage in a predetermined sequence based on a scheduling command of the autonomous mobile device 100. As described above, after each mobile vehicle arrives at a corresponding location and stops moving, a mobile vehicle queue for transporting cargoes is formed. In some embodiments, a plurality of mobile vehicles, at the exterior 970 of the carriage, in the mobile vehicle queue may be supported on a dock docked with the carriage. In some other embodiments, a plurality of mobile vehicles, at the exterior 970 of the carriage, in the mobile vehicle queue may be supported on another object docked with the carriage.

The autonomous mobile device 100 may pre-arrange a queue sequence of the mobile vehicle 300-1 to the mobile vehicle 300-5 (it is assumed that the mobile vehicle 300-1 is the first place in the queue, the mobile vehicle 300-2 is the second place in the queue, and so on), so that the mobile vehicle queue is formed according to a predetermined queue sequence. The mobile vehicle 300-1 to the mobile vehicle 300-5 may communicate with each other in real time to determine statuses thereof. In some embodiments, the mobile vehicle 300-1 to the mobile vehicle 300-5 may respectively arrive at the vicinity of the carriage according to different routes. Therefore, a time point when each mobile vehicle arrives at the vicinity of the carriage may be random. The mobile vehicle 300-2 may start a further operation of the mobile vehicle 300-2 in response to receiving, from the mobile vehicle 300-1, a message indicating the state of the mobile vehicle 300-1. Specifically, in response to receiving, from the mobile vehicle 300-1, a message indicating that the mobile vehicle 300-1 has moved to the interior of the carriage, the mobile vehicle 300-2 may move into the carriage. After the mobile vehicle 300-1 and the mobile vehicle 300-2 move into the carriage in sequence, motions of the mobile vehicles in the carriage (i.e. control of a distance between the mobile vehicles and control of a distance between the mobile vehicles and the side wall of the carriage) may be based on various sensors of the mobile vehicles described above. Details are not described herein again. In other words, only after it is determined that a mobile vehicle that is ranked front starts a queuing operation, a mobile vehicle that is ranked back can start a queuing operation. In this way, congestion of a plurality of mobile vehicles is avoided. In some other embodiments, there may be no predetermined queue sequence, and a "first come first in" policy is used for a queuing operation of a mobile vehicle. The autonomous mobile device 100 may communicate with corresponding mobile vehicles in real time, to master locations of the mobile vehicles and uniformly schedule an occasion for the mobile vehicles moving into the carriage (i.e. an occasion for starting a queuing operation). Specifically, after the mobile vehicle 300-2 first arrives at the vicinity of the carriage, the autonomous mobile device 100 may send a command of directly moving to the interior of the carriage to the mobile vehicle 300-2 in response to determining that there is no other mobile vehicle that arrives at the same time with the mobile vehicle 300-2. In this case, the mobile vehicle 300-2 is the first mobile vehicle into the carriage, and does not need to wait for the mobile vehicle 300-1 to move into the carriage first. If the autonomous mobile device 100 determines that there is another mobile vehicle that arrives at the same time with the mobile vehicle 300-2, the autonomous mobile device 100 may specify a sequence in which the corresponding mobile vehicles move into the carriage.

In some other embodiments, each of the mobile vehicle 300-1 to the mobile vehicle 300-5 may arrive at the vicinity of the carriage according to a same route. In other words, the foregoing mobile vehicles are first arranged into a mobile vehicle queue, and then uniformly move toward the carriage in a queue form. Specifically, in response to a command from the autonomous mobile device 100, the mobile vehicle 300-1 may first move toward the carriage based on a route, the mobile vehicle 300-2 may then move toward the carriage based on a same route, the mobile vehicle 300-3 may then move toward the carriage based on the same route, and so on. As described above, in a process in which these mobile vehicles move toward the carriage in a queue form, the mobile vehicles may communicate with each other and the control apparatus 700 and the controller 227, and speeds and relative location relationships of the mobile vehicles may be controlled based on data of the sensors 421/521 and the sensors 422/522, so that a distance between the mobile vehicles is not extremely long or extremely short (to be specific, the predetermined distance between the mobile vehicles described above is kept) and a formation of the queue is kept (to be specific, alignment between the mobile vehicles is implemented).

In this case, the mobile vehicle queue is similar to the foregoing descriptions, and extends from the exterior 970 of the carriage to the interior 980 of the carriage. To be different, in this mobile vehicle queue, the mobile vehicles located at the exterior 970 of the carriage may be a plurality of mobile vehicles (not limited to the mobile vehicle 300-5), and these mobile vehicles may be supported on any object (as described above, not limited to the platform 203, or a dock or another object docked with the carriage). After the mobile vehicle queue is formed, the control apparatus 700 can schedule a plurality of material handling apparatuses to simultaneously place cargoes on corresponding mobile vehicles in the mobile vehicle queue. In a non-limiting embodiment, the mobile vehicle 300-5 and the mobile vehicle 300-4 may be located at the exterior 970. Therefore, the control apparatus 700 may schedule one material handling apparatus to place a cargo handled by the material handling apparatus onto the mobile vehicle 300-5. Meanwhile, the control apparatus 700 may schedule another material handling apparatus to place a cargo handled by the material handling apparatus onto the mobile vehicle 300-4. In an embodiment in which the control apparatus 700 is not present, the autonomous mobile device 100 can complete the foregoing scheduling operation.

In some embodiments, after a cargo transportation task is finished, all the mobile vehicles in the mobile vehicle queue may autonomously move away from the carriage, and autonomously return to the vicinity of the autonomous mobile device 100. In some other embodiments, the return operation of the mobile vehicle is controlled by a permission or a command of the control apparatus 700. In some other embodiments, the return operation of the mobile vehicle is controlled by a permission or a command of the autonomous mobile device 100. After returning to the vicinity of the autonomous mobile device 100, the autonomous mobile device 100 may allow a specified mobile vehicle to run into the platform 203 based on scheduling of the control apparatus 700 (or based on scheduling of the autonomous mobile device 100).

In other words, a sequence in which the mobile vehicles are withdrawn to the autonomous mobile device 100 is not limited to a reverse sequence of a sequence in which the autonomous mobile device 100 releases the mobile vehicles. In addition, each mobile vehicle may have a respective route for returning to the autonomous mobile device 100. In other words, the mobile vehicles are not limited to being sequentially returned to the autonomous mobile device 100 in a queue form and according to a same route. In addition, cargo placement operations performed by the material handling apparatuses may be performed in parallel. The foregoing configuration of the autonomous mobile device 100 further improves flexibility of the transportation mechanism (i.e. the mobile vehicle queue) for transporting an object from the exterior of the target to the interior of the target, which is desirable for an increasingly complex target transportation scenario.

Any sensor described above cannot be considered as a limitation on the present disclosure. Specifically, the method/process/step described above may be implemented by using any desirable sensor/detector/sensing apparatus/camera (or the like) without departing from the essence of the present disclosure.

Compared with the existing technology, the autonomous mobile devices and the configuration manners of the corresponding assemblies/components described above have the following significant advantages. In one aspect, the autonomous mobile device can move autonomously, which brings more flexibility. Specifically, the autonomous mobile device can automatically identify and position a target (for example, a carriage of a truck), and can move toward the target and be aligned with the target. In another aspect, a transportation mechanism (i.e. a mobile vehicle queue) for transporting cargoes may be split into smaller units (i.e. mobile vehicles), so that the transportation mechanism can be accommodated on the autonomous mobile device and can move together with the autonomous mobile device. This not only improves flexibility of the transportation mechanism, but also greatly reduces a ground area occupied by the transportation mechanism. In another aspect, the platform of the mobile carrier of the autonomous mobile device can be lifted and lowered, so that the autonomous mobile device can be adapted to different targets having different heights. In another aspect, the mobile vehicles of the autonomous mobile device have insertion holes for insertion of a forklift, so that the mobile vehicles can be more easily moved to a repair station (or moved out of a cargo loading place) when a fault occurs. The autonomous mobile device of the present disclosure further has various significant advantages. The advantages have been reflected in the foregoing descriptions. Details are not described herein again. Details are not described herein again.

The description in this specification is provided to enable those skilled in the art to make or use the present disclosure. Various modifications to the present disclosure will be readily apparent to those skilled in the art, and the general principles defined in this specification may be applied to other variations without departing from the spirit or scope of the present disclosure. Accordingly, the present disclosure is not limited to the embodiments and designs described in this specification, but is accorded the broadest scope consistent with the principles and novel features disclosed herein.

We claim:

1. A mobile carrier, comprising:
a main body; and
a plurality of wheel assemblies, arranged around the main body; wherein the mobile carrier is configured to enable a plurality of mobile vehicles to move into and out of the mobile carrier, and the mobile carrier is configured to move the plurality of mobile vehicles in a vertical direction, and wherein the main body comprises a platform and a frame, the platform being mechanically coupled to the frame, and the frame comprising a plurality of transverse beams and a plurality of vertical beams; and
a first telescoping component, wherein the first telescoping component is located at an edge of the platform and is adjacent to the plurality of vertical beams.

2. The mobile carrier according to claim 1, further comprising a first component, wherein the first component is located between a pair of vertical beams of the plurality of vertical beams and is connected to the platform, and the first component is configured to enable the platform to vertically move within a height range of the frame.

3. The mobile carrier according to claim 2, further comprising a first sensor, wherein the first sensor is arranged in the vicinity of the first component, and the first sensor is configured to detect a height of the platform.

4. The mobile carrier according to claim 3, further comprising a second sensor, wherein the second sensor is mounted on at least one of the plurality of transverse beams at a top of the frame, and the second sensor is configured to detect a region around the mobile carrier.

5. The mobile carrier according to claim 4, wherein the mobile carrier is configured to move to a first location in the vicinity of a target at least partially based on data of the second sensor, and wherein the mobile carrier is aligned with the target at the first location.

6. The mobile carrier according to claim 5, wherein:
the mobile carrier is configured to determine a height difference between the platform and a bottom of the target at least partially based on data of the first sensor; and
the mobile carrier is configured to move to a second location at least partially based on the height difference satisfying a threshold range, the second location being closer to the target than the first location.

7. The mobile carrier according to claim 6, wherein the mobile carrier is configured to drive the first component to place the platform onto the bottom of the target.

8. The mobile carrier according to claim 7, wherein the platform comprises a main part and an extension part hinged to the main part.

9. The mobile carrier according to claim 8, further comprising a third sensor, wherein the third sensor is arranged at a connection point between the main part and the extension part, and the third sensor is configured to detect whether the extension part is placed at a predetermined location of the bottom of the target.

10. The mobile carrier according to claim 1, further comprising a second telescoping component, the second telescoping component comprising two sub-assemblies, wherein the two sub-assemblies of the second telescoping component are connected to the first telescoping component via a connecting rod, so as to be arranged on two sides of the first telescoping component respectively, and the two sub-assemblies are insertable into two docking holes of a corresponding mobile vehicle of the plurality of mobile vehicles.

11. The mobile carrier according to claim 10, wherein when the two sub-assemblies of the second telescoping component are configured to be inserted into the docking holes, the first telescoping component is configured to enable the corresponding mobile vehicle of the plurality of mobile vehicles to vertically move relative to the platform.

12. The mobile carrier according to claim 11, further comprising a fourth sensor, wherein the fourth sensor is arranged in the vicinity of the first telescoping component, and the fourth sensor is configured to detect, in response to vertical movement of the corresponding mobile vehicle of the plurality of mobile vehicles, a height of the corresponding mobile vehicle.

13. The mobile carrier according to claim 12, further comprising fifth sensors, wherein the fifth sensors are arranged on at least one of the two sub-assemblies of the second telescoping component.

14. The mobile carrier according to claim 13, wherein:
the first fifth sensor is configured to detect that the second telescoping component is in a withdrawn state, and the two sub-assemblies completely move away from the docking holes in the withdrawn state; and
the second fifth sensor is configured to detect that the second telescoping component is in an inserted state, and the two sub-assemblies are inserted into the docking holes in the inserted state.

15. The mobile carrier according to claim 13, wherein:
the mobile carrier is configured to drive the first telescoping component and the second telescoping component at least partially based on data of the fourth sensor and the fifth sensors, so that a plurality of second mobile vehicles of the plurality of mobile vehicles move away from a first mobile vehicle of the plurality of mobile vehicles in the vertical direction; and
the mobile carrier is configured to drive, in response to the first mobile vehicle moving away from the platform, the first telescoping component to place the plurality of second mobile vehicles onto the platform, and then to withdraw the second telescoping component.

16. The mobile carrier according to claim 15, wherein:
the mobile carrier is configured to drive the first telescoping component and the second telescoping component at least partially based on data of the fourth sensor and the fifth sensors, so that a plurality of second mobile vehicles of the plurality of mobile vehicles move away from the platform in the vertical direction; and
the mobile carrier is configured to drive, in response to a first mobile vehicle of the plurality of mobile vehicles entering the platform, the first telescoping component to place the plurality of second mobile vehicles onto the first mobile vehicle, and to then withdraw the second telescoping component.

17. The mobile carrier according to claim 1, further comprising a sixth sensor, wherein the sixth sensor is mounted at a bottom of the mobile carrier, and the sixth sensor is configured to detect whether the plurality of mobile vehicles are withdrawn to the platform.

18. The mobile carrier according to claim 1, wherein the mobile carrier is configured to:
allow the plurality of mobile vehicles to move away from the mobile carrier so that there is no any mobile vehicle on the mobile carrier; and
send a movement command so that each of the plurality of mobile vehicles moves toward a target to form a mobile vehicle queue, the mobile vehicle queue extending from an exterior of the target to an interior of the target.

* * * * *